US008595115B2

(12) United States Patent  
Leistner

(10) Patent No.: US 8,595,115 B2
(45) Date of Patent: *Nov. 26, 2013

(54) METHODS FOR MANAGING A MEDICAL EVENT

(75) Inventor: Gilbert Leistner, Goffstown, NH (US)

(73) Assignee: Gilbert Leistner, Chernex (CH)

( * ) Notice: Subject to any disclaimer, the term of this patent is extended or adjusted under 35 U.S.C. 154(b) by 323 days.

This patent is subject to a terminal disclaimer.

(21) Appl. No.: 12/977,883

(22) Filed: Dec. 23, 2010

(65) Prior Publication Data

US 2011/0093291 A1 Apr. 21, 2011

Related U.S. Application Data

(63) Continuation of application No. 10/921,744, filed on Aug. 18, 2004.

(60) Provisional application No. 60/495,937, filed on Aug. 18, 2003.

(51) Int. Cl.
*G06Q 40/00* (2012.01)

(52) U.S. Cl.
USPC ............................. 705/36 R; 705/35

(58) Field of Classification Search
USPC ................. 705/1, 26, 28, 29, 35–37
See application file for complete search history.

(56) References Cited

U.S. PATENT DOCUMENTS

| | | |
|---|---|---|
| 3,573,747 A | 4/1971 | Adams et al. |
| 4,937,743 A | 6/1990 | Rassman et al. |
| 5,111,391 A | 5/1992 | Fields et al. |
| 5,164,897 A | 11/1992 | Clark et al. |
| 5,216,596 A | 6/1993 | Weinstein |
| 5,319,543 A | 6/1994 | Wilhelm |
| 5,325,292 A | 6/1994 | Crockett |
| 5,343,388 A | 8/1994 | Wedelin |
| 5,469,353 A | 11/1995 | Pinsky et al. |
| 5,553,609 A | 9/1996 | Chen et al. |
| 5,619,991 A | 4/1997 | Sloane |
| 5,692,125 A | 11/1997 | Schloss et al. |
| 5,742,775 A | 4/1998 | King |
| 5,778,345 A | 7/1998 | McCartney |
| 5,801,755 A | 9/1998 | Echerer |
| 5,867,821 A | 2/1999 | Ballantyne et al. |
| 5,911,687 A | 6/1999 | Sato et al. |
| 5,940,807 A | 8/1999 | Purcell |

(Continued)

FOREIGN PATENT DOCUMENTS

WO 01/88775 A2 11/2001

OTHER PUBLICATIONS

Richard C. Firstman, "Disillusioned Doctors Have Plenty to Say", Albany times Union (Albany NY) Feb. 19, 1991 (3 pages).

(Continued)

*Primary Examiner* — Hani M Kazimi
(74) *Attorney, Agent, or Firm* — Osha Liang LLP

(57) ABSTRACT

A system for managing an event including selecting a reference item, selecting a specification of the reference item, evaluating the specification against alternatives to the reference item, determining interchangeability between the reference item and alternatives based on evaluating of the specification in relation to the alternatives, where the determining of interchangeability is based on or includes determining at least one of quasi-fungibility and quasi-anti-fungibility. The method further including forming at least one set based on the determined interchangeability and managing the event based on or including at least one of the set and at least one member of the set.

20 Claims, 21 Drawing Sheets

(56) References Cited

U.S. PATENT DOCUMENTS

| | | | |
|---|---|---|---|
| 5,970,479 | A | 10/1999 | Shepherd |
| 6,006,191 | A | 12/1999 | DiRienzo |
| 6,021,397 | A | 2/2000 | Jones et al. |
| 6,035,287 | A | 3/2000 | Stallaert et al. |
| 6,081,789 | A | 6/2000 | Purcell |
| 6,085,165 | A | 7/2000 | Ulwick |
| 6,148,293 | A | 11/2000 | King |
| 6,154,738 | A | 11/2000 | Call |
| 6,169,992 | B1 | 1/2001 | Beall et al. |
| 6,185,292 | B1 | 2/2001 | Miloslavsky |
| 6,188,993 | B1 | 2/2001 | Eng et al. |
| 6,272,481 | B1 | 8/2001 | Lawrence et al. |
| 6,285,986 | B1 | 9/2001 | Andrews |
| 6,292,787 | B1 | 9/2001 | Scott et al. |
| 6,302,844 | B1 | 10/2001 | Walker et al. |
| 6,341,960 | B1 | 1/2002 | Frasson et al. |
| 6,349,309 | B1 | 2/2002 | Aggarwal et al. |
| 6,407,939 | B2 | 6/2002 | Merritt |
| 6,421,663 | B1 | 7/2002 | Chen et al. |
| 6,578,831 | B2 | 6/2003 | Menzel et al. |
| 6,601,043 | B1 | 7/2003 | Purcell |
| 6,638,218 | B2 | 10/2003 | Bulat |
| 6,671,818 | B1 | 12/2003 | Mikurak |
| 6,687,882 | B1 | 2/2004 | McElvain et al. |
| 6,804,656 | B1 | 10/2004 | Rosenfeld et al. |
| 6,980,966 | B1 | 12/2005 | Sobrado et al. |
| 6,993,504 | B1 | 1/2006 | Friesen et al. |
| 6,999,783 | B2 | 2/2006 | Toyryla et al. |
| 7,023,979 | B1 | 4/2006 | Wu et al. |
| 7,062,449 | B1 | 6/2006 | Clark |
| 7,065,528 | B2 | 6/2006 | Herz et al. |
| 7,107,224 | B1 | 9/2006 | Weller et al. |
| 7,155,400 | B1 | 12/2006 | Jilk et al. |
| 7,233,914 | B1 | 6/2007 | Wijaya et al. |
| 7,260,550 | B1 | 8/2007 | Notani |
| 7,373,323 | B1 | 5/2008 | Dalal et al. |
| 7,379,898 | B2 | 5/2008 | Tenorio |
| 7,379,964 | B1 | 5/2008 | Buechler et al. |
| 7,412,396 | B1 | 8/2008 | Haq |
| 7,647,234 | B1 | 1/2010 | Ruderman et al. |
| 7,774,234 | B1 | 8/2010 | Kopelman et al. |
| 7,848,935 | B2 | 12/2010 | Gotlib et al. |
| 2001/0032163 | A1 | 10/2001 | Fertik et al. |
| 2001/0037284 | A1 | 11/2001 | Finkelstein et al. |
| 2001/0042785 | A1 | 11/2001 | Walker et al. |
| 2002/0026429 | A1 | 2/2002 | Lostis et al. |
| 2002/0038265 | A1 | 3/2002 | Mertz et al. |
| 2002/0055886 | A1 | 5/2002 | Hinckley |
| 2002/0065758 | A1 | 5/2002 | Henley |
| 2002/0069155 | A1 | 6/2002 | Nafeh et al. |
| 2002/0087377 | A1 | 7/2002 | Rajasenan et al. |
| 2002/0161619 | A1 | 10/2002 | Ham et al. |
| 2003/0009415 | A1 | 1/2003 | Lutnick et al. |
| 2003/0018570 | A1 | 1/2003 | McCabe et al. |
| 2003/0088563 | A1 | 5/2003 | Yamane et al. |
| 2003/0108938 | A1 | 6/2003 | Pickar et al. |
| 2003/0115128 | A1 | 6/2003 | Lange et al. |
| 2003/0135441 | A1 | 7/2003 | Ginsberg |
| 2003/0177052 | A1 | 9/2003 | Smith et al. |
| 2003/0216928 | A1 | 11/2003 | Shour |
| 2003/0216938 | A1 | 11/2003 | Shour |
| 2004/0083162 | A1 | 4/2004 | Sadre |
| 2004/0095380 | A1 | 5/2004 | Bass et al. |
| 2004/0117302 | A1 | 6/2004 | Weichert et al. |
| 2004/0133502 | A1 | 7/2004 | Sadre |
| 2004/0193528 | A1 | 9/2004 | Sadre |
| 2004/0230458 | A1 | 11/2004 | Takayama et al. |

OTHER PUBLICATIONS

AAP General News "NSW: Doctors Calls for Review of Nursing Laws", May 22, 2000 (2 pages).
NCGA News, National Corn Growers Association, Sep. 20, 2002, vol. 9, No. 35, see especially p. 1,"NCGA Views EU Wheat Shipment as Move to Replace Domestic Corn"; p. 2 "EU, Mexico Becoming Large Markets for DDGS"; (6 pages).
Patt, Anthony G. "Assessing Extreme Outcomes: The Strategic Treatment of Low Probability Impacts of Climate Change" Aug. 1997, ENRP Discussion Paper E-97-10 of the Environment and Natural Resources Program (ENRP), Belfer Center for Science and International Affairs, John F. Kennedy School of Government, Harvard University, see especially p. 3, para 4 continuing onto p. 4; p. 5, para 4 to p. 6, para 1; p. 16, para 1; p. 23, footnote 3, para 3; p. 35 figure 3; (42 pages).
Financial Giant Enron to Hedge Bets in Drams—New Froward Contracting Service Could Reduce Risk for Buyers and Sellers, Introduce Stability, Electronic buyers News Jun. 18, 2001 (3 pages).
Nebraska Supreme Court, *Malena* v. *Marriott International*, S-00-1285, 264 Neb 759. Oct. 11, 2002, see p. 770, lines 16-18 (12 pages).
Starr, Ann "Choosing My Own doctor" The Yale Journal for Humanities in Medicine Oct. 28, 2001. (3 pages).
In the United States District Court for the Southern District of Ohio Eastern Division, Jul. 30, 2003 Worldwide Basketball and Sports Tours, Inc., et al. Sports Tours, Inc., et al., Versus National Collegiate Athletic Association, Judge Edmund A. Sargus, Jr. Magistrate Judge Mark R. Abel (http://www.ohsd.uscourts.gov/opinresu.asp), see p. 13 line 4; p. 15 para 2; p. 18 lines 8-10; and, p. 23 lines 11-12. (39 pages).
*United States* v. *du Pont & Co.*, 351 US 377 (1956) ,see p. 377, para (d); 380, para 2; p. 394 item IV "The Relevant Market", para 1,and 3.; (28 pages).
*Times-Picayune* v. *United States*, 345 U.S. 594 (1953); see footnote 31.on p. 17 of case printout (21 pages).
Canadian Grain Commission, "Official Grain Grading Guide" Aug. 1, 2000, 451 pages, (http://dsp-psd.communication.gc.ca/Collection/A92-11-2000E.pdf) ; especially see p. 6-3 (malting and hulless), 6-4 (Varieties), p. 20-08 (frost damage), p. 28-12 (hard vitreous kernels-HVK), 28-13 (Orange wheat blossom midge) and p. 28-17 (mycotoxins) (451 pages).
W. Bushuk, "Wheat breeding for end-product use", Euphytica 100: 137-145, 1998 (9 pages).
John J. Merrick, Jr. et al., "Market Quality and Trader Behavior in a Manipulated Market: Anatomy of a Squeeze", Draft—Aug. 15, 2002, (53 pages).
webMD Find a Maternity Center web page Aug. 31, 2002 retrieved Nov. 29, 2010 from web.archive.org/web/20020602231006/my.webmd.com/find_a_phys/maternity_center (1 page).
webMD Find a Mammography Center web page Aug. 31, 2002 retrieved Nov. 29, 2010 from web.archive.org/web/20020602230128/my.webmd.com/find_a_physi/mammography (1 page).
webMD Find a Doctor web page Aug. 31, 2002 retrieved Nov. 29, 2010 from web.archive.org/web/20020803021300/my.webmd.com/find_a_physician (2 pages).
Slomski< Anita J. "Are NPs and primary care doctors interchangeable?" Medical Economics Mar. 20, 2000. (1 page).
Herbert, Carol P. "The fifth principle Family physicians as Advocates" Canadian Family Physician vol. 47 Dec. 2001 pp. 2441-2443 (3 pages).
US Statutory Invention Registration H1743, Graves, et al. Aug. 4, 1998 Inventory Management Method and Apparatus (20 pages).
"Enlisting Event Patterns for Cyber Battlefield Awareness" DARPA Information Survivability Conference & Exposition DISCEX'00 Jan. 25-27, 2000, Hilton Head, South Carolina, IEEE Computer Society Press, Perrochon, Louis, et al., (12 pages).
"The Movement Disorder of Reflex Symptomatic Dystrophy" Schwartzman, Robert, et al. Neurology 1990; 40:57-61 (See particularly, p2 text) (5 pages).
"Cholesterol crystal embolism: A recognizable cause of renal disease." Scolari, F et al. Am J Kidney disease Dec. 2000 36(6): Abstract (2 pages).
"Disease outbreak detection system using syndromic data in the greater Washington DC area" Lewis, Michael D et al American Journal of Preventive Medicine vol. 23, Issue 3 , pp. 180-186, Oct. 2002 Abstract (2 pages).
SGX DRAM Futures Specifications, Singapore Exchange, 2000 (5 pages).

(56) References Cited

OTHER PUBLICATIONS

J. Wilkinson et al. "Volunteering: The Human Face of Democracy", Social Poly Research Centre—SPRC Discussion Paper No. 114, Jan. 2002. (35 pages).

Australian Taxation Office Regulation 775-145.01 Application of Forex Events to Currency. Income Tax Assessment Regulations 1997 Part 4; (5 pages).

"Kelly Services to participate in the Credit Suisse First Boston Staffing Services President & CEO Conference Call" May 28, 2003 FDCH Media Transcript 052803ao.776 (15 pages).

The Futures Market is in the Chips; Commodities Exchanges to Offer Semiconductor Futures, Marketing Computers, Aug. 1989 (4 pages).

Agriculture and Agri-Food Canada Bi-weekly Bulletin, Sep. 28, 2001, vol. 14, No. 17, "Dry Peas: Situation and Outlook" (4 pages).

Arnold Kling, "Economists and their Inquisitors", Tech Central Station, Mar. 4, 2004, (3 pages).

Enron Move into DRAM Futures Set for Abject Failure—Needham & Co. AFX European Focus Jun. 8, 2001 (1 page).

Whitepaper Part Number Normalization—RiverOne, (pre-Aug. 18, 2003) (5 pages).

19 C.F.R. Section 19.12, appendix A Section 19.12 Inventory control and recordkeeping system & Appendix B, Apr. 3, 1987, (8 pages).

Hunt-Wesson: Rumble in the Jungle, California Tax Policy Conference, Presented by Michael J. McIntyre, Wayne State University Law School, Nov. 9-20, 2000, (6 pages).

The Human Organization of Time: Temporal Realities and Experience, Bluedorn, Allen, Stanford University Press, 2002, generally; specifically at p. 20 at paragraph 2; pp. 26 -35; p. 86, line 17; p. 207 paragraph 2; p. 242 paragraph 1; pp. 244-245; p. 268. (19 pages).

Hedging the Future of DRAM: Can Chips be Traded Like Pork Bellies, Electronic Business, Sep. 1, 2001 (3 pages).

Essays in Transportation Economics and Policy: A Handbook in Honor of John R. Meyer by Jose A. Gomez-Ibanez, et al. Brookings Institution Press 1999 ISBN 0815731817 p. 148 para 2 line 1 (3 pages).

What, Then, Is Time? by Eva T. H. Brann, Rowman & Littlefield, 1999, generally; especially p. 190 para 1; p. 194 paragraph d to p. 195 line 5. (4 pages).

The Problem with Planning: The Significance of Theories of Activity for Operations Management, by Robert Bruce Johnston, School of Business Systems, Monash University, Sep. 1998. generally; in particular, pp. 153-155; p. 158 last 9 lines of page; (232 pages).

Cohen, J. Content, Context, Fungibility and Disproof in the Critical Rationalist ISSN 1393-3809 vol. 2 # 03 Sep. 15, 1997 (12 pages).

Consumer Value: A Framework for Analysis and Research, Edited by Morris B. Holbrook, Routledge, London 7 New York, 1999, ISBN 0415191920. See the value of Time in Waiting and Delays by France Leclerc & Bernd H. Schmitt (4 pages).

The Commodity Futures Modernization Act and Single Stock Futures Version 3.0 Jun. 2001 (7 pages).

"Values Law, Values Metric" by P. Cockshott & A. Cottrell, Research Report RR-94-168, Sep. & Nov. 1994 (20 pages).

"A Place in the World: New Local Historiographies From Africa and South Asia" Edited by Axel HARNETT_SIEVERS, Brill, 2002 generally; p. 151, para 2, line 9-11. (3 pages).

"Measure Theory and Probability" by A.K.Basu © 1999 Prentice-Hall India, 2nd Printing Feb. 2003, p. 18, 19, 21, 23, 36, 191 (1 page).

"Health Insurance Derivatives: The Newest Application of Modern Financial Risk Management" by James A. Hayes, et al., Business Economics, 1993, (5 pages).

"Hedging the Cure: Financing Medical Care With Health Insurance Derivatives", by James A. Hayes, Contingencies Nov./Dec. 2001 (4 pages).

"DeJarnette and iView Form New Company to Provide Remote Radiology Reading Services for Underserved Communities" Business wire, Nov. 15, 2001 (2 pages).

The Financial Information Services Division, Reference Data Map, Apr. 2, 2003, The Software & Information Industry Association (5 pages).

Castellanos, Malu, et al., "Component Advisor: A Tool for Automatically Extracting Electronic Component Data from Web Datasheets", Hewlett-Packard Laboratories, Palo Alto, CA W3C Workshop Apr. 1998 (7 pages).

Bansal, Vipul K., et al., "Hedging Business Cycle Risk With Macroeconomic Swaps: Some Preliminary Evidence", Spring 1994, pp. 50-58, The Journal of Derivatives (9 pages).

Bansal, Vipul K., et al., "Macroeconomic Derivatives: More Viable Than First Thought!", pp. 101-110, Global Finance Journal (10 pages).

DRAM Chips May Be Sold by PSE; Stock Exchange Must Wait Until March for Commissions Approval, InfoWorld, Oct. 23, 1989 (1 page).

Marshall, John F., et al., "Hedging Business Cycle Risk With Macro Swaps and Options", pp. 213-221, Journal of Applied Corporate Finance, vol. 4, No. 4 Winter 1992 (5 pages).

Marshall, John, "Macroeconomic derivatives: tools for hedging business-cycle risk" A new type of derivative produce is examined by John Marshall of Marshall, Tucker & Associates, Sep. 1996, pp. 33-40, Financial Derivatives and Risk Management, Issue Seven. (8 pages).

Marshall, John F., et al., "Hedging Business Cycle Risk: The Next Major Wave in Derivative?", pp. 6-11 (6 pages).

DiMartini, et al.. A New and Improved Design for Multi-Object Iterative Auctions, Mar. 15, 1999, California Institute of Technology, Division of Humanities and Social Sciences, Working Papers (45 pages).

Boudrreau, J. "On the Interface between operations and human resources management", Manufacturing & Service Operations Management vol. 5, No. 3 Summer 2003 (35 pages).

Kao, Audrey, "Back to the Future" Virtual Mentor, American Medical Association Journal of Ethics, Mar. 2001, vol. 3, No. 3. 3 pages.

Radio New Magazine, Apr. 1924, cover showing "The Radio Doctor—Maybe!" feature described in NPL 1 in more detail. (This is a second example of the same cover.) 1 page.

FIPS, Head Office Boy; "The Radio Doctor—Maybe" Radio New Magazine Apr. 1924; pp. 1406 & 1514, 2 pages.

Tele-radiol...

| Spec | Ref |
|---|---|
| Provider ID | |
| City | |
| State | |
| Country | |
| Specialty | |
| Type | |
| ABR Cert | |
| AOBR Cert | |
| ABOMR Cert | |
| NY Licensed | |
| English speaking | |
| Trade Bill* Affected | |
| HMO 65 affiliates | |
| $Fee/month | |

Constraint Editor

| Category | Spec | Current Rule |
|---|---|---|
| Geography | Metro Paris | Disallow |
| | Metro NYC | Disallow |
| NY Licensure | NY License | Must Have |
| Board Cert | At least one (ABR, AOBR) | Must Have |
| Malpractice Insurance | Legally responsible in location where service is provided | Must Have |
| Specialty | Human Radiology—Diagnosis and Interpretation | Must Have |
| Comms Technology | Broadband | Must Have |
| Imaging Tech Expertise | MRI + CAT + DXray | Must Have |

Emphasis Editor

| Spec | Current Emphasis |
|---|---|
| City | 0% |
| State | 0% |
| Country | 20% |
| ABR Cert | 70% |
| AOBR Cert | 50% |
| English speaking | 95% |
| HMO 65 affiliates | 90% |
| $Fee/month | 85% |

*Subject to over-riding constraints*

Tele-radiological Services—Current View

| Spec. | Ref. | Cand.1 | Cand.2 | Cand.3 | Cand.4 | Cand.5 | Cand.6 | Cand.7 | Cand.8 |
|---|---|---|---|---|---|---|---|---|---|
| Provider | 1234 | 7956 | 1258 | 1228 | 1367 | 1976 | 1258 | 1296 | 9367 |
| City | NYC | Mumbai | Galveston | Bingham-ton | Beverly Hills | Nogales | Charles-ton | Chicago | Hanoi |
| State | NY | | TX | NY | CA | | SC | IL | |
| Country | U.S.A. | India | U.S.A. | U.S.A. | U.S.A. | Mexico | U.S.A. | U.S.A. | Vietnam |
| Specialty | Radiology (Diag. and Interp.) | Radiology (Diag. and Interp.) | Radiology (Diag. and Interp.) | Radiology (Diag. and Interp.) | Radiology (Diag. and Interp.) | Radiology (Diag. and Interp.) | Radiology (Diag. and Interp.) | Radiology (Diag. and Interp.) | Radiology (Diag. and Interp.) |
| Type | Human | Human | Human | Human | Human | Human | Human | Human | Human |
| Cert. (ABR/AOBR) | Both | ABR | AOBR | AOBR | Both | AOBR | ABR | Both | AOBR |
| NY Licensed | Yes | Yes | Yes | Yes | Yes | Yes | Yes | Yes | Yes |
| Insured to serve NY | Yes | Yes | No | Yes | Yes | Yes | Yes | Yes | No |
| English speaking | Fluent, no accent | Fluent, accent | Fluent, no accent | Fluent, no accent | Fluent, no accent | Not fluent | Fluent, no accent | Fluent, no accent | Not fluent |
| Trade Bill* Affected | No | TB S.23457 | No | No | No | No | No | No | TB S.7654 |
| HMO 65 affiliates | All | Some | All | Most | All | Some | Most | All | Few |
| $Fee/month | $100K | $75K | $80K | $80K | $105K | $65K | $80K | $96K | $65K |

FIG. 10

REFERENCE AMPLIFIER FOR SUB-ASSEMBLY

| Reference Part | Sym-bol | Spec$_1$ ID# | Spec$_2$ Gain BW (MHz) | Spec$_3$ Min Supply Voltage | Spec$_4$ Max Supply Voltage | Spec$_5$ Supply Current/ Channel (mA) | Spec$_6$ Linear Output Current (+/-mA) | Spec$_7$ Input Common Mode Voltage (V>Rails) | Spec$_8$ Output Voltage Swing (mV from Rails) | Spec$_9$ Input Voltage Noise (nV/Hz) | Spec$_{10}$ Slew Rate (V/μsec) | Spec$_{11}$ Max Amb Temp (deg C) | Spec$_{12}$ Chans/ Pkg (NS Pin-out) |
|---|---|---|---|---|---|---|---|---|---|---|---|---|---|
| Op Amp (A1) | $\xi_1$ | $\xi_{1,1}$ = OA-47285 | $\xi_{1,2}$ = 130 | $\xi_{1,3}$ = 3 | $\xi_{1,4}$ = 12 | $\xi_{1,5}$ = 2.70 | $\xi_{1,6}$ = 115 | $\xi_{1,7}$ = $V_{cm}$ to V- | $\xi_{1,8}$ = R-R | $\xi_{1,9}$ = 17 | $\xi_{1,10}$ = 130 | $\xi_{1,11}$ = 85 | $\xi_{1,12}$ = SOT-23 |

REFERENCE RESISTORS FOR SUB-ASSEMBLY

| Ref Part | Sym-bol | Spec$_1$ ID# | Spec$_2$ Ω | Spec$_3$ DCV | Spec$_4$ Tol(%) | Spec$_5$ Type | Spec$_6$ Tech | Spec$_7$ Pwr (W) | Spec$_8$ Tc (°C/W) | Spec$_9$ Pkg |
|---|---|---|---|---|---|---|---|---|---|---|
| Res (R1) | $\xi_2$ | $\xi_{2,1}$ = R1034 | $\xi_{2,2}$ = 316 | $\xi_{2,3}$ = 200 | $\xi_{2,4}$ = 1 | $\xi_{2,5}$ = SMT | $\xi_{2,6}$ = TF | $\xi_{2,7}$ = 0.25 | $\xi_{2,8}$ = 100 | $\xi_{2,9}$ = 1206 |
| Res (R2) | $\xi_3$ | $\xi_{3,1}$ = R1167 | $\xi_{3,2}$ = 3160 | $\xi_{3,3}$ = 200 | $\xi_{3,4}$ = 1 | $\xi_{3,5}$ = SMT | $\xi_{3,6}$ = TF | $\xi_{3,7}$ = 0.25 | $\xi_{3,8}$ = 100 | $\xi_{3,9}$ = 1206 |
| Res (Rf) | $\xi_4$ | $\xi_{4,1}$ = R1034 | $\xi_{4,2}$ = 1000 | $\xi_{4,3}$ = 200 | $\xi_{4,4}$ = 1 | $\xi_{4,5}$ = SMT | $\xi_{4,6}$ = TF | $\xi_{4,7}$ = 0.25 | $\xi_{4,8}$ = 100 | $\xi_{4,9}$ = 1206 |
| Res (R$_{load}$) | $\xi_5$ | $\xi_{5,1}$ = R1167 | $\xi_{5,2}$ = 100K | $\xi_{5,3}$ = 200 | $\xi_{5,4}$ = 1 | $\xi_{5,5}$ = SMT | $\xi_{5,6}$ = TF | $\xi_{5,7}$ = 0.25 | $\xi_{5,8}$ = 100 | $\xi_{3,9}$ = 1206 |

FIG. 19

REFERENCE CAPACITORS FOR SUB-ASSEMBLY

| Refer-ence Part | Sym-bol | Spec$_1$ ID# | Spec$_2$ µF (X 10$^{-2}$) | Spec$_3$ Tol. (%) | Spec$_4$ Mount | Spec$_5$ Height (mm) | Spec$_6$ VDC | Spec$_7$ ESR (Ω) | Spec$_8$ IRMS (A) | Spec$_9$ TaMin (°C) | Spec$_{10}$ TaMax (°C) |
|---|---|---|---|---|---|---|---|---|---|---|---|
| Cap (C3) | $\xi_6$ | $\xi_{6,1}=$ C3548 | $\xi_{6,2}=$ 3.3 | $\xi_{6,3}=$ 10 | $\xi_{6,4}=$ SMT | $\xi_{6,5}=$ 0.8 | $\xi_{6,6}=$ 16 | $\xi_{6,7}=$ 0 | $\xi_{6,8}=$ 50 | $\xi_{6,9}=$ -50 | $\xi_{6,10}=$ 85 |
| Cap (C4) | $\xi_7$ | $\xi_{7,1}=$ C9327 | $\xi_{7,2}=$ 0.36 | $\xi_{7,3}=$ 10 | $\xi_{7,4}=$ SMT | $\xi_{7,5}=$ 0.8 | $\xi_{7,6}=$ 16 | $\xi_{7,7}=$ 0 | $\xi_{7,8}=$ 50 | $\xi_{7,9}=$ -50 | $\xi_{7,10}=$ 85 |

FIG. 20

| Candidate Alternatives to Reference Part $A1 = \xi_1$ | $Spec_{1,1}$ ID# | $Spec_{1,2}$ Gain BW (MHz) | $Spec_{1,3}$ Min Supply Voltage | $Spec_{1,4}$ Max Supply Voltage | $Spec_{1,5}$ Supply Current per Channel (mA) | $Spec_{1,6}$ Linear Output Current (+/-mA) | $Spec_{1,7}$ Input Common Mode Voltage (V from Rails) | $Spec_{1,8}$ Output Voltage Swing | $Spec_{1,9}$ Input Voltage Noise (nV/Hz) | $Spec_{1,10}$ Slew Rate (V/μsec) | $Spec_{1,11}$ Max Amb Temp (deg C) | $Spec_{1,12}$ Channels/ Package (Pin-outs per NS, unless noted otherwise) |
|---|---|---|---|---|---|---|---|---|---|---|---|---|
| $\zeta_{1,1}$ $(\triangleq \nu_1)$ | $\zeta_{1,1,1}=$ OA-47298 | $\zeta_{1,1,2}=$ 24 | $\zeta_{1,1,3}=$ 2.5 | $\zeta_{1,1,4}=$ 30 | $\zeta_{1,1,5}=$ 0.97 | $\zeta_{1,1,6}=$ 115 | $\zeta_{1,1,7}=$ R-R | $\zeta_{1,1,8}=$ R-R | $\zeta_{1,1,9}=$ 15 | $\zeta_{1,1,10}=$ 15 | $\zeta_{1,1,11}=$ 85 | $\zeta_{1,1,12}=$ SOT-23 |
| $\zeta_{1,2}$ | $\zeta_{1,2,1}=$ OA-42415 | $\zeta_{1,2,2}=$ 250 | $\zeta_{1,2,3}=$ 5 | $\zeta_{1,2,4}=$ 12 | $\zeta_{1,2,5}=$ 4.50 | $\zeta_{1,2,6}=$ 180 | $\zeta_{1,2,7}$ $V_{cm}$ to V- | $\zeta_{1,2,8}=$ Not R-R | $\zeta_{1,2,9}=$ 4.5 | $\zeta_{1,2,10}=$ 200 | $\zeta_{1,2,11}=$ 85 | $\zeta_{1,2,12}=$ SOT-23 |
| $\zeta_{1,3}$ $(\triangleq \nu_1)$ | $\zeta_{1,3,1}=$ OA-47341 | $\zeta_{1,3,2}=$ 190 | $\zeta_{1,3,3}=$ 3 | $\zeta_{1,3,4}=$ 5 | $\zeta_{1,3,5}=$ 3.60 | $\zeta_{1,3,6}=$ 160 | $\zeta_{1,3,7}=$ 0 (R-R) | $\zeta_{1,3,8}=$ R-R | $\zeta_{1,3,9}=$ 6 | $\zeta_{1,3,10}=$ 172 | $\zeta_{1,3,11}=$ 85 | $\zeta_{1,3,12}=$ SOT-23 |
| $\zeta_{1,4}$ | $\zeta_{1,4,1}=$ OA-26784 | $\zeta_{1,4,2}=$ 4 | $\zeta_{1,4,3}=$ 2.2 | $\zeta_{1,4,4}=$ 30 | $\zeta_{1,4,5}=$ 0.60 | $\zeta_{1,4,6}=$ 9.50 | $\zeta_{1,4,7}=$ 0 (R-R) | $\zeta_{1,4,8}=$ R-R | $\zeta_{1,4,9}=$ 36 | $\zeta_{1,4,10}=$ 1.25 | $\zeta_{1,4,11}=$ 85 | $\zeta_{1,4,12}=$ SOT-23 |
| $\zeta_{1,5}$ $(\triangleq \nu_1)$ | $\zeta_{1,5,1}=$ OA-47307 | $\zeta_{1,5,2}=$ 130 | $\zeta_{1,5,3}=$ 3 | $\zeta_{1,5,4}=$ 12 | $\zeta_{1,5,5}=$ 2.70 | $\zeta_{1,5,6}=$ 115 | $\zeta_{1,5,7}$ $V_{cm}$ to V- | $\zeta_{1,5,8}=$ R-R | $\zeta_{1,5,9}=$ 17 | $\zeta_{1,5,10}=$ 130 | $\zeta_{1,5,11}=$ 85 | $\zeta_{1,5,12}=$ SOT-23 |

FIG. 21

METHODS FOR MANAGING A MEDICAL EVENT

This application is a continuation of U.S. patent application Ser. No. 10/921,744, filed on Aug. 18, 2004, and claims the benefit, pursuant to 35 U.S.C. §120, of that application, which claimed the benefit of U.S. Provisional Patent Application Ser. No. 60/495,937, filed Aug. 18, 2003. Both applications are incorporated by reference in their entirety.

BACKGROUND OF THE INVENTION

There has been a long-felt need to develop financial products with which to hedge price risk for goods and services, and many have appreciated the problem of often volatile changes in prices for goods and services. To date, the search for a solution to this need has been largely fruitless except for products that generally fall within traditional notions of the definition of "fungible". The creation of hedge products for services has lagged far behind product development for raw commodity products and certain financial instruments, and remains nascent at best. The quest to engineer financial hedge products for non-traditional product classes is well exemplified in the search for electronic component hedges, which search can be seen as an archetype for many diverse products and services in a plurality of industries.

For example, the Chicago Board of Trade, the Chicago Board Options Exchange, Twin Cities Board of Trade, and The Pacific Stock Exchange have been among the exchanges to try to develop futures and option products for such goods as electronic components. In each instance they have tried and failed, or have abandoned the efforts without launch.

Similarly, Enron tried to launch DRAM futures but failed, as predicted by Needham & Co. analyst Dan Scovel. "The problem is that DRAMs are an unstable commodity that undergoes a wide variety of fundamental product changes over time," Scovel said. "We believe the inherent instability of the offering renders forward contracts impractical."

For the most part, forward pricing that does exist consists of commitments between manufacturers and users to buy according to build schedules, a traditional method and relationship that are far from what most financial engineers think of when they discuss forward markets. Reports in the electronics industry press that cite a forward pricing market are often misleading in that what is most often being referred to as a forward price is simply a broker's "best guess" as to where components prices will be in some number of days, weeks, or months in the future. Thus, rather than a forward or future price as meant by the financial community, what is usually being spoken of as a forward pricing market is actually a type of price forecasting or speculation that is little different from when stock analysts prognosticate on the likely price of IBM in six months time. Initiatives by certain chip manufacturers to sell production capacity "forward" have met with limited success. A market of very limited scope for options on some individual products exists, but the market is largely unreliable.

Recent efforts by the Singapore Exchange (SGX) to launch futures on DRAM, even with their use of industry experts and consultations with major manufacturers in the work on the contract development, have met with many complaints. At least for the setting of a contract specification, several DRAM manufacturers have qualified for delivery on a proposed specification but industry responses to the product remain mixed, with some believing the market acceptance will be too thin, that the delivery set is too narrow, and that there is still a lack of fungibility. The contract launch has been repeatedly postponed and is still yet to be launched. Many in the industry continue to predict the SGX and other contracts will fail. A similar effort by the Semiconductor Futures Exchange to launch futures on the DRAM, which was chosen by the Semiconductor Futures Exchange because DRAM is "well specified by part number and type", is also being greeted by skepticism.

The historical reasons for expecting failure in DRAM futures contract trading, and by extension failure in other similar derivative contracts remain in place. Liquidity in cash products can be spotty. Variations in pin counts, packaging and product performance specifications (and how they are obtained) can give the impression of lack of fungibility and, in the absence of a repurchase and reverse repurchase market, the liquidity patterns in the futures contracts (and other derivatives) will be unreliable due to incompleteness in hedging opportunity. While both the Singapore Exchange and Semiconductor Futures Exchange claim to have solved fungibility problems with DRAM, arguably amongst the most highly fungible semiconductor products, for other electronics components the contract design problems for hedge products remain seemingly intractable.

U.S. Patent Application No. 2002/0055886 for System And Method For Maintaining And Utilizing Component Cross Reference Data In An Exchange System discloses a method for normalization of computer part and numbers, and "Part Number Normalization," a White Paper by River One, explores this idea from a slightly different approach.

The '886 patent application and the White Paper provide ideas for relating electronics components by part numbers, as they are defined internally by equipment manufacturers and by the component manufacturers themselves, in an internally consistent hierarchy of logical equivalency. The method differs from high level generic fungibility because equipment manufacturers define the parts of different manufacturers as fungible to their own particular needs, (often to the level of a specific build in a product class), and assign a system of internal part numbers which are associated with specific manufacturer part numbers. In the '886 application, the internal part numbers of one component user are related to the part numbers of individual component manufactures and to the internal part numbers of other component users to create lists of possibly interchangeable parts.

While a certain amount of the above can be inferred by examining and comparing printed specifications, a major effort by manufacturers goes toward defining fungibility according to uses of the parts and is the result of the impetus for rigorous suitability-to-purpose testing by engineers. This kind of a suitability certification is designed to provide for alternative parts where they exist (e.g., to preclude production line shut downs that can and do occur as a result of shortages in a particular part, whether due to manufacturer failures to deliver or an absence of supply in the spot market). It is an unpleasant reality for computer manufacturers, for example, that the lack of a single $0.05 capacitor could close down an entire production facility. These substitution designations are essential to maintaining operating production lines, the loss of which is of such criticality to company health as to justify the high expense of testing and certification for suitable substitutes whenever they exist. In fact, this expensive effort can be viewed as a form of "build insurance."

Prior to these and similar comparison regimes, a search for alternatives using specification lists might show no suitable substitution candidates or require extensive research. But under this methodology, a part that might seem non-fungible from a specification sheet could be revealed to be fungible in a particular situation. For example, in a product requiring a component with a response time of 30 microseconds and an operating voltage range of 10 to 25 millivolts, a fungible component might be a similar device with a response time of less than 20 microseconds with an operating voltage of 15 to 20 millivolts, while a component operating at 30 microseconds or less in a voltage range of 5 to 10 millivolts would not be fungible because the operating voltage of the main product has a ten millivolt lower bound.

Similarly, once a substitute has been identified on the basis of response time and voltage boundaries, vibration tolerances might enter the substitution sort. Thus, a product requiring a high vibration tolerance would have a different set of suitable components than a low vibration tolerance product. Further, there can be additional individual specifications such as date codes, shock, and temperature tolerance to define fungibility by use. Standard data sheets, and databases comparing standard data sheets, likely will not produce the desired results. Similarly, many of the web sites that specialize in electronic component tracking and comparisons are limited by the fact that they are only making substitutability suggestions, not certifications. A prototypical method for automating the search for components is described in "Component Advisor: A Tool for Automatically Extracting Electronic Component Data from Web Datasheets", published by Hewlett-Packard Laboratories.

The capacity of a computer-based database system and computerized methods to establish functional equivalence between seemingly unrelated parts, and thereby define degrees of fungibility in terms of their application, opens to development the possibility for active and liquid trading in financial products of all types for the electronics industry, as well as for other goods and services where substitutability or interchangeability either exists, or is developing but is not necessarily apparent.

Moreover, the creation of financial products enhance the liquidity of trade in the cash market by allowing for easy borrowing and lending (under repurchase and reverse repurchase methods) from a defined subset or entire set of fungible parts to underpin short selling. Such short selling is requisite to efficient hedging of financial products by dealers and traders, and the development of short selling itself is dependant on the ability to borrow inventory which is sold so delivery can be made even when the subject inventory is not yet owned. This borrowing function is typically supported by the financial mechanism of "repurchase" and "reverse repurchase". Repurchase and reverse repurchase can be defined as follows:

Repurchase—A customer sells an asset and receives cash with the intent and obligation of buying the asset back, usually at the same price with an interest rate based cost attached to the transaction (hence the term "repurchase agreement").

Reverse Repurchase—A customer buys an asset and releases cash with the intent and obligation of returning the asset for the cash, at an arranged price with an interest rate based profit attached to the transaction (hence the term "reverse repurchase agreement").

Repurchase agreements are typically referred to as "repo" and Reverse repurchase is typically referred to as "reverse" or "reverse repo".

There are many repo structures that are variations on a theme, but typical to most of them is that the sale/buy back is collateralized by liquid assets, making repurchase an efficient and low cost method of financing holdings and providing inventory for short sellers to deliver against their sales. It is the method of repo that drives much liquidity in the US Treasury debt and stock markets, for example, and repo and reverse are businesses in their own right earning significant sums of money for banks and securities houses.

In contrast to the below approach of the present invention, consider the very different methods of identifying securities by using a Committee on Uniform Securities Identification number (CUSIP). Under the CUSIP system, each individual security has an individual CUSIP number associated with that security and that security only, much as manufacturers assign part numbers to production. Under the methods of the above mentioned '866 application, each manufacturer part number is related to a user's internal part number and the internal part numbers of multiple users are compared and related to suggest interchangeability. Under this methodology, multiple seemingly non-equivalent parts can be assigned a universal part number, but that "universal" part number identifies only a possible match and a given related part may not work in a specific application. Further, among the differences that separate a part equivalency numbering system from a CUSIP system is that the definitions of equivalency are subject to change according to testing, use, and preference criteria. In fact, under a part equivalency numbering system, an end user can simply refuse to recognize a given part as interchangeable with an originally specified part. CUSIP identifications are not negotiable or flexible, market participants can not refuse to recognize the designated security they define and they do not represent sets of fungible products in the manner contemplated by the subject invention.

U.S. Patent Application Serial No. US2002/0026429 A1, Transactional Method And System For Semi-Fungible Commodity Items, describes a system and method for trading goods and services according to a set of micro-economic utility functions that defines their fungibility under an imprecise regime of "it isn't exactly what I want, but for this price, it will do." The '429 patent application attempts to define a fungibility mechanism as the basis for bulk transactions and does not appear to contemplate fungibility on any basis other than the negotiation model of a flea market, though it does couch that negotiation model in terms of formal econometric terminology, graphs and modern technology.

SUMMARY OF THE INVENTION

The subject invention is directed to a system and method for the creation of financial products and inventory optimization. Among the financial products are repurchase agreements and reverse repurchase agreements, warehouse receipts, futures, forwards, options, structured notes, indices, securities, options, and swaps, particularly mesoeconomic and macroeconomic swaps. Preferably, the system and method of the subject invention may be computer aided.

To facilitate discussion of the concepts in the subject invention from this point forward in the application, the following terms, subject to later additional specific definition, are introduced and used:

Quasi-Fungible: The degree to which an alternative item is interchangeable with a Reference item (or a user-conditioned version of a Reference item) given a particular use, specification or set of specifications for the Reference item, such that the element of quasi-fungibility is defined in terms of a measure of inter-changeability for a good/service/event/outcome or combination thereof on a scale of 0 to 1.00 where 0 means non-fungible and 1.00 means totally fungible.

Quasi-Anti-Fungible: The degree to which an item is "anti-" in concept to a Reference item (or a user conditioned version of a Reference item) given a particular use, specification or set of specifications, such that the element of quasi-anti-fungibility is defined in terms of a measure of the degree to which an alternative to a Reference contains antidotes, antithetical affects, reciprocals, mirrors, counter-agents, neutralizers or nullifiers of at least one specification/use of that Reference. The measure of quasi-anti-fungibility of an alternative item with respect to a Reference item (or user-conditioned version of a Reference item), given a particular use, specification or set of specifications, is defined on a scale of −1.00 to 0, where −1.00 means totally anti-fungible and 0 means non-anti-fungible.

Further, in the interest of enhancing readability, the term quasi-fungible shall incorporate the term quasi-anti-fungible except where use of the term quasi-fungible explicitly excludes it and in cases where the language refers specifically to quasi-anti-fungibility and the Quasi-anti-fungibility Reference Conditioning Operator $\hat{M}$.

The subject invention also includes a method for using a computer to make a financial product, the method including the steps of: inputting data specifying respective uses of respective goods, services, events or outcomes; determining, from said data, whether some of said products are quasi-fungible goods, services, events or outcomes; forming a set of some of said products, the set including at least one member identified by said determining step; and creating a financial product from at least some of the set. The method can be carried out by further including the steps of: forming a second set of some of said products, the second set including at least one member identified by said determining step; and wherein the step of creating a financial product includes: creating a financial product from a union of the first set and the second set. The method can further include the steps of: forming a third set of some of said products, the third set including at least one member identified by said determining step; and wherein the step of creating a financial product can include: creating a financial product from a union of the third set with said union of the first set and the second set. The operations that are to be performed for relating the sets and subsets thereof are not limited to unions, but also include intersections, products, compliments and all other allowable operations including Boolean and other mathematical manipulations and operations.

The step of creating a financial product can include the steps of: forming a macro or meso financial product from the union of all three sets; and forming a financial product from the union of the first set and the second set. Any of the foregoing can be carried out with capital goods, goods, and/or services as the products. Also in any of the foregoing, the step of forming a financial product can include forming a repurchase agreement, a reverse repurchase agreement or any of a plurality of financial products and derivatives. The subject invention also encompasses trading and systems therefore, pertaining to said financial products, as well as forming and maintaining a hedging index.

From another perspective, the subject invention can be characterized as a method for using a computer to make a financial product, the method including the steps of: inputting data specifying respective uses of respective products; determining, from said data, whether some of said products are quasi-fungible products; forming a set of some of said products, the set including at least one member identified by said determining step; and creating a financial product from at least some of the set. Such a method can be carried out by further including the steps of: forming a second set of some of said products, the second set including at least one member identified by said determining step; and wherein the step of creating a financial product includes: creating a financial product from a union of the first set and the second set. Any of the foregoing can be carried out by further including the steps of: forming a third set of some of said products, the third set including at least one member identified by said determining step; and wherein the step of creating a financial product includes: creating a financial product from a union of the third set with said union of the first set and the second set. Any of the foregoing can be carried out such that the step of creating a financial product includes the steps of: forming a financial product from the union of all three sets; and forming a financial product from the union of the first set and the second set. As mentioned above, the foregoing can be carried out with capital and other goods and/or services as the products.

The subject invention includes a system and method for using a computer and database to relate seemingly disparate items such as electronic components, industrial components, sub assemblies, assemblies and finished products; medical equipment and its associated services, define their quasi-fungibility and interchangeability for purposes of creating, trading and managing or hedging repurchase and reverse repurchase agreements (repo and reverse) and other collateralized and non-collateralized financial products; constructing, trading and managing or hedging indices based on such products; and pricing, originating, hedging, and trading derivative and other financial products based thereon. The subject invention includes a system and method for defining quasi-fungible and quasi-anti-fungible for diverse products and services using a computer, input and output device and a database. The subject invention includes relating components, components of sub assemblies, assemblies and finished products as well as the sub-assemblies, assemblies and finished products themselves, as well as services, events and outcomes to each other across diverse product lines. The subject invention contemplates relating such products, services, events and outcomes so that their independent quasi-fungible elements can be identified and defined in terms of sets of components, assemblies, sub-assemblies and finished products and/or services, events and outcomes, alone or in combination, that are interchangeable within a specific industry and across diverse industries and individual product lines and services within an industry. By using a database to assign degrees of quasi-fungibility to multiple goods, products and services ("products"), the subject invention encompasses a taxonomy for coding the products and or services, events and outcomes according to quasi-fungibility.

Additionally, the subject invention includes relating components of assemblies, sub assemblies and finished products as well as services to each other across diverse industries as defined by a database such as or similar to the National Initiative for Supply Chain Integration (NISCI) industrial classification index, insurance industry classification criteria and similar compilations of goods and services according to standard and non-standard criteria. The subject invention spans calculating the value of related components, sub-assemblies, assemblies and finished products and services such that their value including incidental costs is determined, as well as tying quasi-fungible services to quasi-fungible goods such that the bundle of such services is recognized by the appropriate industry as quasi-fungible. Further, such bundles may also be quasi-anti-fungible.

Related computing is also encompassed, including a warehouse system for storing physical items identified as quasi-fungible and for issuing receipts thereon and promoting the trading thereof.

The system and method of the subject invention can use at least one of a plurality of databases for defining related services, events, outcomes, components of assemblies, sub-assemblies and finished products (as well as the assemblies, sub-assemblies and finished products themselves) to each other across diverse product lines and industries such that their quasi-fungible elements can be defined to create sets of such goods and services that are interchangeable to a use. Each of these sets and subsets can be potentially used as an underlying or deliverable set of a financial instrument to support financial product development. The databases in conjunction with the subject invention can also be used to relate specific products and sub-products that are quasi-fungible and their associated quasi-fungible services, events and outcomes such that they can be interrelated further to hedge total (or close to total) product margins, enterprise values and the components thereof to structure mesoeconomic and macroeconomic swaps. The databases can also be used to relate specific products and sub-products that are quasi-fungible and their associated quasi-fungible services, such that they can be used in collateralized structures such as repo either singly or as bundles. Utilizing the databases, the sets and subsets defined above can be related such that the pricing of a product build can be related to the individual components, assemblies and subassemblies to define and hedge a profit margin for an entire product, especially when combined with service hedges and hedges for interest rates, currencies and other similar traditional hedge products. Thus, the subject invention permits defining elastic and rigid delivery sets for underlying derivative to structures such that the components therein replicate the returns of other futures and options (or not) to maximize or minimize tracking. The structuring of sets described above can be carried out such that they can be used as the basis for securities, funds, trusts, and similar products as well as in insurance. Specifically contemplated by the subject invention is the creation of null sets which can be used to create financial products such as, but not limited to, derivatives, insurance and contingent payoff products based on the non-occurrence or non-existence of any reference or alternative good, service, event or outcome, on either standalone or combination bases.

Regarding the financial products created according to the subject invention, the analysis of, and transactions involving, these financial products is also within the scope of the subject invention.

Per the foregoing and in accordance with the broad implications of the subject invention, it is now possible to relate seemingly disparate items such as electronic or industrial components, sub assemblies, assemblies and finished products, as well as services such as radiology, define their quasi-fungibility and interchangeability for purposes of creating, trading and managing or hedging repurchase and reverse repurchase agreements (repo and reverse) and other collateralized and non-collateralized financing contracts; construct, trade and manage or hedge indices based on such products; and price, originate, hedge, and trade primary, derivative and other financial products based thereon. The terms "product" or "products" shall include "good" or "goods", "service" or "services". Further, the invention shall be construed to apply to tangible and intangible items.

When creating financial products tied to a base of quasi-fungible underlying instruments with the subject invention, unlike with wheat, corn or sugars, the definition of fungibility is tied not just to substitution specifications but to specific use, specifications as they relate to the specific use, and on-going programs of certification. Thus, the commoditization process that is the holy grail of financial engineers is divorced from seeking homogeneity within the product class (a uniform type of DRAM or a single type of capacitor, for example) and is instead shifted to all of the different types of DRAM or other applicable components that will work within a specific application. The above eliminates or reduces the often cited reason for not developing financial products in many sectors: too much apparent variation and too much change.

Under the subject invention, financial product design for a futures contract, pricing or activity index, option, forward or swap would thus be constructed based on DRAM (or other products or services) as it applies to specific builds. This will allow for financial product development that is wide enough in certain applications, say personal computer and mobile phone production, to meet the minimum liquidity criteria to provide reliable hedging. Other users could still hedge in this circumstance, but the hedge would be more subject to tracking error.

The practical reality of service substitution is clear. Migration of industrial production services to competing countries is well described, such as in the case of textiles, cars, and other products. Even when there is to be extensive capital investment, such services can be highly mobile and subject to competitive bidding based on a range of advantages, including law, location, taxes, and currency controls. In fact standardization of these specifications has been a major drive of the World Bank and International Monetary Fund. Similar harmonization efforts are occurring throughout Europe. Given levels of standardization to norms within a particular industry, such services can serve as sets for financial product development to hedge the risk components of the manufacturing and service base regardless of where they are located.

One embodiment of the subject invention for a set of services can be illustrated by the cost driven migration of "basic" legal services, first from high cost cities such as New York to lower cost cities such as Houston and Minneapolis, and even from the United States entirely to other English speaking countries, such as Australia which has a similar juris prudence. The contracting for such services requires the "oversight" by a U.S. based attorney, a concept not entirely different from engineer certification of substitutable parts. The emerging set of suitable firms would comprise a set of legal services from which sets could be created depending on a specialty or a specific need such as multilingual warranty documents. Index development from these types of sets, as well as derivative products based on them, are within the scope of the subject invention regarding financial product development.

Similarly, migrations of data processing for the insurance industry to data centers in Ghana, and of software development—at first to India and now to other countries such as Vietnam—are additional examples of service substitution. Native language would play a role in the development of certain sets, but not in others, ranging from high (legal) to middling (software) and low (typesetting) importance.

Envision a circumstance where an x-ray taken in New York City is read by board certified radiologist in another location—even outside the United States—as a means of providing cost sensitive standardized services. In fact, x-rays are often sent to remote locations in telemedicine programs as a matter of increasing routine. Complex surgical procedures, while not common, have been successfully performed with robotics from remote locations. One can thus contemplate the folding of dispersed medical services into US insurance company Diagnosis Related Group (DRG) programs for reimbursement, not just by local community standards, but by performance certification in relation to place as well. DRG protocols, which homogenize payment and medical services, provide standardization protocols for payments but do not define the basic elements for the creation of useful hedge products for inpatient medical services. Ambulatory Visit Group (AVG) protocols provide similar price and service standardization for medical care applied to out patients with similar result. Similarly, standardization protocols for Durable Medical Equipment (DME), produces a similar result in an infrastructure aspect of medical care. Under the current invention, elements of these classification systems for payment can be combined in aggregates to define sectors and components of medical care which can be hedged and traded. Under the invention herein, financial products for bulk buyers and sellers of medical services become a reality, with substitution sets defined by locale, level of certification and supply. A company health insurance plan can consult the database to hedge selected service needs above actuarial minimum amounts by forward contracting or using options to buy required medical services as they are defined in terms of interchangeability. This also allows for the creation of broad indices and sector subsets of at least some important sectors of medical care (starting with less geographically sensitive ones, such as radiology). Practical indices will allow for the creation of additional hedge products and this in turn will allow insurance companies to create additional insurance and re-insurance products. But in the absence of tradable hedges, this leaves the un-hedged loss potential as effectively unlimited, a major deterrent to many participants. Insurance derivatives as proposed under the current invention will have associated with them certain underlying tradable instruments, alleviating at least part of the aforementioned impediments.

Given a definition for the interchangeability of services and the capacity to create databases of such quasi-fungible services, sophisticated financial product development using the methods of the present invention are also contemplated herein. Thus, a hedge for the build of electronic durable medical equipment (DME) can be combined with hedges for reimbursement of the usage of the DME as well as the services tied to it (radiologist interpretation, for example). Such increasingly complete hedge capability is a requirement for the construction of meso- and macro-economic swaps as discussed below.

In yet another embodiment of the subject invention, a computer manufacturer could approach a dealer in computer parts for assistance in pricing and hedging a build of any Tier 1 brand of personal computer. The dealer would look at a list of parts by category and number, consult the databases, and determine sets of candidate alternative parts. The designated parts would be processed through the subject invention to yield a set or sets of candidate alternative parts. From this list of sets of parts derived from the quasi-fungibility sets (which can also be called a quasi-fungible basket), a forward hedge, whether discrete or amortizing to a production drawdown of inventory, would be priced based on the specific parts and their quasi-fungible alternatives in the quasi-fungible basket. The dealer could then offer to the manufacturer a price hedge for an entire computer build or simply sub-segments thereof (such as Form A mother boards) as the dealer and manufacturer agree. The dealer can hedge his forward commitments with offsetting positions in the cash market, with other forward dealers, and parts manufacturers to name just a few possibilities using repo mechanisms possible under the subject invention.

Further, in another embodiment of the subject invention, shared inventory information and drawdown algorithms allow dealers and manufacturers to borrow specific parts or groups of parts for financing under "repo" and "reverse repo" regimes according to quasi-fungibility. Such "repo" and "reverse repo" borrowing and lending would, under this embodiment, allow for the establishment of true short positions by market participants.

The establishment of such short positions will add a liquidity dimension to the market place that is currently lacking.

Under this embodiment, a dealer wishing to guarantee a manufacturer a price on excess part inventory liquidation at the end of a build (or against specification revisions) can sell equivalent parts in the cash market against the forward commitment to buy the excess inventory. Such a dealer commitment could alternatively take the form of an option to purchase or sell inventory in the future which the dealer would be able to hedge in the cash market with a short or long position in any interchangeable cash component in the agreed hedge set using standard methodologies developed for trading options on securities and other more standard financial products.

An "option" is defined as the right, but not the obligation, to buy or sell a specified item or set of items under specified terms at some future date. In the instant invention, the flexibility offered by general option structures will allow users of the invention to provide high economic value to hedgers at reduced risk, if properly implemented.

The size of the envisioned hedge sets of fungible products and services (and their assemblies and sub-assemblies) vary in the subject invention by the type of goods and/or services, events and outcomes, but allow for creation of subsets of products applicable to other uses. The sets for mobile phones will also include subsets with some overlap for avionics applications, for example. Variations in set size and application overlap enable complex arbitrage between the various sets and differences in composition between them. Further, combinations of the sets contemplated in the present invention with more traditional hedge products such as interest rate, currency and metal financial products should allow for hedging of much, even if not all, of the risk inherent in the production of a computer or other device. Thus, sets for motherboards (e.g., Form A), hard drives (with subsets for the individual components thereof), DRAM, cables, connectors, capacitors, diodes and circuit boards, can be combined with a set, or group of sets, for intangibles such as the sets for quasi-fungible labor and quasi-fungible legal expenses, and then further combined with capital cost hedges (such as interest rate and currency products), insurance hedges, and catastrophe hedges (such as earthquake and fire insurance) to create hedges of important risk components contained in production runs for many product categories.

Thus, in another embodiment of the subject invention, a futures exchange seeking to provide a hedge product can consult the database to determine sets of quasi-fungible parts (or services, events and outcomes) that can either individually or collectively constitute an economically important set, whether based on dollar volume of trade, labor and even political impact. For example, a set of capacitors, to name one part class, can be identified as quasi-fungible for products ranging from mobile phones, computers, radar, and navigational equipment. The economic base of this set, which could include tantalum and ceramic capacitors, would likely be of greater economic significance for hedging purposes (and thus likely more successful) than alternative single-type capacitor financial product structures. Further, such a deliverable set (or pricing set) enables smaller hedge contracts (e.g., specific to mobile phones). Pricing variations and independent movement of individual components of each set and subset of the hedge product allow for elaborate arbitrage, further increasing overall market liquidity.

In financial products related to items such as bonds, the set of deliverable instruments underpinning a futures contract, for example, contains multiple deliverable issues. The rationale for such a deliverable set was to prevent price manipulation of the derivative through control (or other shortage) of a single (or limited) cash instrument. This set usually contains one cheapest-to-deliver item. Outside of US Treasury instruments, the cheapest-to-deliver is often the least desirable component of the deliverable set, often as a result of credit in the case where there are multiple credits contained in the set. The capacity to deliver undesirable instruments has made difficult some derivative contracts, notably Government National Mortgage Association (GNMA) bond contracts and municipal bonds. In the case of deliverable sets for many of the product classes in the subject invention, consumption of a certified good (and or service, as well as termination of an event or resolution of an outcome) will reduce or eliminate dumping aspects that can mar other financial products that have deliverable sets. The possibilities for dumping with services are more complex and credit will be important.

Various "total product" hedges (such as computers, mobile phones, and radar) made by a single manufacturer enable hedges approaching enterprise hedges. Under the subject invention, returns implied in hedges for various component products and service products, alone or in tandem with finished goods hedges, can be linked to industry, economy subsector, or economy-wide production indices to produce practical methods for isolating or assuming risk and the associated returns in sector hedges and swaps.

The sum of product hedges in an industry built from the individual hedges on tangible and intangible goods and services allows for the creation of mesoeconomic hedges, which would hedge the sector between microeconomic hedges and macroeconomic hedges. Mesoeconomic hedges, when combined with more traditional micro-hedges, such as those for interest rates, raw and refined materials, equities and equity indices, and currencies, will foster the development of viable macroeconomic hedges.

Thus, in another embodiment of the subject invention, a trader/hedger assumes a risk profile reflecting some proportion of production of a given product using the described set hedge method as part of the "book". The trader can then swap or trade the return contained in the hedges with another market participant willing to assume the opposite position on the total return on industry production or a sector thereof including, or not, the service sectors applicable thereto. Thus, a dealer might have a short position in generic computer components and products which he/she hedges with an offsetting position in the stock of one or more Whitebox Manufacturers or an index of Whitebox manufacturers. Hedge portfolios (a.k.a. hedge books) such as the ones described herein will, when combined with swap books in other products, gradually move towards mirrors of Gross Domestic Product, (GDP) or similar indices and sub-indices thereof. This migration will facilitate natural takers of both sides of the hedge, the current lack of which is a major impediment to development of hedge products based on such indices. Hedges of this nature will likely be of interest to managers of stock portfolios.

Such arbitrage is ideally suited to computer-based trading systems because the arbitrage is complex and requires moment-to-moment pricing calculations, which are based not just on the individual components, but on such issues as logistics as well.

By discussing electronic components, subassemblies and assemblies, including intermediate and finished products, the idea of rationalizing parts by their application in building subassemblies, assemblies and finished goods is by no means to be construed as being limited to this area alone; entire manufacturing and processing industries that are currently without either a rationalization process for components and/or services or financial products for hedging price risk and financing inventory are hereby opened as well. The products and services mentioned herein are only for illustrating the system of the subject invention. Linking parts or other items by internal part numbers, manufacturers' part numbers, universal part numbers, SKU numbers or Boolean structured comparisons of performance and physical specifications are just illustrative of the taxonomic schema possible for creating the sets of quasi-fungible items contemplated in implementing the subject invention. Because vulnerability to production shut downs for lack of a single part or service can occur in almost any industry, but especially in a production line industry, the broad application of the subject invention is evident.

BRIEF DESCRIPTION OF THE DRAWINGS

The invention, and its method of operation, together with additional objects and advantages thereof, can be better understood by reference to the following detailed description considered in connection with the accompanying drawings wherein:

FIG. 8 is a computer screen shot of a graphical user interface of a display of search constraints and emphasis scoring function E input screens;

FIG. 10 is a computer screen shot of a graphical user interface of a return set of radiology service alternatives $\zeta$ for a Reference $\xi$;

FIG. 19 shows the detailed specifications on the reference amplifier and resistors for the audio low pass filter of FIG. 18;

FIG. 20 shows the detailed specifications for the reference capacitors for the audio low pass filter of FIG. 18; and FIG. 21 is a sample output of the subject invention of candidate alternatives for reference parts in the audio low pass filter of FIG. 18.

DETAILED DESCRIPTION OF PREFERRED EMBODIMENTS

Figure 1:
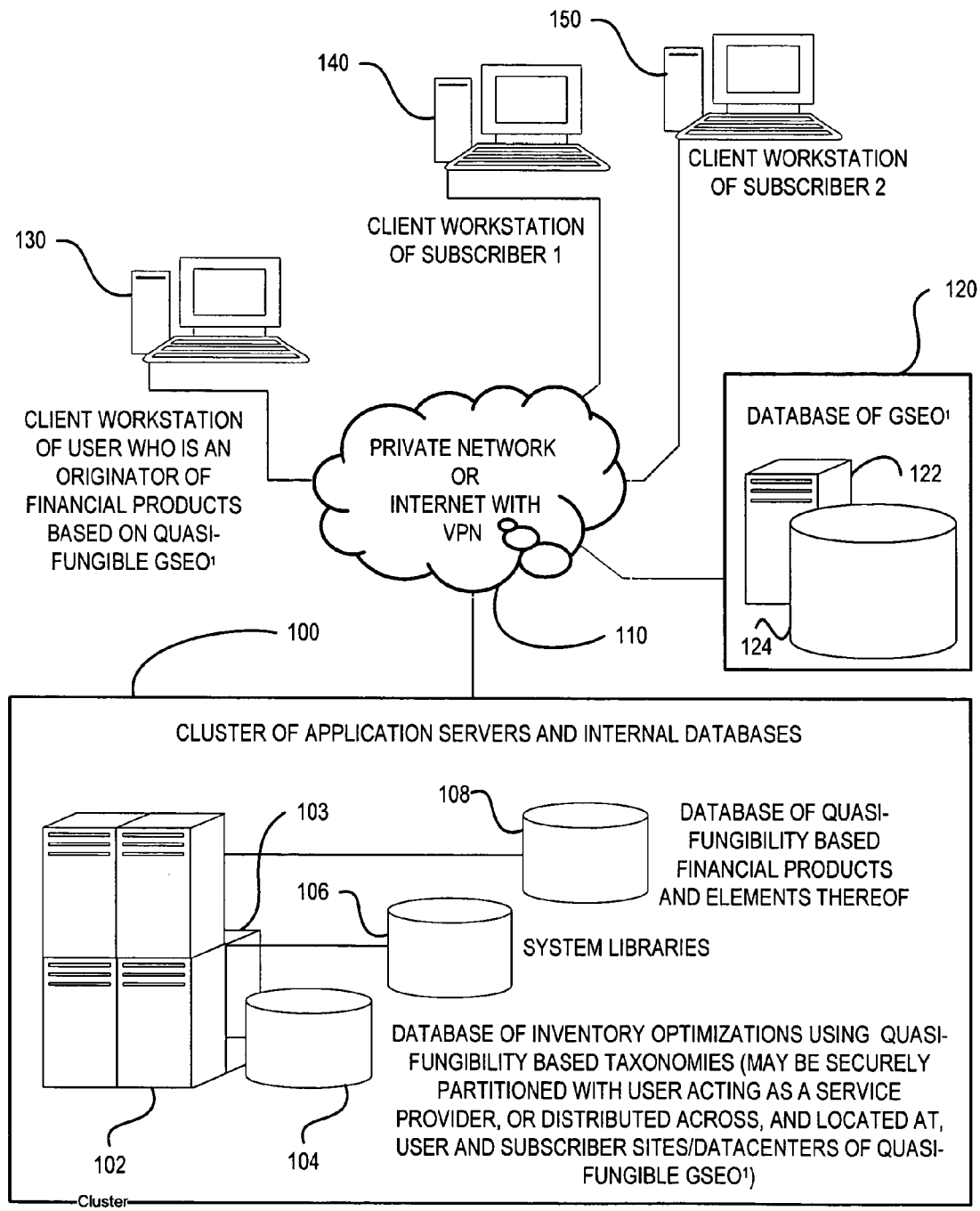
FIG. 1 is a depiction of a non-limiting example of the hardware components in accordance with the system and method of the subject invention.

A non-limiting example of the hardware components in accordance with the system and method of the subject invention are shown in FIG. 1.

The subject invention is preferably implemented using a client-server architecture shown in FIG. 1 where the clients communicate with the server and databases by means of either a secure private network or by means of VPN-secured Internet connectivity 110. The clients are allocated to a user who is an originator of financial products based on quasi-fungible GSEO 130 and a plurality of subscribers 140 and 150. In at least one embodiment, the subscribers may be, but are not limited to, corporate treasurers, purchasing agents and procurement managers and more than one subscriber-user within a subscription is implied and contemplated. The depicted network is preferably implemented using Pentium 4 class Intel central processor based PC and laptop computers having at least 512 MB of random access memory, a 20 GB hard drive and Internet/network connectivity known in the art as clients using the Microsoft Windows™ Operating System. Client software is preferably implemented using Microsoft Visual C++.Net™, preferably built using the Microsoft Visual Studio.Net™ Integrated Development Environment (IDE). The application servers are clusters of Sun Microsystems Sun Fire™ servers 102 using the Solaris™ Operating System. Application server software is preferably implemented using J2EE or C++ depending upon the preferences and skills available to a system operator. Because large portions of the application are vector and matrix multiplication intensive, hardware acceleration by means of an array processor would be part of a preferred implementation for large scale systems 103. The plurality of databases referred to in FIG. 1 as internal databases, which includes a database of inventory optimizations using quasi-fungibility based taxonomies 104, a database of system libraries 106, and a database of quasi-fungibility based financial products and elements thereof 108, are collocated with the cluster of application servers. The database of inventory optimizations using quasi-fungibility based taxonomies 104 may either be centralized and collocated with the cluster of application servers and securely partitioned for each subscriber, or physically distributed to respective subscribers' data-centers if required by a subscriber's scale, MIS/IT policies, security needs, for example. Databases of goods, services, events and outcomes (GSEO) 120, including the database servers 122 and data storage 124, may be collocated with the application servers or located remotely, and use XML data formats.

Figure 2:
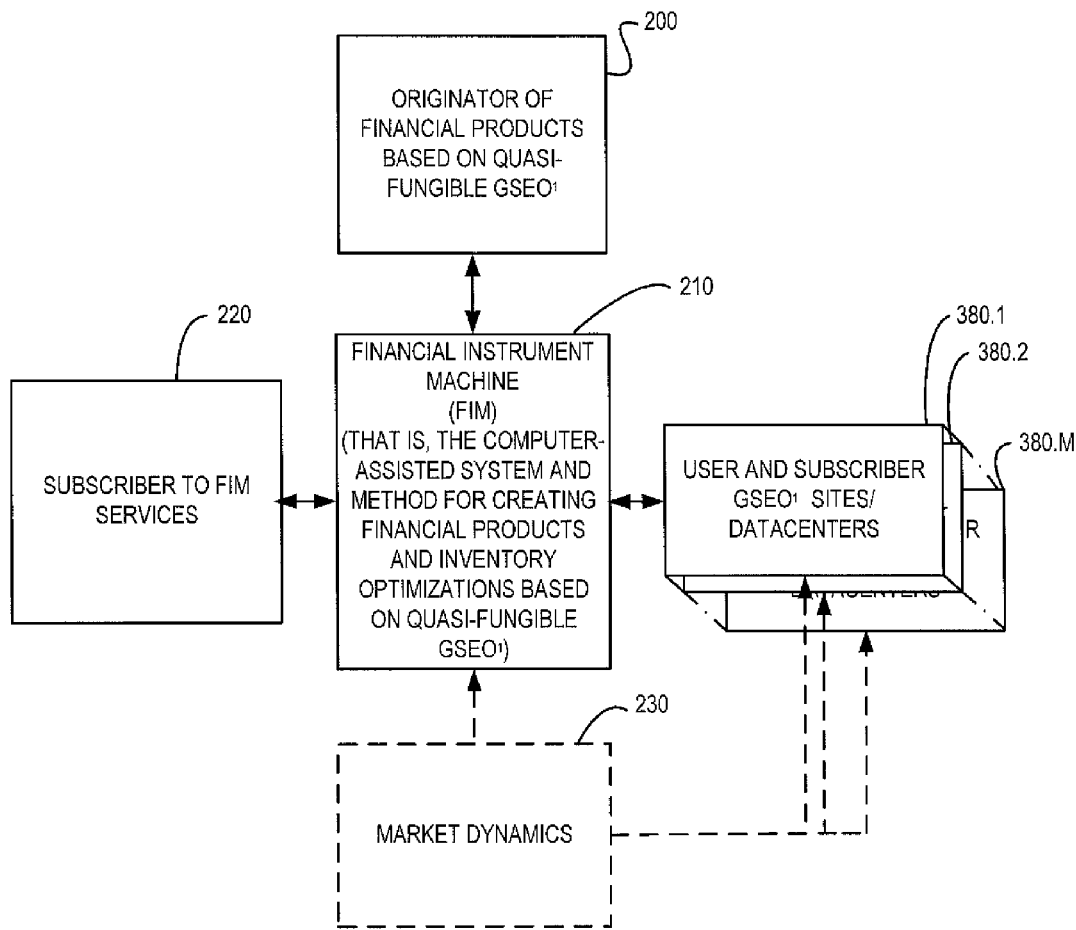
FIG. 2 is an upper level block diagram of the logic overview of the subject invention.

Next referring to FIG. 2, the logic overview of the subject invention is shown and described. Originator of Financial Products Based on Quasi-Fungible Goods/Services/Outcomes/Events (GSEOs) 200 uses the Financial Instrument Machine (FIM) (Computer Assisted System and Method for Creating Financial Products and Inventory Optimizations Based on Quasi-Fungible GSEOs) 210 to create quasi-fungibility based financial products and inventory optimizations. Subscriber 220 to Financial Instrument Machine Services uses the Financial Instrument Machine (FIM) 200 to have symbiotic inter-relationship with FIM users and other subscribers to optimize inventory and benefit from primary and ancillary services related to financial product development, utilization and inventory optimizations. Market Dynamics 230 consists of market data flows containing prices, corporate actions, news and related information of interest to users and subscribers as part of their decision making and evaluation protocols. Such input is tied to the Financial Instrument Machine 200 and to the plurality of user and subscriber GSEO sites/datacenters 380.1, 380.2, 380.M of FIG. 3.

Figure 3:
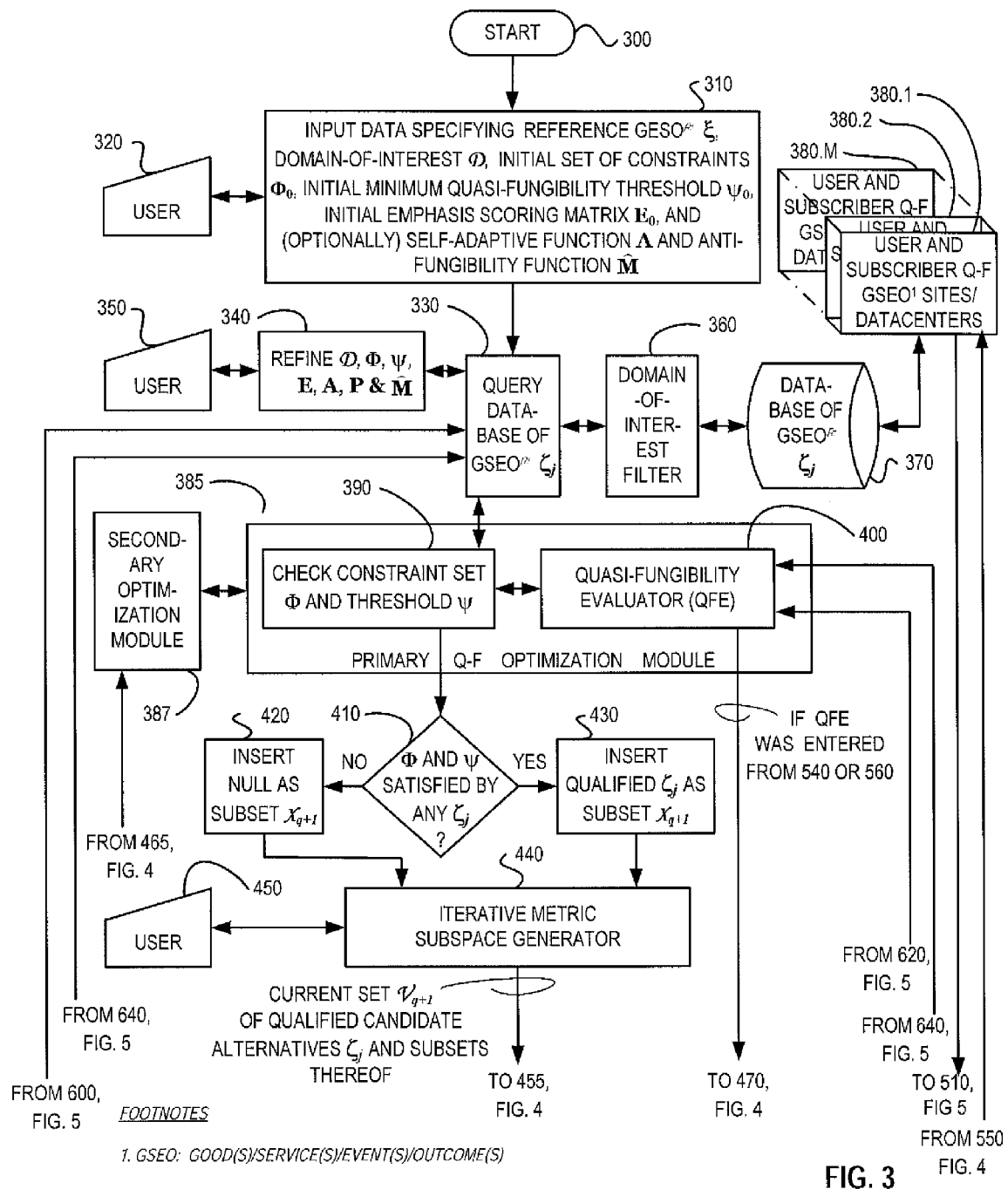
FIG. 3 is the first of three more detailed logic schema of the financial instrument machine of the subject invention.

Next referring to FIG. 3, which shows a more detailed logic schema of the subject invention, are user and subscriber GSEO sites/datacenters 380.1, 380.2, 380.M provide physical and virtual storage, documentation, manipulation and supply of goods/services/events/outcomes. Not all events and outcomes are under user or subscriber control or creative capability, though some clearly would be. Examples not meant to be limiting of events under a user control could be a strike, but an earthquake probably would not be user or subscriber controlled. The outcome of a strike and earthquake both might be a shortage of supply, so it follows that in the event of a strike at least one outcome is under partial user influence and control (but not totally since human hoarding behavior is difficult to predict) while the same outcome in the event of an earthquake is not under user or subscriber control. The nature of items in a site for physical and virtual storage will vary widely by user and subscriber type and a particular client workstation within an organization. Thus, in one preferred embodiment, among a non-limiting plurality of possible subscriber-users (hereafter "subscribers") who gain access by subscription and similar "term- and condition" restrictions are Corporate Treasurers, Procurement Managers, Purchasing Agents, Inventory Control Specialists, Product Engineers and Developers, Union Organizers, Database Managers, Insurers, and Actuaries.

Figure 6:
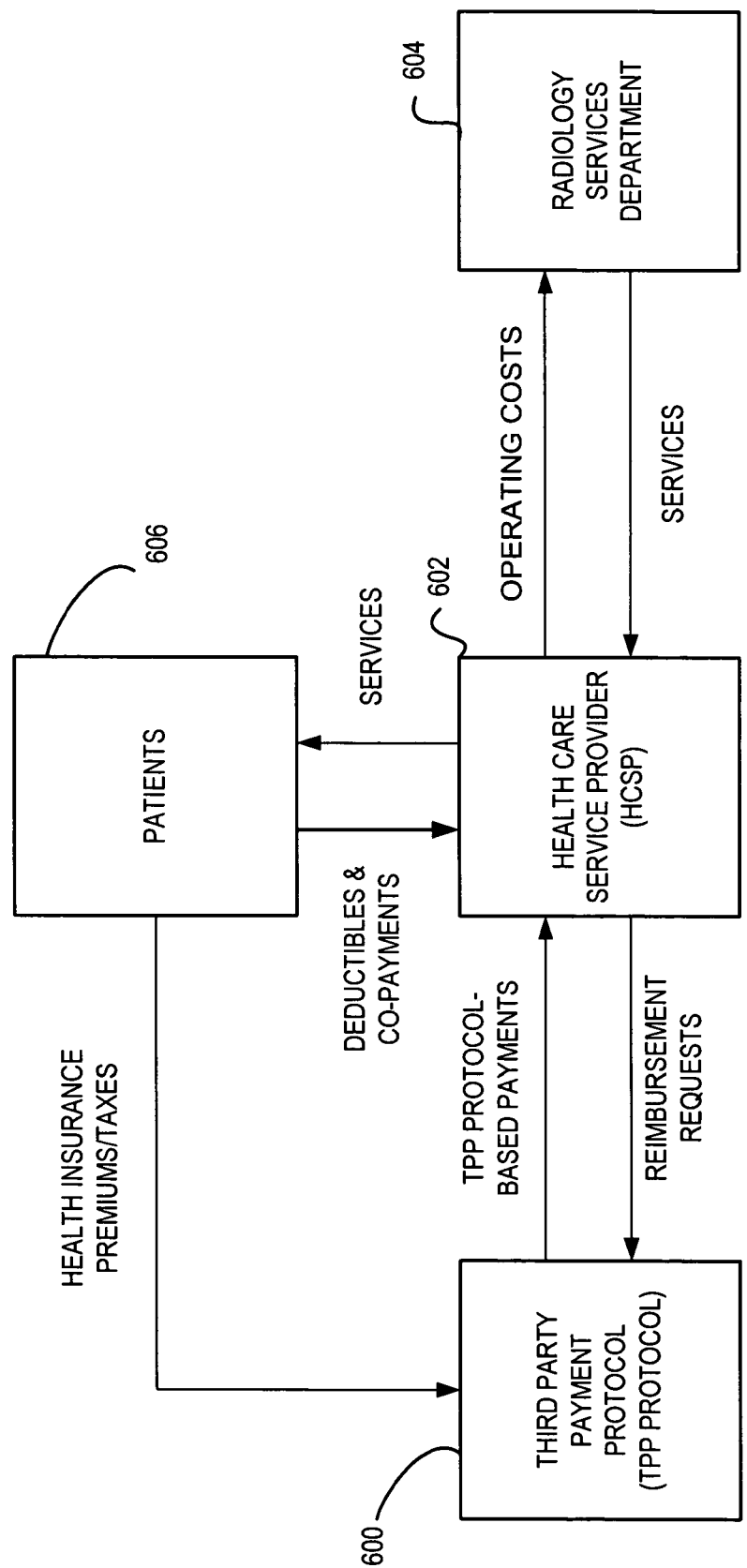
FIG. 6 is a cash flow schematic for radiology services at a health care services provider implementable with the subject invention.

The computer-assisted system and method for the Financial Instrument Machine 210 starts at 300, with a user inputting data 320, that specifies a Reference Good/Service/Event/Outcome (GSEO) $\xi$, along with a domain-of-interest identifier $\mathcal{D}$, an initial constraint set $\Phi_0$, an initial minimum quasi-fungibility threshold $\Psi_0$, an initial emphasis scoring matrix $E_0$, and (optionally) a Self-Adaptive Conditioning Operator A and Quasi-Anti-Fungibility Conditioning Operator $\hat{M}$ at 310. One possible Graphical User Interface (GUI) to facilitate this selection process is illustrated in FIG. 6, for phi and E as discussed in detail below.

The Financial Instrument Machine 210 queries at 330 a database of goods, services, events and outcomes (GSEO) 370 through an intervening domain-of-interest filter 360 which focuses a search and a retrieval to a domain-of-interest $\mathcal{D}$. In one preferred embodiment, a search and retrieval could be a domain-of-interest comprising all capacitors, or all tantalum capacitors, or all tantalum capacitors designed for application in mobile telephone handsets, or all tantalum capacitors designed for high altitude avionics. A database of GSEO(s) is also referred to in this document as a database of candidate alternatives.

The database 370 of candidate alternatives is connected to user and subscriber sites/datacenters of quasi-fungible GSEO(s) 380.1, 380.2, 380.M. In this manner, a plurality of databases of candidate alternatives can be kept current to reflect market usage 230 FIG. 2, financial product development 210 FIG. 2 and inventory optimizations using quasi-fungibility based taxonomies 550 FIG. 4.

A user 350, may direct a database query process by interactively adjusting at 340 a domain-of-interest identifier $\mathcal{D}$, a constraint set $\Phi$, minimum quasi-fungibility threshold $\Psi$, Self-adaptability Reference Conditioning Operator A, Programmability Reference Conditioning Operator P and Quasi-anti-fungibility Reference Conditioning Operator $\hat{M}$ so as to produce a manageable number of evaluated and qualified candidate alternative(s) $\zeta_j$ at an output of a quasi-fungibility evaluator 400.

After a Reference $\xi$ is specified, a candidate alternative evaluation process begins by first checking satisfaction of constraint sets $\Phi$ and threshold $\Psi$ at 390 and then evaluating quasi-fungibility at 400 for each of initially unevaluated quasi-fungible candidate alternatives $\zeta_j$ retrieved from a database at 330. Blocks 390 and 400 together comprise the Primary Quasi-Fungibility Module 385 further discussed below. The Primary Quasi-Fungibility Module 385 may optionally access the Secondary Optimization Module 387. This process either qualifies or disqualifies each retrieved quasi-fungible candidate alternative $\zeta_j$ for further processing. Each qualified candidate alternative, either alone or in or combinatory subsets with others, forms a building block for a financial product and/or an inventory optimization. (Reference $\xi$ and null subsets may be inserted as additional building blocks as needed, as is discussed in reference to user 450 below.) In at least one preferred embodiment of the subject invention a quasi-fungibility measurement function $f(\xi,\zeta_j)$ may take either of two general forms relating to use or application:

I. A quasi-fungibility measurement function based on multi-dimensional distances: $f(\xi,\zeta_j)=1/(1+d)$, where $$d = \left(\sum_{i=1}^{N} |\xi_i - \zeta_{ij}|^u\right)^{\frac{1}{u}}$$

d is a multi-dimensional distance function which is either Euclidean in the case in which u=2, or non-Euclidean in cases in which u≠2, where $\xi$ is a vector representation of a Reference item comprised of uses and specifications $\xi_1, \xi_2, \ldots, \xi_N$, and $\zeta_j$ is a vector representation of a $j^{th}$ good/service in a database which is comprised of uses and specifications $\zeta_{1j}, \zeta_{2j}, \ldots, \zeta_{Nj}$.

II. A quasi-fungibility measurement function based on the $l_2$ norm:

$$f(\xi, \zeta_j) = \left(\frac{\xi^T \zeta_j}{\|\xi\|\|\zeta_j\|}\right)$$

Further, quasi-fungibility measurement functions used in a preferred embodiment are able to measure the fungibility between a user-conditioned or modified vector representation of the Reference and an unmodified vector representation of a $j^{th}$ candidate alternative good/service/event/outcome in the database, or even a modified vector representation of the potential candidates. Vector representations of a user-conditioned or modified Reference, with or without modifications to a vector representation of a $j^{th}$ candidate alternative good/service/event/outcome in the database, are used to direct system algorithms to produce financial products and inventory optimizations created around $\zeta_j$ that have special properties. These properties include, depending upon a user-conditioning of a Reference or modifications to both a Reference and candidate alternatives, the current (and possibly revised) emphasis on certain specifications/uses being scored by the user (see Glossary concerning $f(E\xi, E\zeta_j)$, a form of quasi-fungibility measurement function when an Emphasis Scoring Function E is used). These properties also include, depending upon a user-conditioning of a Reference, financial products and inventory optimizations in which the $\zeta_j$ are highly quasi-fungible with certain required specifications/uses where a Reference $\xi$ has been modified to reflect special circumstances (e.g. rain, floods, shortage).

Further regarding Primary Quasi-Fungibility Optimization Module 385, Check Constraint Set $\Phi$ and quasi-fungibility threshold $\Psi$ 390, and Quasi-Fungibility Evaluator (QFE) 400, after checking constraints per constraint set $\Phi$ and threshold levels via quasi-fungibility threshold $\Psi$, for quasi-fungibility with respect to the Reference $\xi$, quasi-fungibility is then evaluated for each of the potential candidates $\zeta_j$ retrieved from a database via a query at 330 on a first quasi-fungibility sort. Any quasi-fungible candidate alternatives which either do not meet said constraints or are insufficiently quasi-fungible (namely, have fungibility measures with absolute values less than $\Psi$), are disqualified from further processing or candidacy for becoming the basis for a financial product and/or inventory optimization. Standard optimizations of candidate alternatives other than quasi-fungibility optimizations can be performed optionally at user direction in Secondary Optimization Module 387.

A decision is made at 410 as to whether any candidate alternative under consideration satisfies both Constraint Set $\Phi$ and Quasi-Fungibility Threshold $\Psi$. If the decision is "Yes", those candidate alternatives are defined as qualified and grouped as subset $\chi_{q+1}$ at 430 and input into an Iterative Metric Subspace Generator 440. If the decision is "No", those candidate alternatives are defined as unqualified and $\chi_{q+1}$ is set equal to a null subset at 420 and input into Iterative Metric Subspace Generator 440. (Note: The set $\psi_0$ where $\psi_0=\emptyset$, the null set, is typically entered into the iterative metric subspace generator as part of initializing the system. This is invariant as to whether or not in iterations greater than 0, the initialization, a return of sets from a search for candidate alternatives yields no qualified candidates and therefore produces a null set.) An iterative metric subspace generator typically contains all prior sets ($\psi_q, \psi_{q-1}, \psi_{q-2}, \ldots \psi_{q-n}$) and always receives set $\chi_{q+1}$ as an input just before being invoked (entered). With a collection of all prior sets $\psi_q$, and $\psi_{q-1}$ for l=1, 2, . . . , n and with user input 450 as to which set operations are to be performed, an iterative metric subspace generator produces and outputs set $\psi_{q+1}$ of qualified $\zeta_j$ and combinatory subsets of $\zeta_j$ in a current set $\psi_{q+1}$ of quasi-fungible candidate alternatives as candidates for creating financial products and inventory optimizations.

After producing and outputting set $\psi_{q+1}$, the subject invention sets up an iterative subspace generator for a next iteration by performing a set union operation on the current $\psi_{q+1}$ with all prior sets including the previous set $\psi_q$.

Figure 4:
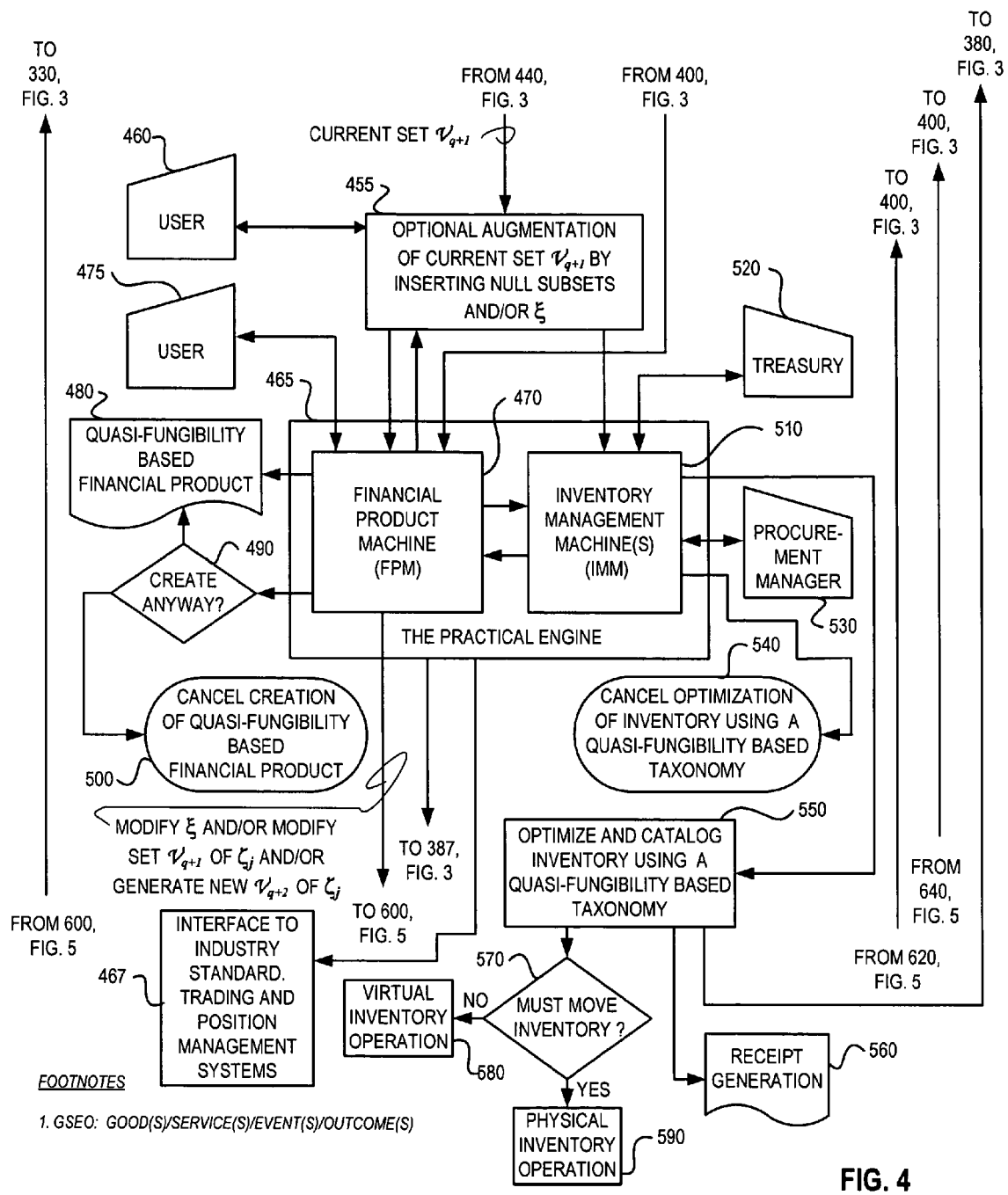
FIG. 4 is the second of the three more detailed logic schema of the financial instrument machine of the subject invention.

Next referring to FIG. 4, a continuation of the logic of FIG. 3, an iterative metric subspace generator functions to generate sets comprised of qualified quasi-fungible candidate alternatives and combinatory sub-sets of qualified quasi-fungible candidate alternatives to a Reference $\xi$ that serve as inputs to at least one Financial Product Machine (FPM) 470 and at least one of a plurality of Inventory Management Machines (IMM) 510 via a process that a user 460 can select to augment the current set $\psi_{q+1}$, by inserting null subsets and Reference $\xi$ at block 455. Tailoring of Financial Product creation with the FIM 210 of FIG. 2 may require reprocessing through block 455 for augmentation as needed. At each iteration of an iterative metric subspace generator, a set of qualified quasi-fungible candidate alternatives and combinatory sub-sets thereof is designated as the current set $\psi_{q+1}$ where q is always the iteration number minus 1. Therefore, after the first iteration, q+1=1 and after the second iteration q+1=2, and so on.

Under the direct control of the user 450 at FIG. 3 and shaped by the user's personal judgments, the Iterative Metric Subspace Generator 440 at FIG. 3 (IMSG) forms sets $\psi$ of candidate alternatives $\zeta_j$ (and combinatory subsets of candidate alternatives $\zeta_j$) to a Reference $\xi$. These sets $\psi$, if accepted by the user, are used to form quasi-fungible financial products as described above and immediately below. In one preferred implementation, the operation and logic of the iterative metric subspace generator generates sets of quasi-fungible candidate alternatives $\zeta_j$, namely sets $\psi_{q+1}$, $\psi_{q+2}$, $\psi_{q+3}$ ..., from user defined combinations of standard logical operations (e.g. union, intersection and complement) on current candidate alternatives $\zeta_j$ in combination with any (and potentially all) previous candidate alternatives $\zeta_j$ contained in a set $\psi_p$, where set $\psi_p$ is a logical union of all previous candidate alternatives $\zeta_j$ input into an iterative metric subspace generator since the start of a current user session, and where all candidate alternatives $\zeta_j$ in $\psi_p$ were sufficiently constrained with respect to the set of over-riding constraints $\Phi_i$ and were sufficiently quasi-fungible with respect to Reference $\xi$, meaning $|f(\xi,\zeta_j)|=>\Psi_i$, according to the iteration i in which they were input to an iterative metric subspace generator. Because of the iterative nature of an iterative metric subspace generation process, after the current set of candidate alternatives $\psi_{q+1}$ is generated and is sent on for further processing, a copy of it is included in the collection of all the previous sets of candidate alternatives, namely the set $\psi_p$. In addition, $\psi_0$ is initialized as $\chi_0=\emptyset$ (the null set).

The output of an iterative metric subspace generator 440 of FIG. 3 is current set $\psi_{q+1}$ which is input to the Financial Product Machine 470 and one or more Inventory Management Machines 510 via block 455. Depending upon an application, information describing current set $\psi_{q+1}$ may be made available to the at least one FPM 470 and at least one IMM 510 simultaneously, or a user may control if, when, and under what circumstances information describing current set $\psi_{q+1}$ is made available to one or more of a plurality of IMMs 510.

Among the non-limiting functions of a Financial Product Machine 470 contained within the Practical Engine 465 are:
(A) Create one or more financial products from quasi-fungible goods/services/events/outcomes using quasi-fungibility measurements and optimizations with financial algorithms modified to account for quasi-fungibility measurements,
(B) Create one or more financial products based on qualified quasi-fungible candidate alternatives $\zeta_j$, from a at least one of a plurality of given subscriber or user Inventory Management Machines, using a current set $\psi_{q+1}$ (provided that a current set $\psi_{q+1}$ is deemed acceptable),
(C) Create one or more financial products based on qualified quasi-fungible candidate alternatives (assets) $\zeta_j$, from some other subscriber's Inventory Management Machine, using a current set $\psi_{q+1}$ (provided that a current set $\psi_{q+1}$ is deemed acceptable by a user),
(D) If a current set $\psi_{q+1}$ is deemed unacceptable by a user, to choose whether or not to modify a current set $\psi_{q+1}$ of quasi-fungible candidate alternatives $\xi_j$ and combinatory subsets of $\zeta_j$ and condition a Reference $\xi$ by a method then selected manually or automatically at block 601 of FIG. 5, and,
(E) If a current set $\psi_{q+1}$ is deemed unacceptable by a user, it is put to a decision process 490 whether to create a quasi-fungibility based financial product anyway, even if a current set $\psi_{q+1}$ has been deemed unacceptable by a user at block 480, or instead cancel a process of creating a quasi-fungibility based financial product altogether at block 500.

Still referring to FIG. 4, practical application of a Financial Product Machine 470 for at least one preferred embodiment is detailed in a sequence of various examples of how financial products and inventory optimizations are created for two GSEOs, Radiology Services and Electronic Components, are presented at the end of this section.

User control 475 of a Financial Product Machine 470 consists primarily, but not necessarily exclusively, of:
(A) Inspecting a current set $\psi_{q+1}$ and determining whether all, some or none of a set of quasi-fungible candidate alternatives $\zeta_j$ and combinatory subsets of $\zeta_j$ in a current set $\psi_{q+1}$ are acceptable for creating financial products and inventory optimizations and directing user controlled optimizations of Reference $\xi$ and alternative $\zeta_j$ candidate or otherwise.

The Outputs of Financial Product Machine 470 are quasi-fungibility based financial products 480.

The function of one or more Inventory Management Machine(s) 510 contained in the Practical Engine 465 in at least one preferred embodiment is to:
(A) Optimize and catalogue inventories using quasi-fungibility based taxonomies 550. In one preferred but not limiting embodiment, inventories of goods/services/events/outcomes are virtually or physically organized according to their quasi-fungibility as defined by a user, which organization facilitates the use of said inventory in the design, development and hedging of quasi-fungibility based financial products, and serves as a foundation for the generation of inventory receipts, whether actual or virtual 560. In at least one additional preferred embodiment, a subscriber IMM may function without an FPM for quasi-fungibility and quasi-anti-fungibility-based optimizations as part of independent classification and identification processes.
(B) Cancel a process of optimizing of inventories using quasi-fungibility based taxonomies 540 is implemented.

Practical application of at least one of a plurality of Inventory Management Machines 510 for at least one preferred embodiment is detailed in a sequence of various examples of how financial products and inventory optimizations are created for GSEOs in the non-limiting examples below.

User interaction and control of respective one or more Inventory Management Machine(s) 510 which may have multiple view permissions within a single machine can vary widely from subscriber to subscriber and within a user organization. In one preferred embodiment to an Inventory Management Machine 510 subscriber-users are (1) members of a Treasury department 520 of a subscriber company using an Inventory Management Machine 510, and (2) members of a Procurement Management department 530 of the same subscribing company using the same Inventory Management Machine 510 through another client workstation. It will be evident to one skilled in the art that, in addition to the architecture shown in FIG. 1, IMM 510 to FIM 210 interactions and relationships in at least one preferred embodiment can also be across a completely distributed network involving a plurality of independent and competing users and subscribers operating informally in an over over-the-counter type of structure as well as in highly structured exchange environments. The two types of users of an Inventory Management Machine 510 described herein are not to be confused with a "user" (at 320, 350, 450, 460, 475, 610, 630 and 650) who, in this description of a preferred embodiment, may be an originator of financial products such as a Financial Engineer or Dealer. There can be interchangeability of roles for users and subscribers depending upon the subscription type and a given subscriber's need to originate financial products and optimize inventory.

In certain circumstances, an originator of products will have need of the IMMs, 510 as is described in the examples, to design and hedge financial products. A Treasury department's 520 interactions with, and controls over, an Inventory Management Machine 510 in one preferred embodiment might consist of a treasurer seeking to maximize profit potential through contracting for, and constructing portfolios of, repurchase and reverse repurchase agreements, options, forwards and swaps, (among other financial products) based on quasi-fungible inventory, as is discussed in at least one example below. The Procurement Management department's 530 interactions with, and controls over, an Inventory Management Machine 510 in at least one preferred embodiment might consist of coordinating treasury operations and inventory management, optimizing purchases through possible negotiation between multiple suppliers of quasi-fungible inventory, reduction of shortage pressures through the identification of candidate alternatives and controlling inventory age with a quasi-fungible set and inventory swaps.

Outputs of one or more Inventory Management Machine(s) 510 can be optimizations of inventories using quasi-fungibility based taxonomies in which inventories of goods/services/events/outcomes are virtually or physically re-organized according to their quasi-fungibility from the perspective of the Financial Product Machine 470 and its user to support financial product development and hedging. In another preferred embodiment, outputs can also be optimizations for the Treasury 520 and Procurement 530 departments to facilitate company operations through receipt generation 560, and decisions 570 relating to physical 590 and virtual 580 inventory operations.

Non-limiting among subscriber operations pertinent to one preferred embodiment are open market operations such as inventory liquidation and acquisition and protocols to organize available inventory for possible financial product participation (especially "repo" and "reverse"). Among possible inventory optimizations where efforts between a Treasurer 520 and a Procurement Manager 530 might be required is the issuance of inventory receipts 560, whether actual 590 or virtual 580, as part of a program of participating in repurchase agreements or other financial product development. In one preferred embodiment not meant to be limiting, an easily traded receipt for inventory could be preferable to actual movement of the items involved in a financial product transaction. In instances where ownership can be transferred without movement of the inventory, possible yields on financial products will rise as a result of lower costs. In instances where receipts are traded, participants may need to know whether receipts have expiration dates or are permanent and what rights are transferred therein since inventory provided by a receipt originator may be "excess" for only a relatively short period prior to being required for a production line. Many such concerns can be met by inventory fractional reserve analysis and protocols for production line consumption.

Figure 12:
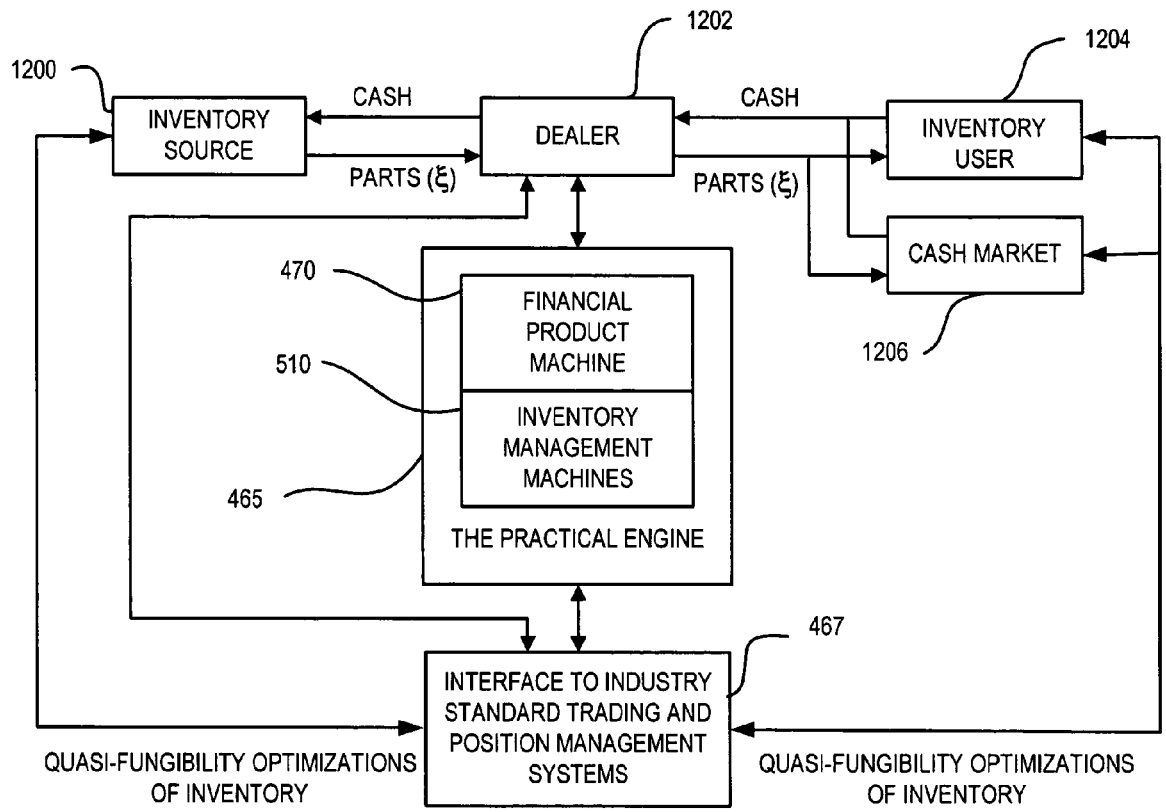
FIG. 12 is a schematic representation of the start of a repurchase agreement, showing relationship to position management and interaction with the Practical Engine.
Figure 14:
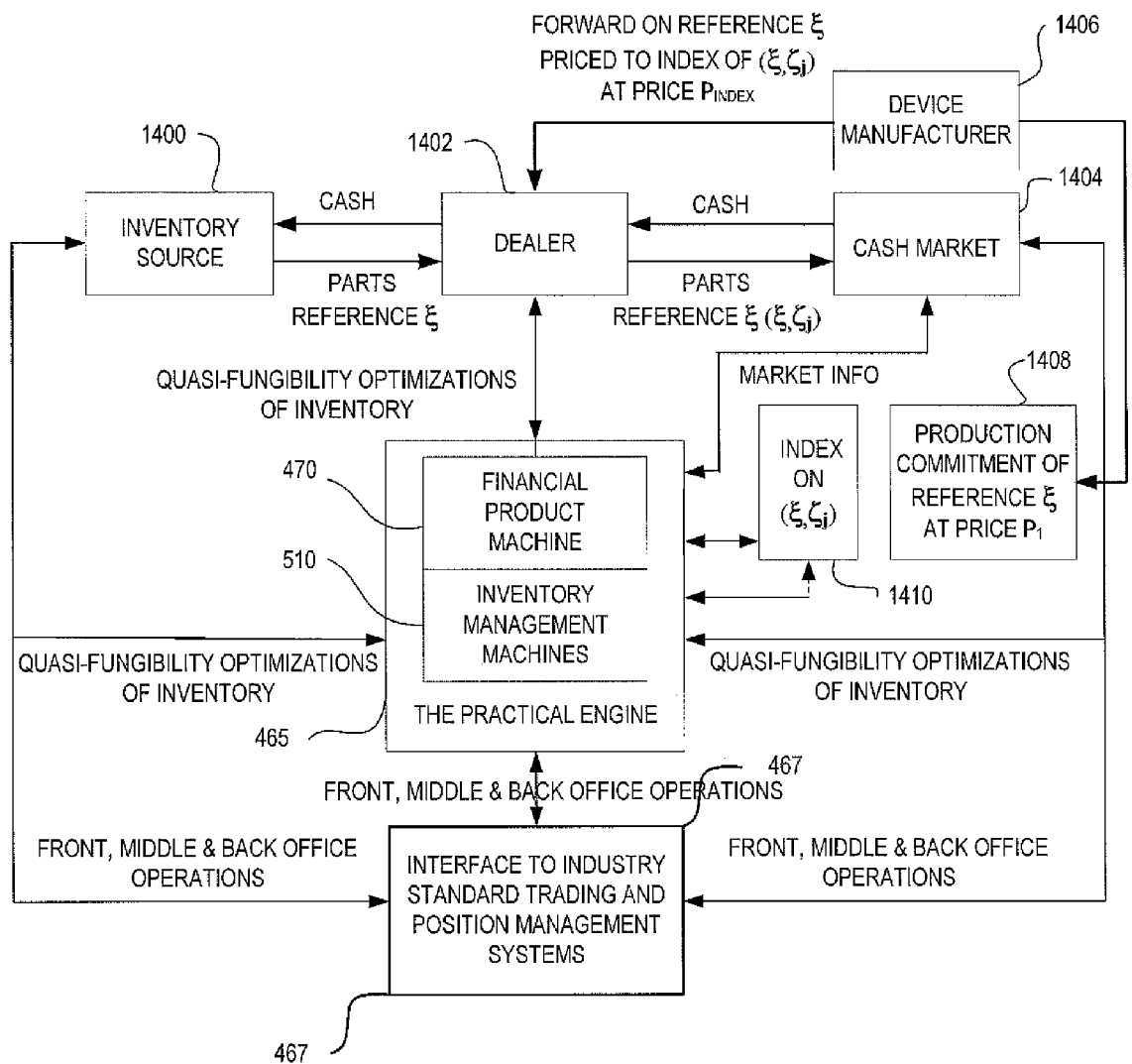
FIG. 14 is a schematic representation similar to FIG. 12 adding a derivative and an index to the position.
Figure 15:
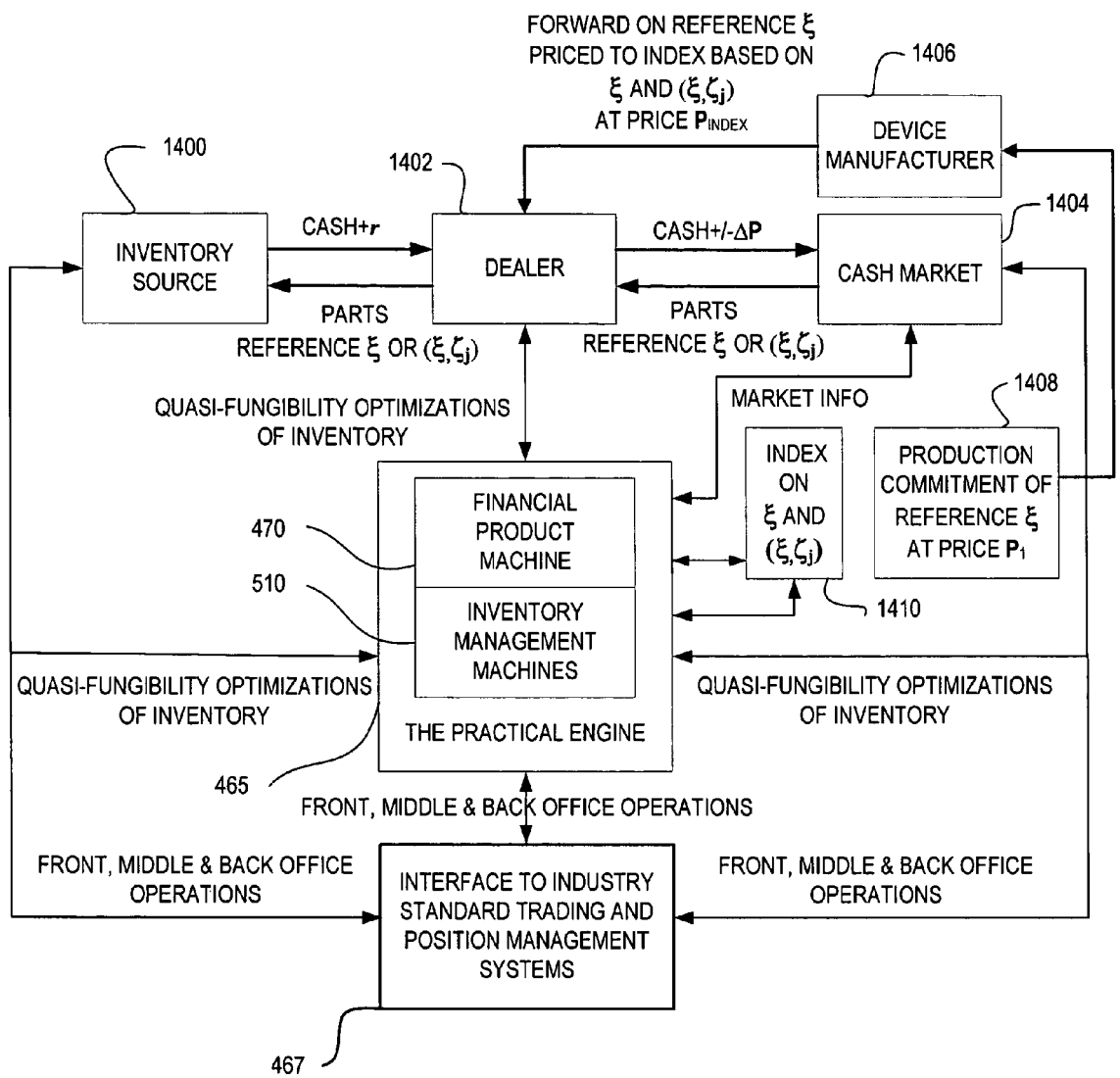
FIG. 15 is a schematic representation adding close of position/trade to FIG. 14.

An output of the Practical Engine 465, combining the function outputs of an FPM 470 and at least one IMM 510, is via an Interface to Industry Standard Trading and Position Management Systems 467 (see, e.g., FIG. 12, FIG. 14, and FIG. 15). This interface allows users and subscribers to use proprietary or off-the-self software and hardware systems to manage trading risk, act on inventory associated with trading or otherwise, process payments and collections, determine margins and haircuts and other appropriate front, middle and back office functions. Further, Interface 467 could feed into exchange systems for trading purposes for margining, collateral management and quoting and trading through automatic price injection systems.

Figure 5:
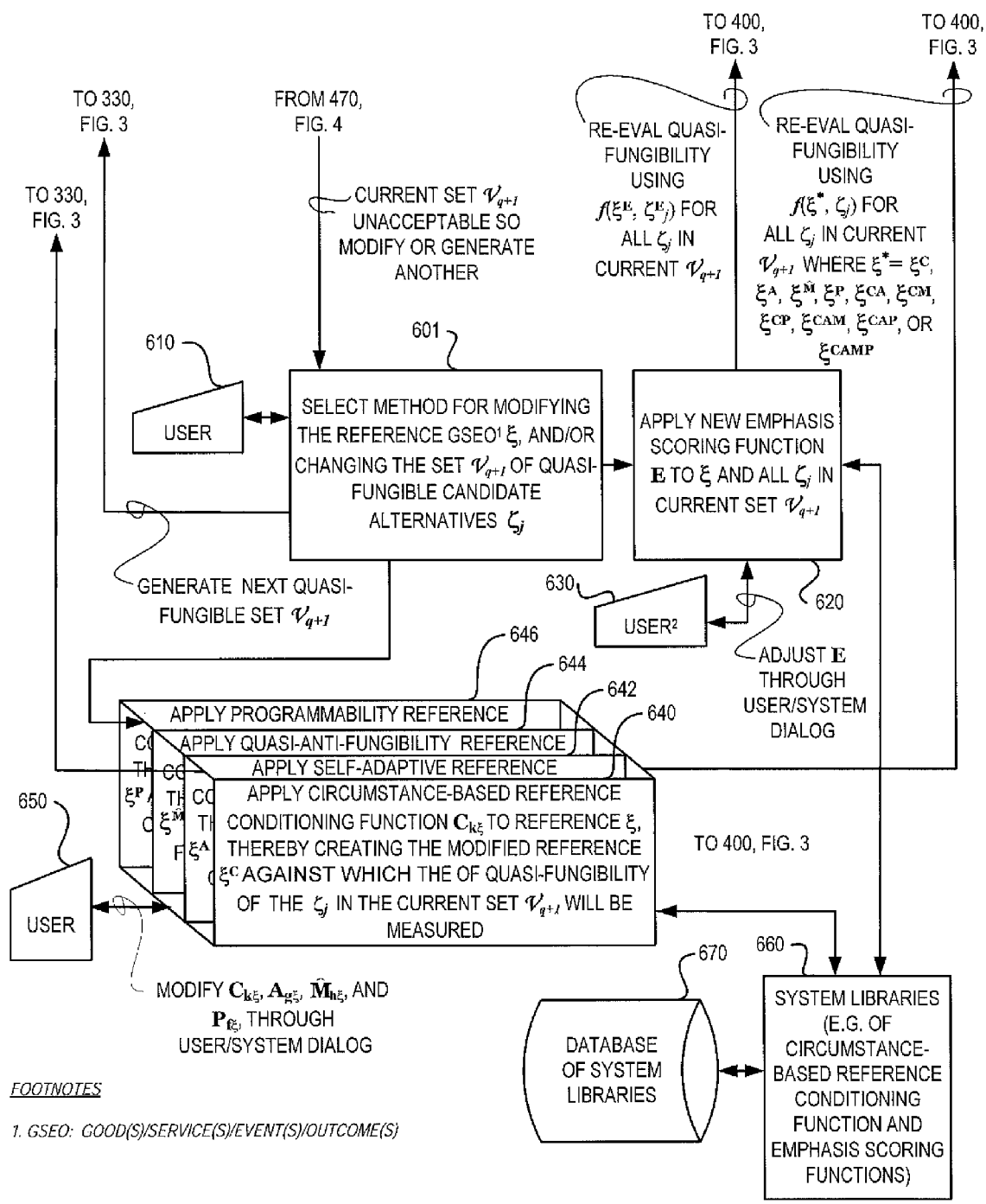
FIG. 5 is the third of three more detailed logic schema of the financial instrument machine of the subject invention.

Next referring to FIG. 5, which is a continuation of the logic schema of FIGS. 3 and 4, a process of selecting a method for conditioning a current Reference $\xi$ and/or changing a current set $\psi_{q+1}$ of quasi-fungible alternatives to a current Reference may be resolved by a user 610 with assistance of a system Graphic User Interface (GUI) such as shown in FIG. 8, which controls the selection process 601 FIG. 5.

A user can condition a current Reference $\xi$ and change a current set $\psi_{q+1}$ of quasi-fungible alternatives to a new conditioned Reference, through, among other functions, application of a revised Emphasis Scoring Function E which must be applied both to a Reference $\xi$, and to all $\zeta_j$ in a current set $\psi_{q+1}$ at block 620.

Among a plurality of options that operate only on a Reference are a Circumstance-Based Conditioning Function $C_{k\xi}$ 640, a Self-Adaptive Reference Conditioning Operator $\hat{A}$ 642, a Quasi-Anti-Fungibility Reference Conditioning Operator $\hat{M}$ 644 and a Programmability Reference Conditioning Operator P 646. A user 650 can condition, at blocks 640, 642, 644 and 644, a current Reference $\xi$ and re-process a system flow by looping back to either block 330 of FIG. 3, (to obtain additional candidate alternatives from a database) or block 400 of FIG. 3 (to evaluate the fungibility of the current set of candidate alternatives in relation to conditioned Reference $\xi$, thereby driving the system to search for, measure quasi-fungibility with respect to, construct sets and subsets of, and potentially create financial products around this conditioned Reference $\xi$ rather than an initially input Reference).

The application of an Emphasis Scoring Function E 620 to both a Reference $\xi$ and to each $\zeta_j$ in a current set $\psi_{q+1}$ is shown whereby a relative importance of respective ($\xi_i$, $\zeta_{ij}$) pairs of individual specifications can be emphasized or de-emphasized in preparation for each in a current set $\psi_{q+1}$ being re-evaluated under such user defined conditions as market circumstances, events (such as floods) and outcomes (such as shortage). This may occur in a situation where 1) no $\zeta_j$ or combinatory subsets of $\zeta_j$ in a current set $\psi_{q+1}$ that are deemed acceptable by a user because none are sufficiently quasi-fungible; and, 2) a user wishes to simply emphasize and or de-emphasize at least one importance aspect of a match between certain corresponding specifications in each ($\xi_i$, $\zeta_{ij}$) comparison pair contained in ($\xi$, $\zeta_j$), including setting them to a condition equivalent to "totally unimportant in this evaluation" or a "don't care" state. Said Emphasis Scoring Function E operates on both a Reference $\xi$ and each $\zeta_j$ in a current set $\psi_{q+1}$. The subject invention includes a library and database of Emphasis Scoring Functions $E_r$, 660 and 670 in which they are classified and stored according to a quasi-fungibility based taxonomy. In one preferred embodiment an "r" denotes that a given Emphasis Scoring Function $E_r$ is the $r^{th}$ such function in a library and database.

In at least one preferred embodiment, an Emphasis Scoring Function E is a square matrix as wide (having as many columns) as the column vectors $\xi$ and $\zeta_j$ have rows. In one example of a preferred embodiment, E is a 12×12 square matrix as $\xi$ and the are 12×1 column vectors. A quasi-fungibility between an emphasis scored E$\xi$ and an emphasis scored E$\zeta_i$ is then evaluated in a typical manner, namely $f(E\xi, E\zeta_j)$ (at block 400 of FIG. 3).

In an example of application of an Emphasis Scoring Function E, a user wanting to use E to emphasize an importance in a match between an individual specification pair ($\xi_i$, $\zeta_{ij}$), for example ($\xi_2$, $\zeta_{2j}$), and completely de-emphasize (set to "don't care state") an importance in a match between a different specification pair of ($\xi_i, \zeta_{ij}$), for example ($\xi_5, \zeta_{5j}$), would set all off-diagonal elements of E to zero and then all diagonal elements of E to 1 except for $e_{22}$, which would be set to a very large positive number, and $e_{55}$, which would be set equal to, or close to, 0.

A user 630 sets an emphasis function E by means of a user/system dialog. Outputs E$\xi$ and E$\zeta_j$ for all $\zeta_j$ and combinatory subsets of $\zeta_j$ in a current set $\psi_{q+1}$ at block 620 go to a quasi-fungibility evaluator block 400 of FIG. 3, and Emphasis Scoring Function E goes into to a system library 660 and subsequently to a database of system libraries 670 except when the user 630 creates it for the first time.

Instead or in addition to applying an Emphasis Scoring function E, the user can apply a Circumstance-based Reference Conditioning Function $C_{k\xi}$ to a Reference $\xi$ thereby creating a modified Reference, namely $\xi^c$, against which quasi-fungibility of each $\zeta_j$ in the current set $\psi_{q+1}$ will be re-evaluated, and which will represent user defined circumstance-based specifications or conditions (for example, but not limited to, events such as rain and outcomes such as mold growth). In at least one preferred embodiment a Circumstance-based Reference Conditioning Function $C_{k\xi}$ functions to allow adjustments to individual specifications of a Reference $\xi$ when no $\zeta_j$ or combinatory subsets of $\zeta_j$ in a current set $\psi_{q+1}$ are deemed acceptable by a user because no available $\zeta_j$ are sufficiently quasi-fungible according to the current quasi-fungibility threshold $\Psi$ or meet the current constraint set $\Phi$. Any time there are not any available $\zeta_j$ that are sufficiently quasi-fungible and meet the required set of constraints, a null set is produced in 420 of FIG. 3. A Circumstance-based Reference Conditioning Function $C_{k_c}$ enables a user to adjust individual specifications of, i.e., perform a conditioning on, a Reference $\xi$ as the next step in a continuing process, rather than lowering the minimum quasi-fungibility threshold $\Psi$ which would relax minimum required levels of quasi-fungibility on all the specifications of $\zeta_j$ (relative to the initial Reference $\xi$) at the same time. A notation of $C_{k\xi}$ for a Circumstance-based Reference Conditioning Function (RCF) 640 denotes that the RCF operates on a Reference $\xi$ and is a $k^{th}$ such RCF out of database 670 and library 660 of such Reference Conditioning Functions in which they are classified and stored according to a quasi-fungibility taxonomy.

In a preferred embodiment, a Circumstance-based Reference Conditioning Function $C_{k\xi}$ 640 is a square matrix as wide (having as many columns) as a column vector $\xi$ has rows. In one example of a preferred embodiment, $C_{k\xi}$ is a 12×12 square matrix and $\xi$ is a (and the $\zeta_j$ are) 12×1 column vectors (so $C_{k\xi}$ has the same number of columns as $\xi$ has rows and $C_{k\xi}\xi=\xi^c$ is well defined).

In one example of a plurality of uses of a Circumstance-based Reference Conditioning Function $C_{k\xi}$ 640, by setting all of its off-diagonal elements to zero and by individually varying its diagonal elements (each of the $c_{ii}$) around 1.0, a user can change, that is raise or lower a tolerance between a maximum and a minimum, which in turn may be widened or narrowed for individual specifications of a Reference $\xi$. For example, a user could set $\alpha=\xi_1^c/\xi_1$, $\beta=\xi_2^c/\xi_2$, . . . , and $\lambda=\xi_{12}^c/\xi_{12}$, with $\xi_i$ being the original $i^{th}$ specification for a Reference $\xi$ (meaning the value if row i of column vector $\xi$) and $\xi_i^c$ being a transformed $i^{th}$ specification for a conditioned Reference $\xi^c$. A user 650 sets $C_{k\xi}$ by means of a user/system dialog. As is also shown in FIG. 5, an output $\xi^c$ of the operation $C_{k\xi}\xi=\xi^c$ 640 goes to a quasi-fungibility evaluator 400 of FIG. 3, and function $C_{k\xi}$ goes to a system library block 660 of FIG. 4 and to a database of system libraries 670 except for when the user 650 creates it for the first time.

A Circumstance-Based Reference Conditioning Function $C_{k\xi}$ 640 is only one of a plurality of Reference Conditioning Functions and Operators that could be applied to $\xi$, thereby driving the system to search for, measure quasi-fungibility of, form sets and subsets of, and potentially create financial products around $\zeta_j$ that are quasi-fungible with respect to conditioned versions of a Reference $\xi$. As some examples, not meant to be limiting, in embodiments using mathematics and algorithms upon which application of $C_{k\xi}$ is based, the system could support Reference Conditioning Functions and Reference Conditioning Operators that would drive the system to search for, measure quasi-fungibility of, form sets and subsets of, and potentially create financial products around $\zeta_j$ that are able to self-adapt/evolve in a manner specified by the conditioned Reference; that are quasi-anti-fungible to the Reference $\xi$; or that are able to be programmed in a manner specified by the conditioned Reference $\xi$.

Block 642 in FIG. 5 shows an application of a Self-Adaptive Reference Conditioning Operator $A_{g\xi}$ that could be applied to a Reference $\xi$ thereby creating a conditioned Reference $\xi^A$ that would drive the subject invention to search for, measure quasi-fungibility of, form sets and subsets of, and potentially create financial products around $\zeta_j$ that are able to self-adapt/evolve in a manner specified by the Reference $\xi^A$. Examples of such self-adaptive/evolutionary capabilities may include, but are not limited to 1) evolvable hardware and software such as circuits that self-tune and self-calibrate during operation 2) field programmable gate arrays and nano-self-adaptive devices designed to self-compensate for predicted high failure rates of individual components existing at single molecule levels, and hardware-software hybrids, where hardware functions are replicated by software, and 3) hardware and programmable software functions bundled into a single device. In this last instance, it should be noted that the boundary between the Self-Adaptive Reference Conditioning Operator $A_{g\xi}$ and the Programmable Reference Conditioning Operator P may blur as lines between software and hardware themselves blur under current developmental lines. A notation of $A_{g\xi}$ for a Self-Adaptive Reference Conditioning Operator (RCF) denotes that the RCF operates on a Reference $\xi$ and is a $g^{th}$ such RCF out of a library of such Reference Conditioning Operators 660 and 670 of FIG. 5 in which they are classified and stored according to a quasi-fungibility taxonomy.

In a preferred embodiment, a Self-Adaptive Reference Conditioning Operator $A_{g\xi}$ is a square matrix as wide (having as many columns) as a column vector $\xi$ has rows. In one example of a preferred embodiment, $A_{g\xi}$ is a 12×12 square matrix and $\xi$ is a (and the $\zeta_j$ are) 12×1 column vectors (so $A_{g\xi}$ has the same number of columns as $\xi$ has rows and $A_{g\xi}\xi=\xi^A$ is well defined).

A user sets $A_{g\xi}$ by means of a user/system dialog 650 of FIG. 5. As is also shown in FIG. 5, an output $\xi^A$ of the operation $A_{g\xi}\xi=\xi^A$ 642 proceeds to quasi-fungibility evaluator 400 of FIG. 3, and function $A_{g\xi}$ goes to a system library 660 of FIG. 4 and a database of system libraries 670 of FIG. 5 except for when the user creates it for the first time via 650 of FIG. 5. In one preferred implementation a user, by means of using a Self-Adaptive Reference Conditioning Operator Graphical User Interface (GUI) flags each specification $\xi_n$ of Reference $\xi$ such that specification $\xi_n$ has self-adaptive capabilities in conditioned Reference $\xi^A$. Upon a user flagging a specification $\xi_n$ having self-adaptive properties, a software wizard launched by the Self Adaptive Reference Conditioning Operator GUI guides a user through defining a self-adaptive nature and algorithm of that Reference specification. This definition may include a range of values and boundaries constraining how a self-adaptive Reference specification may self-adapt, an environmental parameter in response to which a self-adaptive Reference specification self-adapts, a relationship describing a manner in which a self-adaptive process is driven by an environmental parameter, rate and time constants for self-adaptive change and other directing or response inducing inputs.

Output of the software wizard is an expression of the self-adaptive nature of that self-adaptive Reference specification, where that expression is in a canonical form that supports searching for, and manipulating sets of, likewise self-adaptive candidate alternatives $\zeta_j$. In one preferred embodiment the software wizard is a GUI version of the same process by which self-adaptive properties of candidate alternatives are described when they are entered into the database of GSEO.

As a result, output of the software wizard becomes a specification of self-adaptation in a Reference using the same canonical form as that used to describe self-adaptation in candidate alternatives; and this canonical form becomes a basis for measuring quasi-fungibility and quasi-anti-fungibility of self-adaptive specifications in a manner similar to how the subject invention measures quasi-fungibility and quasi-anti-fungibility of fixed specifications in $(\xi, \zeta_j)$ pairs.

An exemplary case, by no means limiting, is where the self-adaptive property of a given specification $\xi_n$ of a conditioned Reference $\xi^A$ is expressed as a polynomial transfer function of the kind commonly used in engineering digital filters and digital control systems. In this case, when a user, using a Self Adaptive Reference Conditioning Function GUI, flags a specification $\xi_n$ of Reference $\xi$ such that specification $\xi_n$ has self-adaptive capabilities in conditioned Reference $\xi^A$, that specification $\xi_n$ is replaced by a pointer $\xi^A{}_n$ that points to an associated column vector $\omega_{\xi^A{}_n}$ whose rows are the coefficients of the canonical polynomial representation of that transfer function. These associated vectors of coefficients are then bases for the types of quasi-fungibility and quasi-anti-fungibility measurements already described in a plurality of preferred implementations of the subject invention. This same approach is applicable to References $\xi^A$ and candidate alternatives having specifications which evolve (or move along trajectories) as a function of time, distance or other independent variables, different from self-adapting in response to environmental parameters.

Block 644 of FIG. 5 shows a Quasi-Anti-Fungibility Reference Conditioning Operator $\hat{M}$ being applied to a Reference $\xi$, thereby creating a conditioned Reference $\xi^{\tilde{M}}$ that would drive the subject invention to search for, measure quasi-fungibility of, form sets and subsets of, and potentially create financial products around $\zeta^j$ that are quasi-anti-fungible to at least one of the specifications of the Reference $\xi$ in a manner specified by the conditioned Reference $\xi^{\tilde{M}}$. Further to this description, Programmability Reference Conditioning Operator P and Self Adaptive Reference Conditioning Operator A could be applied in conjunction with $\hat{M}$. A notation of $\hat{M}_{k\xi}$ for a Quasi-Anti-Fungibility Reference Conditioning Operator (RCO) denotes that the RCO operates on a Reference $\xi$ and is a $k^{th}$ such RCO out of a library of all such Reference Conditioning Operators 660 and 670 of FIG. 5 in which they are classified and stored according to a quasi-fungibility and quasi-anti-fungibility taxonomy.

In a preferred embodiment, a Quasi-Anti-Fungibility Reference Conditioning Operator $\hat{M}_{k\xi}$ is a square matrix as wide (having as many columns) as a column vector $\xi$ has rows. In one example of a preferred embodiment, $\hat{M}_{k\xi}$ is a 12×12 square matrix and $\xi$ is a (and the $\zeta_j$ are) 12×1 column vectors (so $\hat{M}_{k\xi}$ has the same number of columns as $\xi$ has rows and $\hat{M}_{k\xi}\xi = \xi^{\tilde{M}}$ is well defined).

A user sets $\hat{M}_{k\xi}$ by means of a user/system dialog 650 of FIG. 5. As is also shown in FIG. 5, an output $\xi^{\tilde{M}}$ of the operation $\hat{M}_{k\xi}\xi = \xi^{\tilde{M}}$ 642 goes to a quasi-fungibility evaluator 400 of FIG. 3, and function $\hat{M}_{k\xi}$ goes to a system library 660 of FIG. 4 and a database of system libraries 670 of FIG. 5 except for when the user creates it for the first time via 650 of FIG. 5. In one preferred implementation, the user, by means of a Quasi-Anti-Fungibility Reference Conditioning Operator GUI, flags each specification $\xi_n$ of Reference $\xi$ such that specification $\xi^{\tilde{M}}{}_n$ in conditioned Reference $\xi^{\tilde{M}}$ is to have an "anti-" property (such as for example, the "anti" property of one or more of antithesis, antidote, anti-function, anti-sense, reciprocal, mirror, neutralizer or nullifier) to the specification $\xi_n$ in the original Reference. Upon a user flagging a specification $\xi_n$ having "anti-" effecting properties, a wizard launched by the Quasi-Anti-Fungibility Reference Conditioning Operator GUI guides a user through defining the "anti-" attribute affecting the nature that Reference specification and searches at least one of a plurality of databases for optimal antithesis, antithetical, antidote or otherwise "anti" attributes according to a set of selected constraints and other Reference Conditioning Function or Reference Conditioning Operator settings. This optimal antithesis, antithetical, or otherwise "anti-" effecting specification $\xi^{\tilde{M}}{}_n$ then takes the place of $\xi_n$ in the Quasi-Anti-Fungibility conditioned Reference $\xi^{\tilde{M}}$ formed by the applying the Quasi-Anti-Fungibility Reference Conditioning Operator $\hat{M}_{k\xi}$ software wizard to Reference $\xi$.

Block 646 of FIG. 5 shows an application of a Programmability Reference Conditioning Operator $P_{f\xi}$ to a Reference $\xi$ creating a conditioned Reference $\xi^P$ that would drive the subject invention to search for, measure quasi-fungibility of, form sets and subsets of, and potentially create financial products around $\zeta_j$ that are programmable with respect to at least one of a specification of a Reference $\xi$ in a manner specified by a conditioned Reference $\xi^P$. Non-limiting examples of such programmable properties have been discussed above. A notation of $P_{f\xi}$ for a Programmability Reference Conditioning Operator (RCO) denotes that the RCO operates on a Reference $\xi$ and is a $k^{th}$ such RCO out of a library of such Reference Conditioning Functions 660 and 670 of FIG. 5 in which they are classified and stored according to a quasi-fungibility taxonomy.

In a preferred embodiment, a Programmability Reference Conditioning Function $P_{f\xi}$ is a square matrix as wide (having as many columns) as a column vector $\xi$ has rows. In one example of a preferred embodiment, $P_{f\xi}$ is a 12×12 square matrix and $\xi$ is a (and the $\zeta_j$ are) 12×1 column vectors (so $P_{f\xi}$ has the same number of columns as $\xi$ has rows and $P_{f\xi}\xi = \xi^P$ is well defined).

A user sets $P_{f\xi}$ by means of a user/system dialog 650 of FIG. 5. As is also shown in FIG. 5, an output $\xi^P$ of the operation $P_{f\xi}\xi = \xi^P$ 642 proceeds to a quasi-fungibility evaluator 400 of FIG. 3, and function $P_{f\xi}$ goes to a system library 660 of FIG. 4 and a database of system libraries 670 of FIG. 5 except for when the user creates it for the first time via 650 of FIG. 5. In one preferred implementation, the user, by means of using a Programmability Reference Conditioning Function GUI, flags each specification $\xi_n$ of Reference $\xi$ such that specification $\xi_n$ has programmable capabilities in conditioned Reference $\xi^P$. Upon the user flagging a specification $\xi_n$ having programmable properties, a software wizard launched by the by the Programmable Reference Conditioning Operator GUI guides the user through defining the programmable nature and algorithm of that Reference specification. Output of the software wizard is an expression of the programmable nature of that programmable Reference specification, where that expression is in a canonical form that casts the search for, and set manipulation of, likewise programmable candidate alternatives $\zeta_j$ as a flow of algorithms of the subject invention. This software wizard is a GUI version of the same process by which programmable properties of candidate alternatives are described when they are entered into the database of GSEO. As a result, the output of the software wizard is a specification of programmability in a Reference using the same canonical form as that used to describe programmability in the candidate alternatives, and this canonical form becomes the basis for measuring quasi-fungibility of self-adaptive specifications in a manner that is similar to how the subject invention measures the quasi-fungibility of the fixed specifications in $(\xi,\zeta_j)$ pairs.

Reference Conditioning Operators A, $\hat{M}$ and P may be matrix-based functions or rule-based operators depending upon a particular embodiment and a particular implementation within an embodiment. In at least one preferred implementation, whether the Reference Conditioning Operators A, $\hat{M}$ and P are matrix-based functions or rule-based operators is determined automatically by the System and Method at the point that the user defines the Domain-of-Interest Filter.

When A, $\hat{M}$ and P are matrix-based functions, in at least one preferred embodiment, they are square matrices having as many columns as the column vector Reference $\xi$ has rows. Therefore, the matrix multiplications $A\xi=\xi^A$, $\hat{M}\xi=\xi^M$ and $P\xi=\xi^P$ are all well defined by the usual rules of linear algebra. In that case, a GUI can guide a user or subscriber through a process by which the subject invention constructs and verifies the appropriate matrix through a user/subscriber-system dialog in the non-mathematical vernacular of a user subscriber and a particular Domain-of-Interest that a user/subscriber has selected.

When A, $\hat{M}$ and P are rule-based operators, the software wizard that can be invoked by a GUI guides a user/subscriber through a process by which the subject invention constructs and verifies those rule-based operators, as well as expressing them in a canonical form by which quasi-fungibility measurements may be automatically performed between a conditioned Reference $\xi^A$, $\xi^M$ and $\xi^A$, respectively and candidate alternatives $\zeta_j$. Further explanation of how this process works is provided in paragraphs immediately above for A, $\hat{M}$ and P.

Building Quasi-Fungibility Based Products Using Quasi-Fungible Methodologies There are multiple approaches to building financial products using the subject invention. The term "financial product" includes without limitation all commercial transactions, such as the increased capacity to engage in trade, as well as vehicles that facilitate said commercial transactions, as well as insurance and wagering based on, enhanced and supported by, the subject invention. The following descriptions are meant to be examples, not limitations, on how the subject invention can be used to create financial products and inventory optimizations using services, inventory, events and outcomes either in a stand alone fashion or in combination. It will be clear to one skilled in the art that the examples that follow are templates that are extensible to industries, disciplines and circumstances other than those presented in the preferred embodiments herein.

A generic repurchase agreement is a financial product based on well established methods in which a security is sold with an agreement to buy it back at a later time. The transaction is closed by reversing the process (reverse repo or reverse) and selling back the security to the original party for the cash plus an associated fee which is typically based on an interest rate and the value of the underlying security. The sale-buyback made against securities is generally unwound without an adjustment to the price of the purchase and sale, which feature keeps the transaction in the realm of basic financing. When the securities used in repo and reverse are highly liquid, the repo is treated like a money-market instrument. Many variations of this simple premise exist and will be known to one skilled in the art. In the context of a preferred embodiment of the subject invention, the capacity of a market place to engage in repo is enabled or broadened through use of the subject invention. One or more Reference $\xi$ and quasi-fungible alternative $\zeta_j$ may serve in place of a "security" to support a repo transaction. Further, the subject invention supports repo transactions based solely upon GESO (goods/services/events/outcomes). The subject invention also supports expansion of basic commercial transactions in a way that facilitates broad repo. The illustrations that follow below begin with a basic purchase and sale of a service and build thereon.

1. Service Transactions

A simplified cash flow for a health care services provider for at least part of the radiology staffing and operating costs is represented in FIG. 6. Patients 606 of FIG. 6 pay health insurance premiums to a Third Party Payment Protocol 600 which in turn pays the Health Care Services Provider 602 according to its payment protocol in response to reimbursement requests for services provided. The Health Care Services Provider (HCSP) 602 receives Co-payments and deductible amounts from the Patients 606 and in return provides services. HCSP 602 pays Radiology Services Department 606 operating costs, including radiologist salaries and honoraria and HCSP 602 receives radiological services.

In this example of financial product development based on quasi-fungible goods, services, events, and outcomes (GSEO), Health Care Service Provider 602 desires to reduce overall costs and meet Radiology Services Department 606 radiologist staffing needs that are difficult to fill, especially on evenings, weekends and holidays. For assistance the HCSP contacts a Financial Products Dealer specializing in Health Care Services, hereafter called a Health Care Dealer 702 of FIG. 7 to provide a solution.

Figure 7:
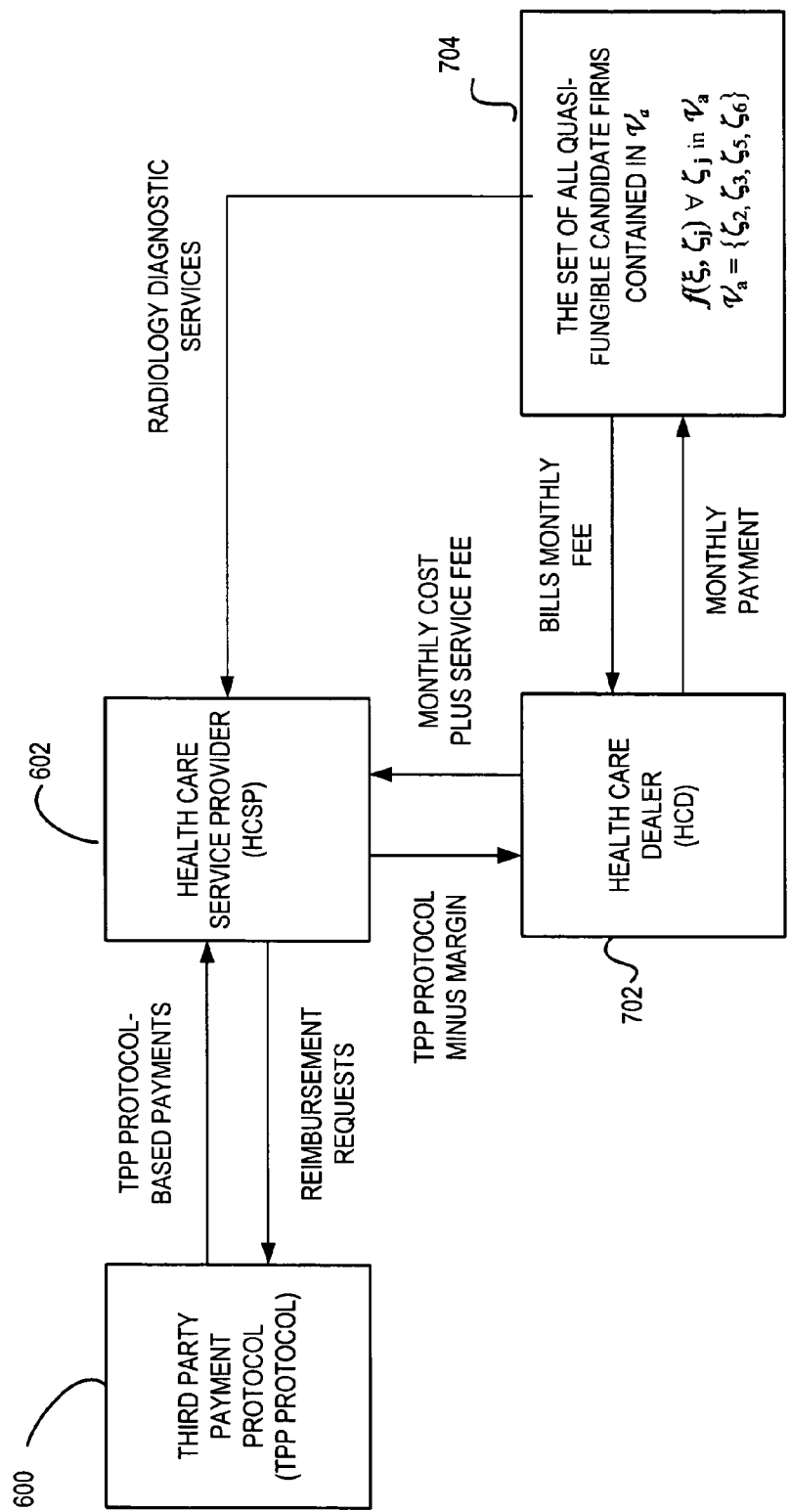
FIG. 7 is a cash flow schematic for radiology services after quasi-fungible substitution implementable with the subject invention.

The financial engineers at Health Care Dealer 702 determine they can create financial products structured to reduce costs and increase HCSP operating margins relative to a known health care reimbursement provider under TTP Protocol 600 of FIG. 6 and FIG. 7. A first step of financial product design is defining the underlying set of quasi-fungible radiology services that can be provided to the HCSP. HCSP 602 of FIG. 7 offers a full range of radiological services, but to test the program, it limits the task of Health Care Dealer 702 to providing competitive high quality radiology diagnostic services.

The process begins with a search by Financial Engineers for qualified radiologists capable of providing HCSP specified services at 300 of FIG. 3 and at 320 of FIG. 3 with a definition of Domain-of-Interest $\mathcal{D}$. From that point the detailed process continues per the earlier discussed Figures and descriptions above, which description is incorporated by reference and will not be restated for this example except as it clarifies the description below:

The Reference $\xi$ Domain of Interest is initially set as:

$\mathcal{D}$, =Health Care/Services/Radiology/Human/Diagnostic/Reading & Interpretation.

The primary search constraints, $\Phi$, are divided into categories.

Defined as over-riding are legal requirements that each potential radiologist or radiology practice: 1) be licensed for professional practice in the originating HCSP jurisdiction, 2) be certified by a recognized Board of Radiology and, 3) be insured by a licensed insurance provider responsible to the originating HCSP geographical area. An initial search of the database must include these three over-riding constraints as Constraint set $\Phi$ since they are absolute qualifying specifications and $\Phi$ determines the absolute and binary requirements in qualifying candidate alternatives. An important analytical aspect in constructing a quasi-fungibility based financial product solution to the radiology staffing/services problem is that (for some services) radiologists can be located any distance from a given HCSP because digital images can be transmitted virtually anywhere for reading, diagnosis and reporting. Thus a range of geographical location is part of the initial search. Since the cost impact of the same service provided from different locations by different providers is significant, certain geographical areas are excluded from the search by setting $\Psi$ for location to a moderate level that is over-ridden by $\Phi$ with respect to certain locations to eliminate them.

Thus, for this search for the example Reference $\xi$:

$\mathcal{D}$ =Health Care Services/Radiology/Human/Diagnostic/Reading & Interpretation $\Phi_o$=1) Licensed in HCSP location, 2) Radiology Board Certified, 3) insured by a licensed insurance provider responsible to the originating HCSP geographical area, 4) not in New York City, 5) not in Los Angeles, 6) MRI certified, 7) PET certified $\Psi_o$=1) 100, 2) 100, 3) 100, 4) 75, 5) 50, 6) 60 7) 40

Additional quasi-fungibility conditions that filter the search form the entire constraint set $\Phi$ which may be quite large. Non-exhaustive examples of such constraints and use of Emphasis Scoring Function E are shown in FIG. 8.

Figure 9:
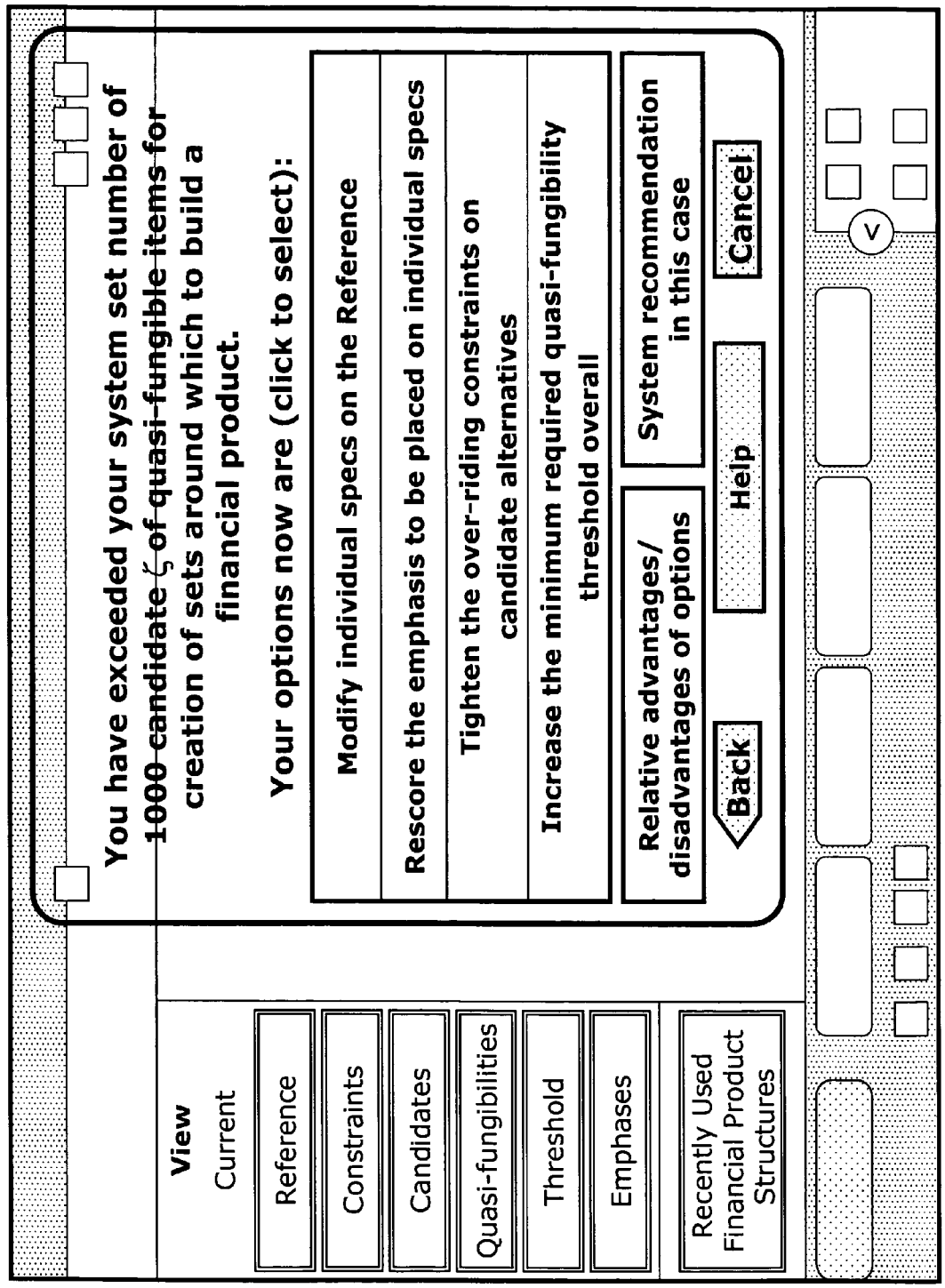
FIG. 9 is a computer screen shot of a graphical user interface of user choices when search criteria are exceeded.

Part of the first search request specified "Not New York City" and "Not Los Angeles", which nonetheless produced thousands of results in excess of user set search limits (FIG. 9) being retrieved from the GSEO Sites and Datacenters 380.1, 380.2 . . . 380.M of FIG. 3. To reduce the numbers of potential candidate alternatives to more manageable levels, in subsequent iterations of the search, quasi-fungibility measurement and subset generation processes controlled by $\Phi$ and $\Psi$ excluded all $\zeta_j$ in the Metropolitan New York and Metropolitan Los Angeles areas, and refined certain additional specifics of the service desired using the Circumstance-based Reference Conditioning Function C and the Emphasis Scoring Function E. The final iteration of the combined search, quasi-fungibility measurement and subset generation processes included a constraint that the estimated staffing needs be met for less than $100,000 per month, which produced the eight $\zeta$ replacement candidates $\{\zeta_1, \zeta_2, \zeta_3, \zeta_4, \zeta_5, \zeta_6, \zeta_7 \text{ and } \zeta_8\}$, for the Reference $\xi$ in FIG. 10.

Note that $\zeta_1$ and $\zeta_8$ (Shown as Cand. 1 and Cand. 8 of FIG. 10), contain event contingencies as follows:

Trade Bill S.2345 associated with $\zeta_1$ will restrict the ability to import medical services from India. A search of the event database produces no quasi-anti-fungible alternative event (or financial product responsive to such event) associated with radiological services that has an off-setting payoff profile. However, a limited indirect off-set can be found at several banks which have options with pari-mutuel payoffs to reduce immediate financial risk if S.2345 passes and radiologists in India are no longer permitted to offer services in the US.

Trade Bill S. 5432 associated with $\zeta_8$ will yield significant tax advantages if it passes, increasing sharply the value of service. Uncertainty over the bill and a recent service scandal in Viet Nam make $\zeta_8$ less desirable.

Consultation with the client eliminates possible providers with trade bill associated political risk as being acceptable candidates, regardless of the presence or absence of products to off-set risk.

In a subsequent iteration of the search mechanism, quasi-fungibility measurement and subset generation processes are directed by the Financial Engineers to exclude event sensitive $\zeta$. All Trade Bill sensitive and outcome dependent candidate alternatives $\zeta$ are placed in a separate subset $\{\zeta_1, \zeta_8\}$ which is marked and sent to an inventory management database for possible later evaluation and use.

The remaining set containing elements $\{\zeta_2, \zeta_3, \zeta_4, \zeta_5 \zeta_6 \text{ and } \zeta_7\}$ are sorted under one more constraint in one additional iteration of the subspace generator to eliminate services not $5,000 or more cheaper per month than Reference $\xi$. Neither candidate alternative $\zeta_4$, nor $\zeta_7$ meet this criterion and therefore they are placed in a separate subset $\{\zeta_4, \zeta_7\}$ which is marked and sent to an inventory management database for possible later evaluation and use.

Thus, the original set of eight $\zeta$ has produced three separate sets $\psi_a$, $\psi_b$, $\psi_c$, all of which could satisfy the primary fungibility requirements of service type, licensure and Board certification. These three sets are:

$\psi_a = \{\zeta_2, \zeta_3, \zeta_5, \zeta_6\}$ $\psi_b = \{\zeta_1, \zeta_8\}$ $\psi_a = \{\zeta_4, \zeta_7\}$ Nonetheless, each set $\psi$ has different cash flow specifications (which could have been an additional constraint), risk profiles and profit profiles. In this example, the criteria that a user employed to separate the sets might also be relaxed according to need using the Emphasis Scoring Function E, thus expanding the contents of the sets or the number of sets in use. Alternatively, the Reference Conditioning Function C may be modified to re-state the reference specifications for any $\xi$ which, in non-limiting examples, becomes unsuitable as a result of changing market circumstances such as labor strikes, or if a client changes any of the specifications for defining the quasi-fungibility of a service. This example of a preferred embodiment underscores how finely the individual and combined search, quasi-fungibility measurement and subset generation processes may be driven by a user, and how easily and precisely a user is able shape these processes by his/her own subjective judgments.

An incentive of the dealer is to supply quasi-fungible services in the most efficient manner that meets the criteria of a Health Care Service Provider Procurement Manager's requirements. It will be evident to one skilled in the art that any $\zeta$ in $\psi_a$ can be mixed with any other available $\zeta$ in $\psi_a$, by any of time zone, availability or subsequent price negotiation, to name a few non-limiting examples, to produce weighted average cash flows, as well as other structures. This will produce "in use" dynamic subsets of $\psi_a$ subject to criteria set in the Financial Product Machine.

Again referring to FIG. 7, Third Party Payment Protocol 600 makes payments to HCSP 602 in response to payment/reimbursement requests. These payments are typically fixed rate amounts for a given service based on Diagnosis Related Group (DRG) and, more generally the International Classification of Diseases (ICD) groupings, which reimburse for most radiological services under complicated health care formulas. HCSP 602 has contracted with the Health Care Dealer (HCD) 702 to receive services for $5,000 per month less than it was previously paying directly via staffing. HCSP 602 pays the TPP Protocol amount minus a margin to the HCD 702, and HCD 702 bills the HCSP 602 a monthly fee plus a service fee. HCD 702 pays at least one radiology service firm 704 identified as a qualified alternative C a monthly payment in response to services provided under a monthly agreement.

HCD 702 offers qualified services from a plurality of radiology service providers to HCSP 602 since images to be interpreted are sent electronically to any of the qualified diagnosticians for interpretation and reporting. HCSP 602 will likely want to oversee certification compliance and service excellence, but otherwise can be relatively indifferent to which qualified firms in set $\mathcal{V}_{a,\alpha}$ are actually delivering the contracted for service. In practice, many service providing firms and individual practitioners seek contracts for a term. But, just as with physicians in the US who "moonlight" in emergency rooms as needed on a free-agent basis, as competition increases, similar free-agent services via telemedicine are likely to increase in frequency with prices floating more freely than currently. This is especially true as localized shortages of certain skilled practitioners, radiology included, continue to increase in severity, in more than one country. Health care payments in Third Party Payer Protocols are complex and the payers may seek to reduce what they might see as "excess" margins on services contracted for through a given HCD on a quasi-fungibility basis. But, third party payers could just as easily try to force services into the quasi-fungibility based business flows described herein to reduce costs.

Generally, payment rates under Third Party Payer Protocols are as fixed as they are complex. Part of the complexity lies in regionally different rates for the same services which are based upon extensive data on the presumed costs of providing the services to be reimbursed. Historically, however, it has been difficult for patients (and their insurers) to capture any benefits of pricing differentials because alternative service providers that might be preferred on the basis of price remained largely inaccessible. One of the main reasons this inaccessibility has persisted is because one of the patient or the service provider has to change location to receive or provide the service. This situation changes with telemedicine capabilities, especially in instances where logistics costs are negligible, as in the transmission of x-ray images. In this instance the service location is at least as important as qualification. On an expanding basis, this should drive those services, where it is possible to do so, from high cost areas to lower cost areas. Doing so, however, requires a method of measuring comparability, which method the subject invention provides.

A second aspect to the provision of non-location specific service that is preferred is competition among the suppliers on price. Price competition in the medical field can be a challenging concept. It is challenging not just because of guild-like relationships among certain providers, but also because of Byzantine and rigid economic structures in third party payment systems that distort normal patterns of choice and price adjustment. Opportunity for product development as described herein exists because the third party system is under stress from rising costs, from pressures from providers to be paid outside of bureaucratic reimbursement schema that do not reflect the reality of service provision, and from technology to name a few system stress points. In this mix of price pressures is the pricing structure of health care insurance, which many commentators state is in an upward pricing spiral that denies basic coverage to millions. Cries for more government intervention in the "crisis" are predictable. Potential free market competitive solutions for at least some of the cost pressures are as evident as they are nascent.

Competition implies a move from a fixed price structure to an open market structure, meaning prices will float in response to supply and demand, which creates additional opportunities. Returning to the example shown in FIG. 7, the Third Party Payer Protocol is fixed, as is payment to (and charges from) any of a plurality of distant radiological service providers. This illustrating but non-limiting structure is a starting point to describe basic commercial transactions in quasi-fungible radiology services supported by the subject invention. But it will be evident that alternate commercial cash flows can be built from Third Party Payer payment structures that tie payment levels for the same services to regional criteria. This means that Third Party Payer Protocol cash flows can be based on at least one regional fixed price Radiology Payment (Reimbursement) Index against which at least one of a plurality of floating price Quasi-Fungible Telemedicine-Based Provider Indices of the non-limiting, exemplary radiological services could be reliably measured. Thus, a Quasi-Fungible Radiology Service Index based on service rates for Southern California can be priced against a Quasi-Fungible Radiology Service Index for Metropolitan New York or for Central Florida. From those comparison indices, the leap to indices based on quasi-fungible radiology services in New York City, Mumbai, Delhi, or any other city are apparent.

Non-limiting designs for pricing and cash flow relationships between the respective indices can be fixed or floating, have notional amounts of services that can be either fixed or amortizing, depending on the number of $\zeta_j$, the structure of a given set and the funding and payment schedules of potential index users. A non-limiting list of potential users of indices and financial products for health care services derived from use of the subject invention are likely to include entities such as Hospital Corporation of America, Blue Cross Blue Shield, Medicare/Medicaid, and the national health systems of England, Canada and France. The foregoing description of the relationships between the indices, which is meant to be illustrative and not limiting, could then 1) reflect specific cash and service flow needs 2) reflect seasonal tendencies, including specific events such as disease outbreaks and their attendant outcomes such as increased service demand 3) be provided wherever there is shortage, whether structural or temporary and 4) be tied to equipment loans and leases in combination with other hedges, such as those for interest rates and quasi-fungible inventory hedges as discussed further below. Under this structure, under the subject invention, the cash and service flows for Radiological Services can be hedged and exchanged.

For a large service provider base it is plausible that excess capacity of service within a set of service providers will exist on a local and rolling geographic basis just as there will exist shortages in smaller bases. While services cannot be warehoused or stored per se, they can be contracted for on a forward basis or optioned for forward delivery as well as bought, sold and borrowed in the spot market for immediate delivery. Thus, a dealer can hedge spot commitments against a forward delivery commitment or one forward delivery commitment against another for matched book structures, even if with some date mis-match risk.

Further, given a definition of quasi-fungible services and an imbalance in supply and demand, there is opportunity to trade what in the current context are packets of time containing a quasi-fungible skilled service and an associated cash flow. For a given quasi-fungible service, there can be spot market trading similar to that for perishable goods. Or, more practically, there can be a definition of spot which would have a settlement today, tomorrow, tomorrow next ('Tom Next"), or some other number of days from the trade date to reflect the strictures of delivering the quasi-fungible service in question. The definition of a trade date and settlement date system for radiology services could be patterned on delays common to some financial products, (T+2) or longer as required to effect the settlement.

An effect of long periods between trade and settlement dates gives an implied option both on the aggregate set of services within set $\psi_a$ as well as on any acceptable individual member of the set. These structures can also be viewed in terms of forward start contracts with attached options. To the degree there is a mechanism for ensuring performance to a contract, there is the possibility for packaging the service flow commitments and their cash flows into discrete tradable packets of time on a forward basis. A series of such forward contracts, especially when combined with fixed and floating indices of the payment flows, will provide a needed building block for creating Health Care Services Swaps. Additionally, contracts with reliable performance bonds could be defined by concerned parties as assets which could be used as collateral. This implies that packaged blocks of quasi-fungible radiology services can serve as the basis of repo transactions, among other financing structures. Such repo structures could include work week or weekend windows of $spot_t$, $spot_{t+1}$ ... $spot_{t+n}$ from any qualified candidate alternative provider and functionally enable participants to sell services short While repurchase agreement structures as proposed could be effected in quasi-fungible services generally, clearly some will be more appropriate to such structuring than others.

In the above repurchase agreements, slots of weekends and work weeks, (as well as individual days as necessary) could be bought from entities having an excess and sold back at any later date as well as sold outright. Since the services are defined as quasi-fungible to a use by the participants, similar pool participants can freely trade such quasi-fungible services among themselves without regard to which entity originated the repo transaction. This implies the capacity to trade quasi-fungible services on a multi-lateral as well as bi-lateral basis. The roles of dealers and exchanges in such structures will be intuitive to one skilled in the art. The possibilities for using such tradable underlying instruments as real, non-actuarial hedges for insurance products is of interest to dealers, insurers and re-insurers of health care risks, among others.

Figure 11:
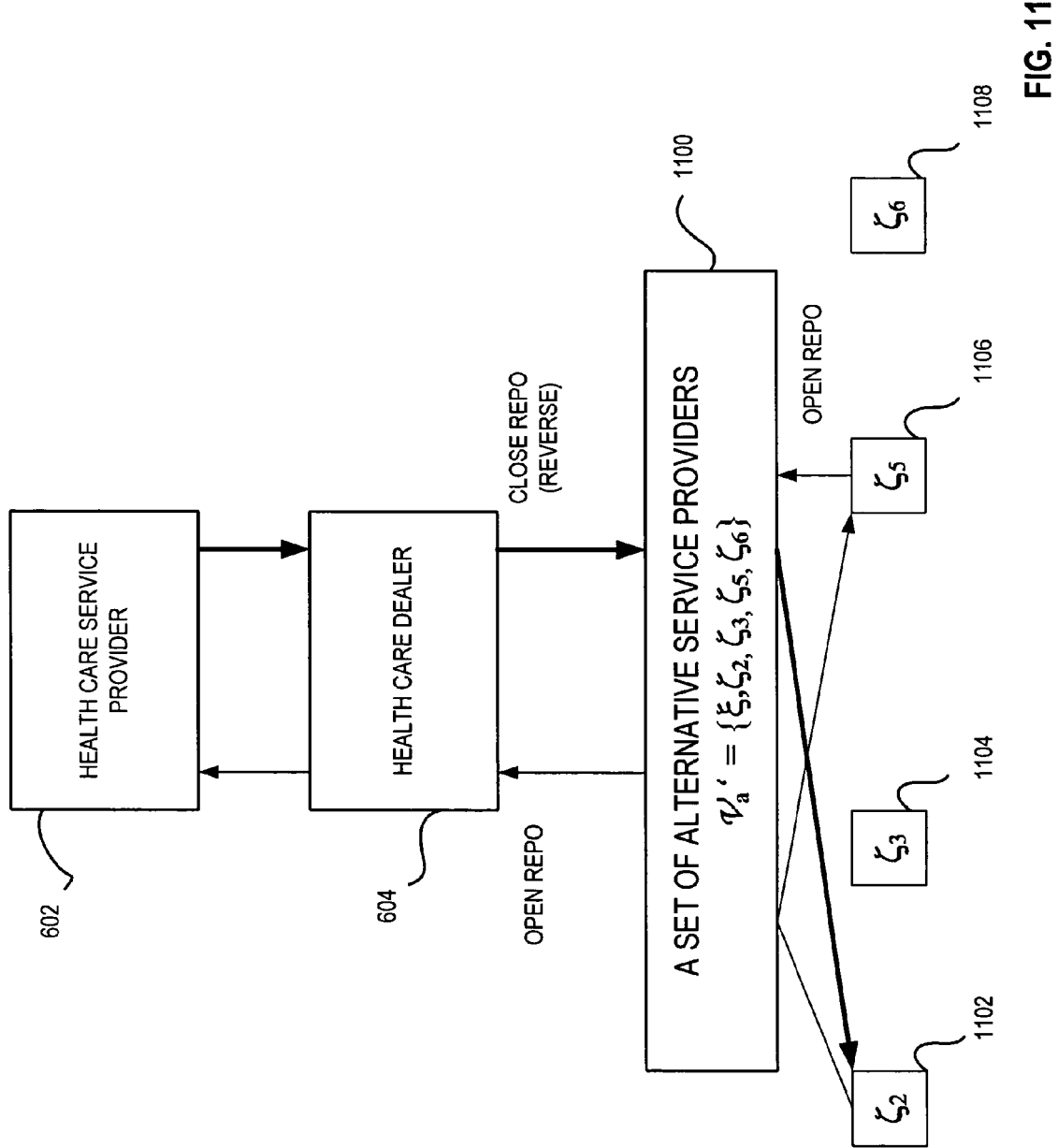
FIG. 11 is a schematic representation of a Dealer managing a short repo transaction.

Consider by way of example the following, as depicted in FIG. 11. Health Care Service Provider (HCSP) 602 has a temporary deficit that requires it to contract in the spot market for services. HCSP 602 (Reference $\xi$) contacts a Health Care Dealer (HCD) 604 who determines spot service availability among members of already determined set $\psi_a = \{\zeta_2, \zeta_3, \zeta_5, \zeta_6\}$. HCD 604, in this example, takes the service from $\zeta_5$ 1106 under a term and condition of returning (providing) the same service at a forward date in a repo.

Note that this service provision can be effected with any other acceptable $\zeta$ in set $\psi_a$ and augmented set $\mathcal{V}_a'$ which contains $\psi_a$ and the Reference $\xi$ 1100. In this instance, augmented set $\psi'$ is created to allow for a set to include the Reference $\xi$ because the contemplated terms in the example structure require the Reference $\xi$ be part of a set of services that satisfies the economics of the trades. In other exemplary structures, set $\psi'$ could include additional null sets, the presence of which could constitute events that trigger options for additional services. Such a short position held by a Dealer can be modeled to create functional Term Repo or a Rolling Spot type of Repo short that is either renewed by a recipient or rolled between accepted candidate alternatives. A capacity to establish and hold functional short positions in spot services allows for use of such positions as hedges against other long positions or commitments whether they are spot, forward, derivative or contingent in nature.

Still referring to FIG. 11, the repo between HCD 604 and $\zeta_5$ 1106 expires prior to the repo between HCD 604 and HCSP 602 so the dealer effects a repo for services from $\zeta_2$ 1102 for the remainder of the open repo with HCSP 602. At the conclusion of the term repo, HCSP 602 (i.e., $\xi$) sells back the services to Dealer 604 who in a reverse repo, sells them back to $\zeta_2$ 1102 to close the quasi-fungibility enabled repo transaction. $\zeta_6$ 1108, which is shown as part of the complete set $\psi_a$, does not take part in this transaction because they did not have services available when Dealer 604 needed to buy the additional block of time and its associated skill set of quasi-fungible service.

Once services can be inter-changed in an agreed upon way between at least two parties according to use and at least one specification, commercially dynamic activities can ensue. The capacity of a given HCSP and a particular $\zeta_j$ to engage in repo and reverse repo provides a financing capability to managing what otherwise might be idle productive time for the service in question. Additionally, the capacity of dealers to create, trade and manage open repo and forward positions on a given service has implication for their ability to development of other hedge structures, including, but not limited to options, swaps and insurance products and their hedges.

The subject invention enables the flow of radiology services to be packaged as a flow of services and cash which can be discounted according to standard financial mathematics with modification for the inclusion of quasi-fungibility mathematics.

For example, a standard formula for calculating the Net Present Value of a set of cash flows is:

$$NPV = \sum_{t=0}^{T} \frac{CF_t}{(1+r)^t} = CF_0 + \frac{CF_1}{(1+r)^1} + \frac{CF_2}{(1+r)^2} \cdots + \frac{CF_T}{(1+r)^T}$$

where $CF_t$ is the cash value of the service flow at time t, and r is an interest rate associated with each cash value equivalent service flow that acts as a standard discounting function.

The term structure of r can be derived from a zero or other interest rate curve or can be derived from an actual forward curve for services derived from forward contracting over the term of a given service contract.

In the context of a methodology inherent in the discussed quasi-fungibility-based Telemed Radio Repo, the value $CF_t$ is strictly proportional to $f(\xi,\zeta)_t$ in general, and is strictly proportional to $f(\xi, f(\xi,\mathcal{V}_a)_{t\ a})_t$ in the specific instance where the repo (or other product such as an individual forward or series of forwards or swap) is constructed of the elements of $\psi_a$. For any pair $(\xi,\zeta)$, the function $f(\xi,\zeta)$ is a scalar (a single valued real number), even if—as in the current example embodiment—it is a scalar that is a function of time. Since $f(\xi,\psi_a)_t$ is a set of scalars that are functions of time, the set $\{f(\xi,\zeta_2)_t,$ $f(\xi,\zeta_3)_t, f(\xi,\zeta_5)_t, f(\xi,\zeta_6)_t\}$ and likewise $f(\xi,\psi_a)_t$, is a set of four scalar functions moving through time.

The implication of quasi-fungibility as a basis for financial products toward a formula for Net Present Value is that Net Present Value at any time t is not necessarily equal to replacement value of the cash/service flows as it is classically envisioned since the cash/service flows can be replaced by any member or group of members of the utilized sets $\psi$ (or new qualifying sets at any time t) of quasi-fungible $\zeta_j$ if the contract allows. This condition will last as long as arbitrage between any one $\zeta_j$ or group of $\zeta_j$, and the reference $\xi$, and/or any one $\zeta_j$ or group of $\zeta_j$, exists.

If the quasi-fungibility conditions are well specified, any given set $\psi$, may be either "rigid" or "elastic". In this case, "rigid" means the elements of the set are fixed for a contract term or to a specific reset time. "Elastic" in the context of this embodiment means that any qualifying $\zeta_j$ may be substituted at any time t over the life of the service flows and at any time t the forward curve for any individual $\zeta_j$ may vary allowing for dynamic replacement of forward positions. Moreover, as t→0, delivery dynamics will make for competitive substitution under "use or lose it" valuation scenarios inherent in the delivery of services at $t_0$ since they can not be stored.

While recipients of cash flows—or in this case service flows—are historically suspicious of what is deliverable, as long as a given set of quasi-fungibility constraints is not violated, a receiver should be indifferent, making for interesting valuation mathematics for financial products.

Quasi-fungibility-based contracts and the designation of sets as open or closed would similarly impact Quasi-Fungible Telemed Radio Product credit analysis and the domain of related derivatives thereto (including default options) as well as margin structures such as reserve requirements and "haircuts").

For the quasi-fungibility-based Telemed Radio Forward, a simply stated NPV is:

$$NPV_{f(\xi\zeta)t} = \sum_{t=0}^{T} \frac{CF_{f(\xi\zeta)t}}{(1+r_{f(\xi\zeta)t})^t}$$

$$= CF_{f(\xi\zeta)0} + \frac{CF_{f(\xi\zeta)1}}{(1+r_{f(\xi\zeta)1})^1} +$$

$$\frac{CF_{f(\xi\zeta)2}}{(1+r_{f(\xi\zeta)2})^2} \ldots + \frac{CF_{f(\xi\zeta)T}}{(1+r_{f(\xi\zeta)T})^T}$$

The possible impact of quasi-fungibility based financial products on financial mathematics more generally will be evident to one skilled in the art of financial engineering.

It is true that time management in the manner proposed might be unpopular. But for certain services, like radiology, it should not be an issue since the time in question is spent reading and interpreting images and the mechanism of digital image (product) flow to practitioners can be seamless and invisible. Third party payers should participate in this mechanism since Third party payers will pay for services for which patients receive medical care without face-to-face contact when such lack of contact is normal to the provision of the service. Thus, while internet providers of remote medical care can be analyzed according to the subject invention and defined in terms of quasi-fungible groups of service providers, except for those patients not seeking reimbursement from a third party, the provision of such services will likely lag.

The foregoing discussion pertaining to Radiology services is set forth here as a model for other services in other domains of interest. The subject invention can be used, by way of non-limiting examples, to construct financial products and optimize service inventories related to: 1) legal services 2) home care monitoring (as in Hospice or long term disability care) which can be done at a central station outside the patient's locale in conjunction with local visiting medical services 3) surgical procedures which have been demonstrated as being safe even if the surgeon if distantly located 4) the provision of teaching services and 5) software programming services. Further, formulas for equipment purchase and leasing, as well as overall medical practice economics will be altered by the creation of functional larger geographical service areas. In the aggregate, groups of Telemedicine Health Care Sector Microswaps can be packaged together as Health Care Sector Mesoswaps, which in turn can be aggregated with other financial products toward the construction of Macroeconomic swaps.

2. Inventory Transactions

Referring to FIG. 12 Inventory Source 1200 of FIG. 12 sells one or more Reference parts $\xi$ from existing inventory to a Dealer 1202 who in turn sells them to a Inventory User 1204 in what is commonly referred to in finance as a "matched book" repo and reverse operation. FIG. 12 illustrates that cash flows from a Dealer 1202 to Inventory Source 1200, and from Inventory User 1204 to a Dealer 1202. For the transaction depicted in Inventory Source-to-Dealer-to-Inventory User in FIG. 12, the repo is of a type that is standard and largely free of market risk. Credit risk in this transaction can be controlled through collateral and margin procedures typical to the repurchase agreement business with the added feature that permissible collateral can include Reference and acceptable quasi-fungible candidate alternatives $\zeta_j$ to Reference $\xi$. In the inventory examples herein, it should be understood that Inventory Source 1200 and Inventory User 1204 may each represent one or more entities, and that in at least one embodiment of the subject invention, Inventory User 1204 may be a subscriber to the subject invention and Dealer 1202 may be a user of the subject invention.

In an alternative deal and trade structure, in this case Inventory Source 1200-to-Dealer 1202-to-Cash Market 1206, only the first part of the transaction, from Inventory Source A 1200-to-Dealer 1202, is essentially free of market risk. The second half of the opening transaction that flows from the Dealer 1202 to the cash (open) market 1206, has a risk profile that is not free of market risk since there is typically no party agreeing to return the item sold for cash at the initial transaction price. In this instance, a Dealer 1202 has combined one low risk profile of repo with an agreed upon return price to Inventory Source A 1200 with a different risk profile of a floating price in an open market transaction. This part of this transaction flow that goes to the cash market is a structure that is a primary element for "selling short", that is, selling an item that is obtained through repo with an expectation of being able to buy it back in the open market for less than it was sold and return it to the seller at the agreed upon price in a reverse repo that closes the original transaction. The market mechanism of selling short is essential to the development of liquid trading markets in general, to common stock and commodity portfolio management styles (long-short, market neutral, matched pairs to non-exhaustively name a few), as well as to the development of hedging for derivatives markets, in particular.

In a preferred embodiment, in both the case where inventory is involved in a repo-reverse repo matched book transaction, and in the case where inventory is independently or concurrently sold into to the cash market, the transaction is monitored via the Practical Engine 465 of FIG. 4 (which contains the Financial Product Machine 470 of FIG. 4 and the Inventory Management Machine 510 of FIG. 4) to provide quasi-fungible alternatives to the Reference $\xi$.

It will be apparent to one skilled in the art that this basic repo structure is suggestive of more complex structures for financial products, some of which will be discussed below. Further, it should be understood that the Inventory Source 1200 and the Inventory User 1204 in the depiction can deal with each other directly, without the intermediation of a Dealer, although in practice, dealer intermediaries are typical.

It will be further evident to one skilled in the art that a general industry tendency to overstock inventory will make instances of inventory availability from an Inventory Source 1200 more frequent and easier to find than corresponding and offsetting consuming needs that arise with an Inventory User 1204. It is probable that events such as strikes, accidents, unforeseen demand and natural phenomena will create contingent inventory needs to support a matched repo and reverse book based on a Reference $\xi$ and an augmented set $\mathcal{V}''$ consisting of Reference $\xi$ and acceptable quasi-fungible candidate alternatives $\zeta_j$ (where $\mathcal{V}''\leq\{\xi,\zeta_j\subset\psi\}$). But it is more likely that at any given instant an active dealer will also use the cash market to raise funds to finance repo. Patterns of bi-directional inventory liquidity will thus impact repo financing rates and liquidity for repo. Event and outcome driven contingent inventory needs in an Inventory User 1204 will support quasi-fungibility based, contingent payoff product development by creative dealers.

A key concern of market participants in less liquid markets for less traditional items is that products under contract in repo-type structures will be unavailable when it is time to unwind the transaction. This is a very important consideration when the items under loan are to be consumed according to a production schedule, a situation not typical for many categories of financial assets that usually underpin these types of transactions. In certain markets, especially those subject to intermittent supply shortages, this problem can be particularly acute since an inability to receive a part back may shut a production line and cost far more than a given transaction is capable of generating. In fact, it is fear of production line shutdown that is often the most cited reason for firms carrying excess inventory, a circumstance that in itself makes repo desirable for at least a part of the inventory. Inventory draw down features of manufacturing suggest natural amortizing structures for inventory repo and other financial products.

At least part of this inventory control issue can be solved through the subject invention by the use of quasi-fungibility algorithms in an iterative subspace generator. Since these algorithms allow for identification of, and replacement by, quasi-fungible alternatives $\zeta_j$ to a Reference $\xi$, the risk of liquidity driven default and problem trades can be reduced because the universe of possible replacements can greater than the original Reference $\xi$. A system for defining candidate alternatives for $\xi$ works because the quasi-fungibility statements are under the control of the parties to the transaction and quasi-fungibility is defined to a use and set of specifications. While, at first glance, this observation might lead a reader to infer that contracts such as these are too highly tailored for more general trading and use, the reader should bear in mind that the use of the subject invention use may be sufficiently broad as to garner necessary interest for liquidity patterns that support active trading, price discovery functions and transparency.

One example of an application of the subject invention that can support active trading, price discovery functions, and transparency is a non-limiting example where a DVD player manufacturer defines a Reference $\xi$ as an operational amplifier and identifies a set of six quasi-fungible alternatives $\zeta_j$, for an operational amplifier integrated circuit chip, or for an operational amplifier and its passive components (resistors and capacitors) comprising an audio low pass filter subassembly. While an initial contract from a Dealer might have been defined for a single manufacturer, the same Reference $\xi$ and set $\psi_1$ of six quasi-fungible alternative $\zeta_j$ operational amplifiers are likely to be acceptable alternatives to other manufacturers of similar tier (quality) DVD players. Thereby, a quasi-standard contract based on quasi-fungibility can be defined for certain operational amplifier integrated circuit chips specific to a use in a specific product, here a DVD player of a specific product tier. Further, a quasi-standard contract based on quasi-fungibility can be defined for certain operational amplifiers that are not only specific to a use in a specific product, but even to a specific build cycle within those products. It might also be true that the same Reference operational amplifier integrated circuit chip given a specific set of reference specifications, might also be quasi-fungible to second set $\psi_2$ of operational amplifiers for a different use in the manufacture of cell phone handsets.

Further, while two sets, $\psi_1$ and $\psi_2$, can both be quasi-fungible to a common Reference $\xi$, $\psi_1$ and $\psi_2$, might contain two completely different groups of $\zeta_j$ that do not intersect because they are not quasi-fungible to both uses of the Reference $\xi$. Similarly, two separate References, $\xi_\alpha$ and $\xi_\beta$, derived from two separate uses might share a common set of candidate alternative $\zeta_j$. The development of integrated and overlapping financial products for specific components that can serve multiple uses, and groups of components in those integrated and overlapping financial products, can provide building blocks for larger hedge products.

Figure 13:
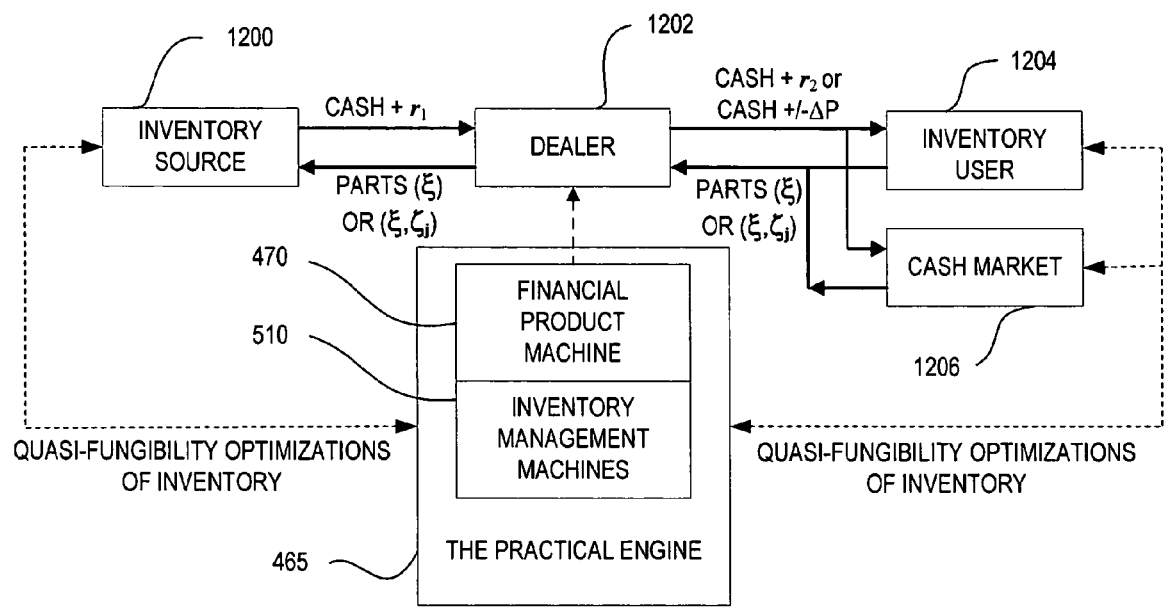
FIG. 13 is a schematic representation of the end of a repurchase agreement, showing relationship to position management and interaction with the Practical Engine.

FIG. 13 is an illustration of a quasi-fungibility based repo-type structure at termination. The initial Reference $\xi$ may be delivered or, in place of the Reference $\xi$, any one or more of candidate alternatives $\zeta_j\subset\psi_1$, that is, any member of set $\mathcal{V}_1'=\{\xi,\zeta_j\subset\mathcal{V}_1\}_1'=\{\xi,\zeta_j\subset\psi_1\}$ may be delivered. Further, according to the terms of the particular repo contract, price concessions may or may not incur according to degree of quasi-fungibility of the candidate alternatives $\zeta_j\subset\psi_1$ that are delivered. If a Reference $\xi$ can be replaced by any of a set of candidate alternatives, then a financial product can be built from any of a plurality of candidate alternatives according to the elements defined for its condition of quasi-fungibility.

Analysis of the repo trade at termination as depicted in FIG. 13 shows that for the part of the transaction based on Inventory Source 1200-to-Dealer 1202-to-Inventory User 1204, the income earned on the Repurchase agreement is a function of the value of the underlying transaction and an interest rate r, where r differs slightly between Inventory Source 1200 and Inventory User 1204 to reflect a margin for a Dealer 1202. This money flow shows a commercial process that can change an inventory item held by an Inventory Source 1200, such as a manufacturer or distributor, that had before been idle and costing money or opportunity into an income earning asset. The structure of the income earning capability of that asset can range by non-limiting example, from a zero coupon bond to a coupon-like bullet instrument, depending upon the analytical model, if a profit accrues to the ultimate sale of an inventory item as part of production. In the zero coupon view, an inventory item is purchased at time t for value X and increases in value over a known inventory turn cycle to obtain value Y, with the difference accreting according to continuous compounding mathematics. In the bullet bond with coupon view, an inventory item might be acquired under a cost plus type contract and the "plus" part of the contract can be seen as a coupon paid to the principal amount paid for the inventory where the coupon period is the inventory turn cycle. The range of possible product structures can be realized as the structure of a Repo transaction is varied, and inventory is returned to a storage bin, or sold outright, or consumed in production.

Normally, as a negative income tem, inventory has a duration that shifts longer in time the longer the inventory is held without a turn. However, the capacity to earn income on inventory as described herein shifts the duration assumptions attached to inventory so they are shorter as income opportunity is captured. This shift will impact asset-liability analysis of inventory holdings specifically, and will impact firms in general to the degree that captured income streams are meaningful. Thus, this shift can impact Duration Gap Analysis and related hedging. In a similar vein, policies of just-in-time delivery of inventory can be viewed as way to keep inventory duration short for a manufacturer. However, just-in-time delivery inventory management is often done at the expense of the supplier. Under methods described herein, the holder of inventory can shift the economics of holding inventory through owner/holder control without need to resort to a game of who is eating, and who is paying for, a "free lunch".

The capacity to define inventory in this manner creates the opportunity for working relationships between treasury departments, procurement departments and dealers that do not currently exist. Within these new working relationships, corporate treasurers with eligible inventory may be induced to participate in using an Inventory Management Machine and to organize inventory, not just by part number, but by a quasi-fungibility matrix according to parameters that maximize the ability to earn an interim return on an inventory item prior to its consumption in production. This will allow for physical movement of parts, the efficiency of which is in large part a function of logistics; creation of receipt systems by which receipts for inventory are traded without mandatory physical movement of underlying items; and creation of benchmark indices, which can serve as products independently or as the basis for other financial products such as, but not limited to, forwards, options and swaps. While the repo mechanism may occasionally distort markets through short squeezes, most often new supply from repo eligible inventory will likely act to smooth market movements and provide supply to minimize shortages under many conditions.

In this framework, Procurement Managers can have an active role, both in terms of managing specific items or groups of items for quasi-fungible inventory loans by Treasury while managing inventory needs for production lines, since it may be desirable to a firm to keep these perspectives/objectives in balance and synchronization. Part of the described integrated financial product/inventory management approach can consist of an awareness of Reference $\xi$ and candidate alternative $\zeta_j$ for any production run, in terms of economic efficiency (via Treasury) and in terms of alternate inventory availability based upon parameters certified by an engineering department.

The subject invention's classifying of inventory through quasi-fungibility will likely create at least two tiers of quasi-fungible product around a single Reference $\xi$ according to whether or not a given quasi-fungibility search includes an absolute constraint of "Engineering Tested" to a particular use, especially for electronic components. In a case where a given quasi-fungibility search includes an absolute constraint of "Engineering Tested", and that constraint is satisfied by a given candidate alternative $\zeta_j$, then a specific candidate alternative $\zeta_j$ that is Engineering Certified to work in a particular design may have a higher usefulness to a recipient than other alternative $\zeta$. And, in those cases where the same set of quasi-fungibility search constraints return additional candidate alternative $\zeta_j$ that are not certified, they may have lower usefulness to a particular recipient. This difference has implications for financial product design because the sets of differently certified parts are likely to have some element of price tracking error or basis risk to the Reference $\xi$. Tracking error and basis risk are common problems with standard approaches in portfolio management and hedge product design and use. The incentive therefore is to have many parts Engineering Certified for purposes of returning inventory sets to repo participants. Nonetheless, the effectiveness of using an entire set of candidate alternative $\zeta_j$ as trading hedges will remain, even if there is some tracking error and basis risk since those skilled in the trading art are familiar with well tested compensation techniques for these parameters.

For the part of the transaction from Inventory Source 1200--to--Dealer 1202--to--Cash Market 1206, the profit to the Dealer 1202 from Inventory Source 1200 is a function of the value of the underlying and an interest rate r for the transaction. The cash market component is defined by $+/-\Delta P$, where $\Delta P$ is the difference in value between a Reference $\xi$ sold and the value of the same Reference and one or more candidate alternatives $\zeta_j$ purchased in the open market. This number may be quite large and eclipse the income produced by r, depending on market conditions. While $\Delta P$ may not necessarily be desirable to a dealer wanting to run a matched repo book, the risk profile of the open market position (which may be either short or long) is quite desirable for designing and hedging derivative products for a Reference $\xi$ and a given set $\psi$ of candidate alternatives $\zeta_j$ as illustrated in the below discussion of hedging and in Repo Version B as shown in FIG. 14 and FIG. 15.

In FIG. 14 a Dealer 1402 has established a short cash position with a flow from an Inventory Source 1400-to-Dealer 1402-to Cash Market 1404. In this non-limiting example, the inventory source might be a device manufacturer, franchise distributor, speculator who is financing purchases, and component and subassembly manufacturers. Against this position Dealer 1402 has bought a forward contract on a Reference $\xi$ from a Device Manufacturer 1406 which is based on and priced to an Index 1410 on Reference $\xi$ and $\psi^* = \{\xi, \zeta_j \subset \psi\}$ on a floating price basis at Price$_{Index}$. The Index is created and priced in the Practical Engine 465 by a Financial Product Machine 470 of FIG. 4 and at least one Inventory Management Machine 510 of FIG. 4 from a set $\psi^* \{\xi, \zeta_j \subset \psi\}$ based on Reference $\xi$.

The index base and the set for the forward are determined through the selection process for Domain of Interest $\mathcal{D}$, , specification of one or more Reference $\xi$ and one or more iterations of at least one of a constraint set $\Phi$, a minimum quasi-fungibility threshold $\Psi$, an emphasis scoring function E, a Self-adaptive Reference Conditioning Operator A, a Reference Conditioning Function C, Programmability Conditioning Function P and Anti-fungibility Function $\hat{M}$ as appropriate to determine a set $\psi$ of candidate alternatives. The Device Manufacturer 1406 of FIG. 14 has thus established a price hedge against a Production Commitment 1408 for the Reference $\xi$ at Price $P_1$ as a Contract Procurement Purchase from a Component Manufacturer. Alternatively, this structure could be for an anticipated cash market purchase. The expiration date for the forward hedge and the delivery schedule for the production commitment would typically be identical. As a non-limiting example of management, all potential augmented sets $\mathcal{V}' = \{\xi, \zeta_j \subset \psi\}$ (consisting of Reference ξ and the accepted candidate alternatives ζ$_j$ in set $\psi$) may be 1) static, meaning fixed for the trade 2) dynamic, meaning updated according to rules and reset conventions contained in a contract 3) updated according to proprietary trading algorithms, especially for a Dealer 1402 with open cash market positions and 4) balanced by an Inventory Source according to inventory drawdown protocols for a production line.

Corresponding to the short position in the forward held by the Device Manufacturer 1406, the Dealer 1402 has established a long position in the forward contract on Reference which he has hedged with the repo-to-cash market short sale combination based on either a Reference ξ or one or more ζ in $\psi$ (in other words, based on augmented set $V''=\{\xi,\zeta_j \subset \psi\}$). Ideally, the repo contract is Term Repo that expires with the hedge and is thus liquidated with the hedge. This helps keep cash flows balanced, but date mismatch is to be expected by a Dealer as it would be with hedge books for other types of financial products.

Quasi-fungibility and market parameters of the FIG. 14 and FIG. 15 trade pairs are monitored by the Practical Engine 465 which interfaces to one or more industry standard trading and position management systems 467 of FIG. 4. The industry standard trading and position management systems provide front, middle and back office support functions such as collateral management, risk analysis, payments and collections, connections to exchanges, and other ancillary services associated with management of a trading portfolio and its associated positions and inventory.

Figure 16:
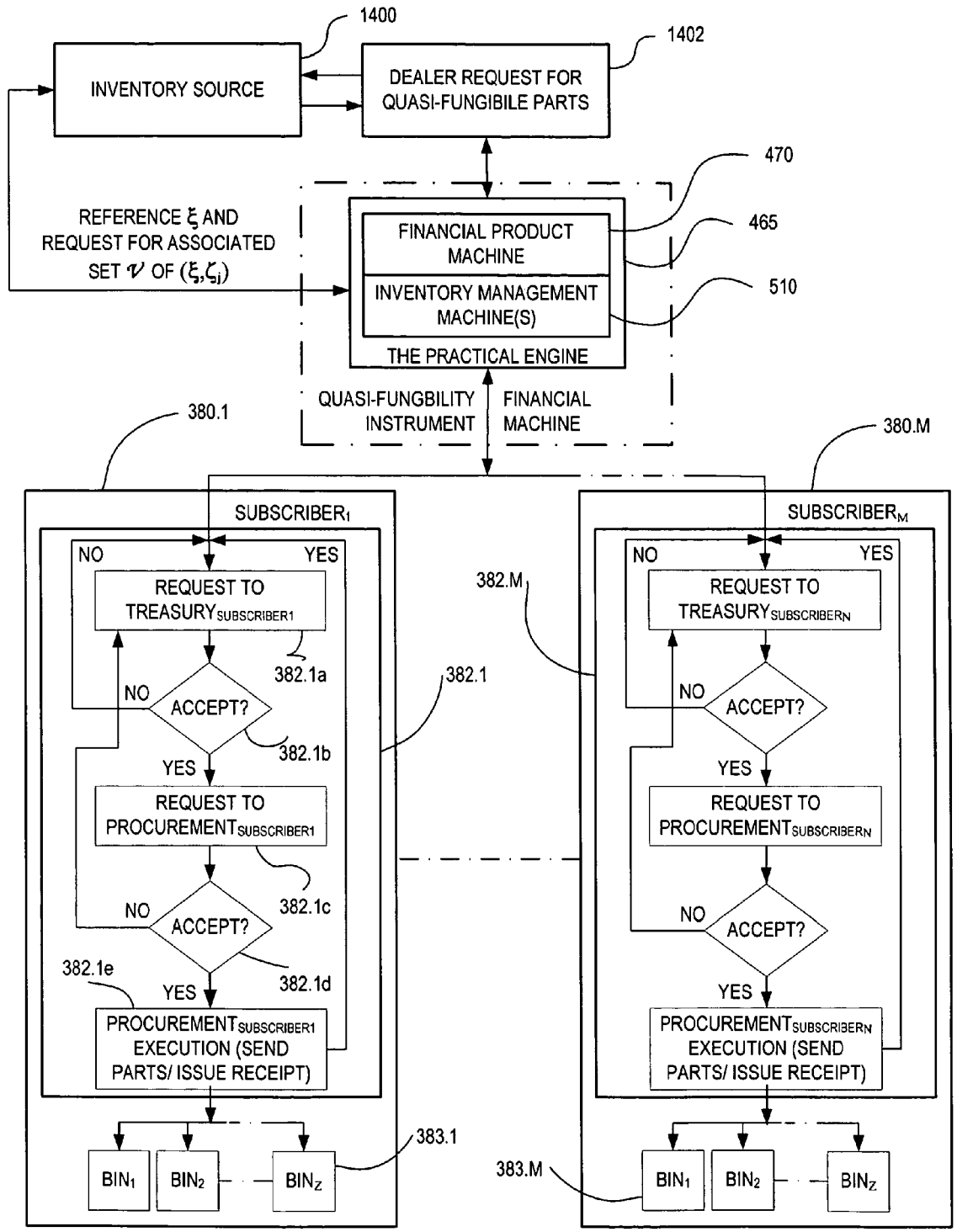
FIG. 16 is a logic flow chart showing the issuance of inventory receipts and, alternatively, the release of physical parts related to the repo trades depicted in FIGS. 14 and 15.
Figure 17:
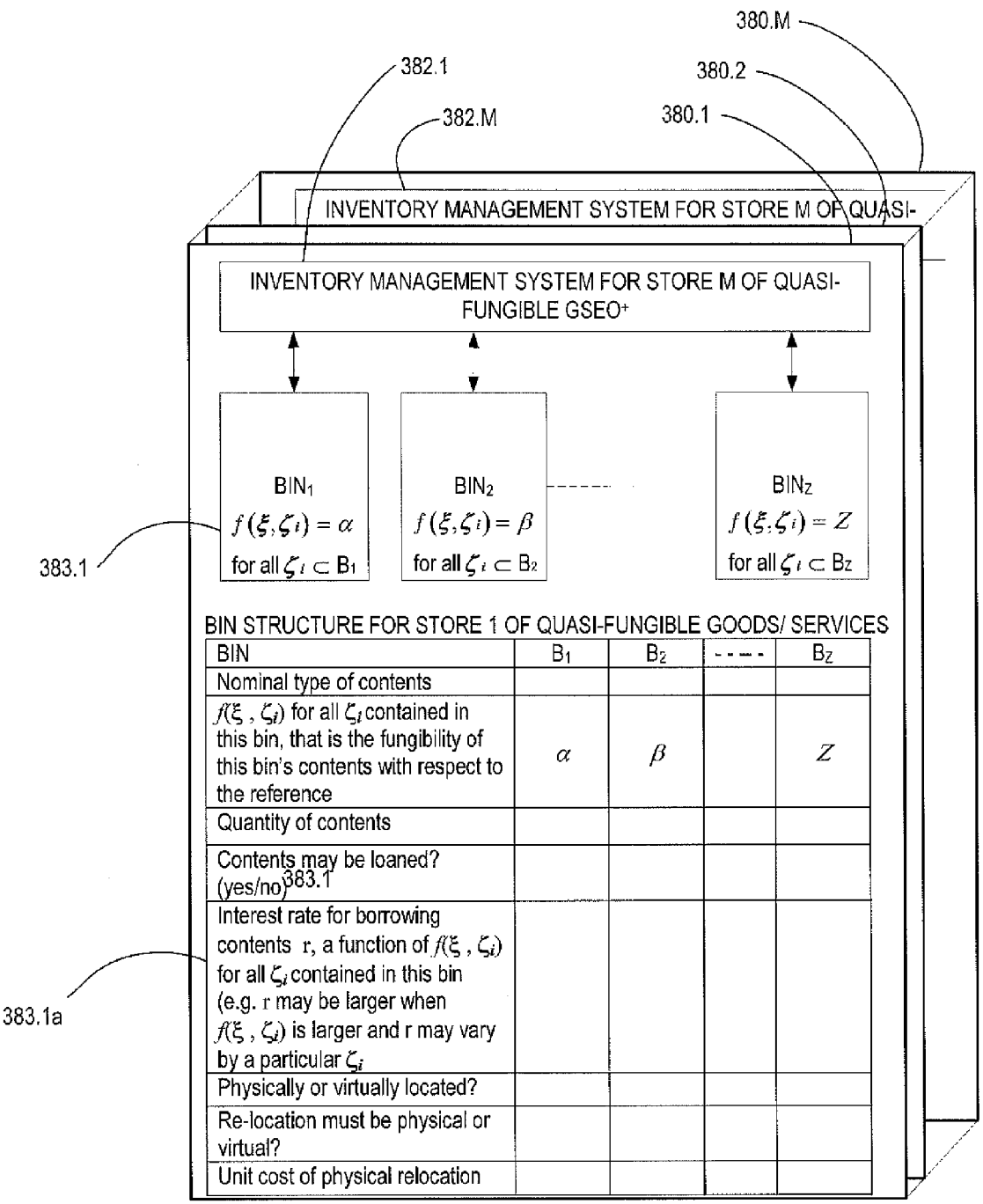
FIG. 17 is a detailed view of real or virtual inventory bins and attendant data center and inventory management system functionalities.

FIG. 16 details part of a process for the issuance of inventory receipts and, alternatively, the release of physical parts related to the repo trades depicted in FIG. 14 and FIG. 15. In this non-limiting example, in response to a Dealer 1402 request for quasi-fungible parts (and at the close of a trade to return them), Reference ξ and associated set V of augmented set $V''=\{\xi,\zeta_j \subset \psi\}$. Inventory Source 1400 sends information about Reference ξ to at least one Inventory Management Machine 510 according to the search protocols described above, which returns set $\psi$ of (ξ,ζ$_j$) per already described methods. The output from the search is sent from at least one subscriber Inventory Management Machine 510 via the Practical Engine 465 to at least one of a plurality of User and Subscriber Quasi-Fungibility GSEO Sites and Data/Centers 380.1, 380.2, 380.M of FIG. 3 and detailed further in a GSEO decision flow in 382.1 and 382.M of FIG. 16. The request for parts goes first to the subscriber Treasurer 382.1a who reviews/negotiates the terms of the request and, at decision block 382.1b, either rejects the request, sending a message back to the Dealer 1402 requestor, or accepts the request and forwards it to Procurement 382.1c. Procurement 382.1c either rejects the request and notifies the Treasurer 382.1b or accepts it at decision block 382.1d and processes it through Procurement Execution 382.1e by either sending quasi fungible parts from Quasi-Fungible inventory bins 383.1 or issuing a paper or virtual receipt on said parts for inventory in the same bins. Shown in FIG. 17 are non-limiting details of real or virtual inventory bins 383.1 and some items that partially comprise an inventory receipt 383.1a per block 560 of FIG. 4.

At the termination of the trade in FIG. 15, the following cash flows, absent commissions and similar costs, can result. Inventory Source 1400 of FIG. 15 buys back parts and pays to a Dealer 1402 a fee based on the Notional Value of the Trade, V, plus interest, where the Notional Value of the Trade plus interest means an agreed upon interest rate convention such as, but not limited to $$V e^{r \zeta_j (T-t)},$$

with $r_{\zeta_j}$ being an interest rate associated with a particular quasi-fungible alternate candidate ζ$_j$. Dealer 1402 buys parts in the Cash Market 1404 at the Value of the Trade +/−ΔP where ΔP=P(T)−P(t$_0$) with T being Time Terminus and t$_0$ being the start time of the trade. Dealer 1402 pays to or (receives from) the Device Manufacturer 1406 the Notional Value of the Trade times +/−ΔP$_{Index}$, where ΔP$_{Index}$ is the change in the value of the index 1410 used to price the forward between the start of the trade and the end, namely ΔP$_{Index}$=P$_{Index}$(T)−P$_{Index}$(t$_0$), with T being Time Terminus and t$_0$ being the start time since the forward is cash settled to the index. A different payoff would be formulated for a forward settling to delivery of its constituent index components. Device Manufacturer 1406 receives from (pays to) Dealer 1402 the Notional Value of the Trade −/+ΔP$_{Index}$, where ΔP$_{Index}$ is the change in the value of the index 1410 used to price the forward between the start of the trade and the end, namely ΔP$_{Index}$=P$_{Index}$(T)−P$_{Index}$(t$_0$), with T being Time Terminus and t$_0$ being the start time since the forward was cash settled to the index. A different payoff would be formulated for a forward settling to delivery of its constituent index components. Device Manufacturer 1406 pays contract price P$_1$ for Production Commitment 1408 or pays market price at hedge expiration for parts hedged. The contract procurement price was fixed at the initiation of the hedge. The open market price is the price available to purchase an augmented set $V''$ consisting of Reference ξ and acceptable quasi-fungible candidate alternatives ζ$_j$ (that is, $V''=\{\xi,\zeta_j \subset \psi\}$) at the termination of the trade, which price should closely match the index.

The payoff for the Dealer 1402 and the Device Manufacturer 1406 will vary in the subject example depending on whether the Dealer 1402 delivers actual parts according to a set $\psi$ of an augmented set $V''$ consisting of Reference ξ and acceptable quasi-fungible candidate alternatives ζ$_j$ (that is, $V'=\{\xi,\zeta_j \subset \psi\}$) or pays (receives) a return on an Index based on augmented set $V''=\{\xi,\zeta_j \subset \psi\}$. In the latter case, the Device Manufacturer 1406 receives parts from an open market purchase or a contracted commitment from a supplier. The cash flow at termination of the derivative may be either-directional depending on prices at termination.

It will evident to one skilled in the art that the Index on augmented set $V''=\{\xi,\zeta_j \subset \psi\}$ can be tied to manufacturer pricing tables for fixed pricing, including price cut schedules as appropriate. It will also be clear to one skilled in the art that, alternatively, the Index based on augmented set $V''=\{\xi,\zeta_j \subset \psi\}$ can float in price relative to the open market price fluctuations of the constituent parts. Thus an Index based on augmented set $V''=\{\xi,\zeta_j \subset \psi\}$ can serve not only as a pricing base for derivatives, but serve as well as a mechanism for pricing an inventory swap. A non-limiting example of parties to such a swap structure would be a Component Manufacturer who receives fixed payment for production and a Device Manufacturer 1406 who pays a Component Manufacturer a fixed price for inventory but receives floating rate for his production.

Further, it will be evident to one skilled in the art that large numbers of individual components for a device as well as subassemblies (including, but not limited to, ordered pairs, triplets, and quadruplets that define component placement on a circuit board and order of placement, such as in "screw, washer, board, washer, nut".) can be processed through the Quasi-fungibility Apparatus, Financial Product Machine and Inventory Management Machine. Thereby, large numbers of products previously thought of as unhedgeable can approach measures of hedgeability. Under the current invention, a computer can be hedged on a possible component-by-component and subassembly-by-subassembly basis until, by the sum of its parts, a large portion of the finished machine can be represented by the sum of its quasi-fungible hedges. Standard methods of factor analysis can aid in this process.

Figure 18:
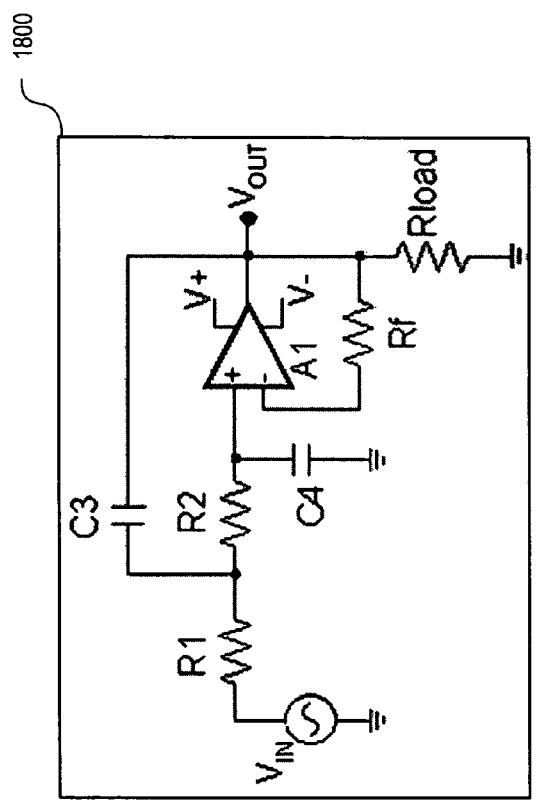
FIG. 18 is a schematic of the electronic circuit for an audio low pass filter.

The ability to hedge on a component basis shown above is extensible. A framework for the hedging of a subassembly follows, using in this non-limiting case a relatively simple schematic 1800 at FIG. 18 for an Audio Low Pass Filter for a DVD player. The basic analysis for constructing sets of quasi-fungible parts for hedging an audio low pass filter subassembly is meant to show a non-limiting way how a progression of basic building blocks using quasi-fungibility based systems and methods can be constructed into larger hedges for larger assemblies and even finished goods and services.

Following the methodology described for Radiology Services, for the single Reference component above, and elsewhere above in the detailed description, each Reference in the audio low-pass filter schematic 1800 is processed through Domain of Interest $\mathcal{D}$, and one or more iterations of at least one of a constraint set $\Phi$, a Minimum Quasi-Fungibility Threshold $\Psi$, and, as appropriate, an Emphasis Scoring Matrix E, a Self-Adaptive Reference Conditioning Operator A, a Reference Conditioning Function C, (if appropriate) a Quasi-fungibility Reference Conditioning Operator $\hat{M}$, and Programmability Reference Conditioning Operator P, to determine a set V of acceptable candidate alternatives $\zeta_j$. Each resulting set $\psi$ is thus the basis for a potential financial product under previously described methods. The audio low-pass filter, filter itself, is the sum of its parts (plus assembly costs plus associated materials such as substrate and solder) so the base for a financial product on an audio low-pass filter 1800 subassembly in a device such as a DVD player is simply that financial product built from a set of all $\psi$ for the product, $\psi_K$, as listed below. As was already shown for a single component, a financial product could be built from each and any of the Reference $\xi$, the sets $\psi$, and the augmented sets $\psi'$. However, the object in the current non-limiting example is to show the aggregation of augmented sets $\psi'$ for each of a plurality of Reference $\xi$ into a single set which comprises the basis for such products. For each Reference $\xi_i$, the set $\psi$ of acceptable candidate alternatives $\zeta_j$ found for financial product development is shown in the list below as based on circuit diagram 1800 at FIG. 18 and the list of parts for the audio low pass filter 1800 in FIG. 19, FIG. 20 and FIG. 21.

Reference $\xi_1$=A1 $\psi_1$={$\zeta_{1,1}, \zeta_{1,3}, \zeta_{1,5}$}
Reference $\xi_2$=R1 $\psi_2$={$\zeta_{2,2}, \zeta_{2,4}, \zeta_{2,6}$}
Reference $\xi_3$=R2 $\psi_3$={$\zeta_{3,7}, \zeta_{3,8}$}
Reference $\xi_4$=Rf $\psi_4$={$\zeta_{3,7}, \zeta_{3,8}$}
Reference $\xi_5$=Rload $\psi_5$={$\zeta_{3,7}, \zeta_{3,8}$}
Reference $\xi_6$=C3 $\psi_6$={$\zeta_{6,1}, \zeta_{6,3}, \zeta_{6,4}, \zeta_{6,23}$}
Reference $\xi_7$=C4 $\psi_7$={$\zeta_{7,1}$}

The chain of augmented sets follows as: $\psi'_1$={$\xi_1, \psi_1$}, $\psi'_2$={$\xi_2, \psi_2$} ... {$\xi_K, \psi_K$}.

And for this example, the basis for a financial product based on the audio low pass filter 1800 is function:
f($\psi_K$) (or f($\psi'_K$)), where $\psi_K$={$\psi_1, \psi_2, \ldots, \psi_7$}
(and where $\psi'_K$={($\xi_1, \psi_1$), ($\xi_2, \psi_2$), ..., ($\xi_K, \psi_K$)})

It will be evident to one skilled in the art that arbitrage potential between individual financial products on the constituent components of the example filter and the subassembly hedge will be high. Arbitrage possibilities represented by linkages of financial products on individual Reference operational amplifiers to other products containing a given Reference or a quasi-fungible set of operational amplifiers based on the same given Reference likely will be commercially viable as well. The multiple use aspects of common parts and certain cross-product subassemblies provide a link that can bind hedge products in one industry sector to another, which in turn ties to building blocks for the creation of meso financial products as discussed elsewhere in this application.

The subject invention applies as follows to an illustrative case based on an audio low pass filter that removes high-frequency digital-to-analog conversion sampling noise from music in a DVD player. Still referring to FIG. 18, the sub-assembly for a single channel of audio low-pass filter consists of one operational amplifier (A1) four resistors (R1, R2, Rf and Rload) and two capacitors (C3 and C4). It is noted that to optimize space and cost in some DVD player designs, the one operational amplifier may be one channel of a dual- or quad-channel package and that a sub-assembly may encompass more than a single low-pass filter. However for clarity of this non-limiting example, it is assumed that the one operational amplifier is in its own package and forms the active circuitry of a self contained low-pass filter sub-assembly. The twelve specifications $\xi_{1,1}$ through $\xi_{1,12}$ on the Reference $\xi_1$ for the operational amplifier A1 are shown in FIG. 19. The nine specifications $\xi_{2,1}$ through $\xi_{2,9}$ on the Reference for the resistor R1 are also shown in FIG. 19, as are the nine specifications $\xi_{3,1}$ through $\xi_{3,9}$ on the Reference 43 for the resistor R2, the nine specifications $\xi_{4,1}$ through $\xi_{4,9}$ on the Reference $\xi_4$ for the resistor Rf, and the nine specifications $\xi_{5,1}$ through $\xi_{5,9}$ on the Reference $\xi_5$ for the resistor Rload. The ten specifications $\xi_{6,1}$ through $\xi_{6,10}$ on the Reference $\xi_5$ for the capacitor C3 are shown in FIG. 20, as are the ten specifications $\xi_{7,1}$ through $\xi_{7,10}$ on the Reference $\xi_7$ for the capacitor C4.

As shown above, the set of candidate alternatives that were found suitable for the development of quasi-fungibility based financial products relative to the Reference $\xi_1$ for the operational amplifier A1 are the elements of the set $\psi_1$={$\zeta_{1,1}, \zeta_{1,3}, \zeta_{1,5}$}. Likewise, the set of candidate alternatives that were found suitable for the development of quasi-fungibility based financial products relative to the Reference $\xi_2$ for resistor R1 are the elements of the set $\psi_2$={$\zeta_{2,2}, \zeta_{2,4}, \zeta_{2,6}$} and so on for Reference $\xi_3$ (resistor R2) through Reference $\xi_7$ (capacitor C4).

The set of candidate alternatives that were found suitable for the development of quasi-fungibility based financial products relative to the Reference $\xi_1$ for the operational amplifier A1, namely $\psi_1$={$\zeta_{1,1}, \zeta_{1,3}, \zeta_{1,5}$} resulted from the following process:

The Domain-of-Interest $\mathcal{D}$, was defined as "low power operational amplifier integrated circuits". After a few iterations, the constraint set $\Phi$, was narrowed down to the overriding constrains for the candidate alternatives must (a) have a gain bandwidth of at least 24 MHz (b) that the slew rate must be at least 12 volts per microsecond (c) must be packaged as a single channel device in an SOT-23 package using a standard National Semiconductor Corporation pin-out for a single op amp in that package and (d) the published budgetary price per device in volumes of 1,000 and greater must not exceed $1.10.

Within those constraints, quasi-fungibility was measured according to at least one method described above and the final set $\psi$ (in this case $\psi_1$ to reflect that it is a set of candidate alternatives specific to Reference $\xi_1$) was generated in the manner described above.

Neither the Reference Conditioning Function C, nor the Reference Conditioning Operators A, $\hat{M}$ or P were applied in this case. However, because of a high value placed on driving a strong and linear output current while consuming little power to drive the circuitry itself, an Emphasis Scoring Function, E, was used to narrow the range of candidate alternatives under consideration by placing a high importance on two specifications: 1) Supply Current per Channel at Reference specification $\xi_{1,5}$ and candidate alternative specification $\zeta_{1,j}$, 5, respectively and 2) Linear Output Current at Reference specification $\xi_{1,6}$ and candidate alternative specification $\xi_{1,j}$, 6, respectively.

By comparing the Reference $\xi_1$ in FIG. 19 with the candidate alternatives in FIG. 21, an extensible logical basis for constructing set $\psi_1=\{\zeta_{1,1}, \zeta_{1,3}, \zeta_{1,5}\}$ is illustrated: 1) Candidate alternative $\zeta_{1,4}$ was eliminated by an over-riding constraint set $\Phi$ requirement that Gain Bandwidth be at least 20 MHz versus the 4 MHz, and a requirement that the slew rate be at least 12 volts per microsecond versus the 1.5 volts per microsecond, provided by candidate alternative $\zeta_{1,4}$; and 2) Candidate alternative $\zeta_{1,2}$ which would pass a first sort based on over-riding constraints was nonetheless eliminated because it was not sufficiently quasi-fungible to the Reference once the Emphasis Scoring Function E was applied to raise the importance of the two characteristics for Current per Channel and Linear Output Current. In other words, candidate alternative $\zeta_{1,2}$ was eliminated because of $|f(\xi_1^E, \zeta_{1,2}^E)| < \Psi^E$ with respect to Reference $\xi_1$.

It will be evident to one skilled in the art that the construction of financial products based on sets of components, subassemblies and assemblies can be fine-tuned. Maximum-fit-to-hedge-needs can be obtained by using quasi-fungibility optimizations in the Primary Quasi-Fungibility (Q-F) Optimization Module 385 of FIG. 3, and in the iterations of the iterative metric subspace generator 440 of FIG. 3, in combination with such industry standard techniques in the Secondary Optimization Module 387 of FIG. 3 to construct financial products 465 of FIG. 4 for a given hedge book structure. Key among such products for a robust dealer book are likely to be swaps.

It will be evident to those skilled in the art that the creation of a swaps market for inventory follows from the above described methods for inventory finance, forwards, indices and production-based inventory consumption. In the context of the current discussion, recall the comparison of inventory to either a zero coupon bond or coupon bearing bullet bond. This is equivalent to a "received fixed" payment position in a typical swap, given that the inventory is sold for a margin of profit. Typically, inventory holders finance these positions with bank borrowings at floating rates, often tied to LIBOR or the Prime Rate. The bank borrowings are therefore the equivalent of a short position in a floating rate note. The combination of a "receive fixed" position with a "pay float" position is a basic structure of cash flows that provide the basis for a swap. The current invention provides a system and method for increasing inventory liquidity to support development of an actual swap product based on physical inventory to hedge these otherwise locked-up cash flows.

The below table is a glossary of terms used throughout the above description of the subject invention. It is to be understood that the below glossary of terms of Table 1 are only general examples of possible terminology, and are not to be strictly construed as limiting definitions. Further, the use of like terms in above examples similar to glossary terms are to take precedence over the glossary term definitions of Table 1 for the example in which said term(s) are employed.

TABLE 1

| Symbol | Meaning |
| --- | --- |
| Subscriber-user, subscriber | Subscriber-users (also called subscribers) are subscription and similar users of the System and Method. In a preferred embodiment among the plurality of possible subscribers, in a non-limiting list, are, Corporate Treasurers, Procurement Managers, Purchasing Agents, Inventory Control Specialists, Product Engineers and Developers, Union Officials, Database Managers, Insurers, and Actuaries. |
| Repurchase and reverse repurchase agreements (repo and reverse) | A repurchase agreement is a financial product based on well established protocols for short term financing. In a classic repurchase agreement(repo) a security is sold to a second party for cash. The process is closed by reversing the process (reverse repo or reverse) and selling back the security for the cash with an associated fee which is typically based on an interest rate and the value of the underlying. The sale-buyback made against securities is generally unwound without an adjustment to the price of the purchase and sale, which feature keeps the transaction in the realm of basic financing. When the securities used in repo and reverse are highly liquid, the repo is treated like a money-market instrument. Many variations of this simple premise exist and will be known to one skilled in the art. In the context of a preferred embodiment of the current invention, the capacity of a market place to engage in repo is enabled or broadened through use of the System and Method. Under the System and Method, one or more Reference $\xi$ and quasi-fungible alternative candidate $\zeta_j$ may serve in place of a "security" to support the transaction. The System and Method contemplates repo transactions based upon quasi-fungible good/services/events/outcomes. |
| Quasi-fungible | Inter-changeable with a Reference (or user-conditioned version of a Reference) item given a particular use, specification or set of specifications such that the element of quasi-fungibility is defined in terms of a measure of inter-changeability for a good/service/event/outcome or combination thereof on a scale of 0 to 1.00 where 0 means non-fungible and 1.00 means totally fungible. |
| Quasi-anti-fungibility | Quasi-anti-fungibility is a measure of the degree to which a candidate alternative $\zeta_j$ to Reference $\xi$ contains antidotes, antithetical effects, reciprocals, mirrors, counter-agents, neutralizers or nullifiers of at least one specifications/use of Reference $\xi$.<br>The measure of quasi-anti-fungibility of a candidate alternative $\zeta_j$ with respect to a Reference $\xi$ (or user-conditioned version of a Reference $\xi$, (one non-limiting example being $\xi^A$), given a particular use, specification or set of specifications, is defined on a scale of −1.00 to 0, where −1.00 means totally anti-fungible and 0 means non-anti-fungible. |
| $\xi$ | The representation of the Reference item as a 1 by N column vector in multi-dimensional vector space RN. (Note that a symbol for a vector is a bold font.) |
| $\xi_1, \xi_2, \xi_3, \ldots, \xi_N$ | The individual rows of column vector $\xi$ which represent the $1^{st}, 2^{nd}, 3^{rd}, \ldots, N^{th}$ specifications/uses of the Reference item. (Note that the symbols for the individual rows of column vectors are non-bold subscripted versions of the symbol for the vector itself.) |

TABLE 1-continued

| Symbol | Meaning |
|---|---|
| $\zeta_j$ | The representation of the $j^{th}$ item in the database of quasi-fungible candidate alternatives to the Reference item. The $\zeta_j$ are also 1 by N column vectors in multi-dimensional vector space $\mathbf{R^N}$. (Note that a symbol for a vector is a bold font. The vectors that represent candidate alternatives to the Reference item $\xi$, namely $\zeta_j$, are indexed by a bold subscript.) |
| $\zeta_{1j}, \zeta_{2j}, \zeta_{3j}, \ldots, \zeta_{Nj}$ | The individual rows of column vector $\zeta_j$ that represent the $1^{st}, 2^{nd}, 3^{rd}, \ldots, N^{th}$ specifications/uses of the $j^{th}$ item in the database of quasi-fungible candidate alternatives to the Reference item $\xi$. (Note that the symbols for the individual rows of column vectors are non-bold subscripted versions of the symbol for the vector itself. In the case of vector $\zeta_j$, since it is indexed by a subscript as a vector, the individual rows bear a pair of subscripts, the first denoting the individual row, and the second, in bold, denoting the index of the vector itself.) |
| D | The identifier for the domain-of-interest filter used when searching the database of quasi-fungible candidate alternatives to the Reference. |
| $\Phi$ | The constraint set identifier used when searching the database of quasi-fungible candidate alternatives to the Reference. Constraint set $\Phi$ is directly and repeatedly adjustable by the user. By adjusting $\Phi$, the user may easily and precisely drive the quasi-fungiblity measurement and set generation processes to reflect subjective judgments and precise financial product needs. Within any given session, the initial set-up of $\Phi$ is written as $\Phi_0$ and subsequent adjustments to $\Phi$ are identified as $\Phi_1, \Phi_2$, etc. |
| $f(\xi, \zeta_j)$ | A quasi-fungibility measurement function that measures the quasi-fungibility between the Reference $\xi$ and any quasi-fungible $j^{th}$ item in the database of quasi-fungible candidate alternatives to the Reference, namely $\zeta_j$ |
| $f(\xi, \zeta_j) = \left(\frac{1}{(1+d)}\right)$, where $d = \left(\sum_{i=1}^{N} |\xi_i - \zeta_{ij}|^u\right)^{1/u}$, where $\xi_i$ is the ith row of vector $\xi$ | One implementation of a quasi-fungibility measurement function $f(\xi, \zeta_j)$ that measures quasi-fungibility between a Reference, namely $\xi$, and a $j^{th}$ (any) item in a database of quasi-fungible candidate alternatives to a Reference, namely $\zeta_j$. This particular implementation of $f(\xi, \zeta_j)$ is based on a distance function d, where d is a multi-dimensional distance function $d = \left(\sum_{i=1}^{N} |\xi_i - \zeta_{ij}|^u\right)^{1/u}$ that is either Euclidean (in a case in which u = 2), or non-Euclidean (in cases in which u ≠ 2) |
| $f(\xi, \zeta_j) = \left(\frac{(\xi)^T \zeta_j}{\|\xi\|\|\zeta_j\|}\right)$ | $f(\xi, \zeta_j) = \left(\frac{(\xi)^T \zeta_j}{\|\xi\|\|\zeta_j\|}\right)$, referred to as an $l_2$ norm, is an alternative implementation to a distance-based quasi-fungibility measurement function, with the special advantage that it measures quasi-anti-fungibility |
| $\psi$ | The quasi-fungibility threshold. $\psi$ is a real valued positive number that is a minimum quasi-fungibility threshold that must be satisfied (that is, $|f(\xi,\zeta_j)| \geq \psi$ is required) for any and all $\zeta_j$ to be further processed and considered as quasi-fungible candidate alternatives to a Reference. By adjusting $\psi$, a user may easily and precisely drive a quasi-fungibility measurement and subset generation processes to reflect subjective judgments and precise financial product needs. Within a given session, the initial set-up of $\psi$ is written as $\psi_0$ and subsequent adjustments to $\psi$ are $\psi_1, \psi_2$, etc. |
| E | An Emphasis Scoring Function E that operates on both $\xi$ and the $\zeta_j$ to emphasize or de-emphasize the importance of certain of their corresponding specifications and uses when their quasi-fungibility is measured. E is directly and repeatedly adjustable by a user. By adjusting E, a user may easily and precisely drive quasi-fungibility measurement and subset generation processes to reflect subjective judgements and precise financial product and inventory specifications. Within a given session, the initial set-up of E is written as $E_0$ and subsequent adjustments to E are identified as $E_1, E_2$, etc. |
| $E\xi$ $\xi^E$ | An emphasis scored Reference $\xi$ When E is applied to $\xi$, it is written as $\xi^E$ as a shorthand since $E\xi = \xi^E$ |
| $E\zeta_j$ $\zeta_j^E$ | An emphasis scored candidate alternative $\zeta_j$ When E is applied to $\zeta_j$, it $\zeta_j$ is written as $\zeta_j^E$ as a shorthand since $E\zeta_j = \zeta_j^E$ |
| $f(E\xi, E\zeta_j)$ | A quasi-fungibility measurement function that measures the quasi-fungibility between an Emphasis Scored Reference $\xi$ and any Emphasis Scored quasi-fungible $j^{th}$ item in the database of quasi-fungible candidate alternatives to the Reference, namely $\zeta_j$. |
| $f(E\xi, E\zeta_j) = \left(\frac{1}{(1+d^E)}\right)$, where $d^E = \left(\sum_{i=1}^{N} |\xi_i^E - \zeta_{ij}^E|^u\right)^{1/u}$, where $\xi_i^E$ is the $i^{th}$ row of vector $\xi^E$, where $\xi^E = E\xi$, where $\zeta_{ij}^E$ is the $i^{th}$ row of vector $\zeta_j^E$, and where $\zeta_j^E = E\zeta_j$ | One implementation of a quasi-fungibility measurement function $f(E\xi, E\zeta_j)$ is used for measuring fungibility between an Emphasis Scored version of a representation of a Reference, namely $E\xi$, and an Emphasis Scored version of a representation of a $j^{th}$ good/service/event/outcome in a data base, namely $E\zeta_j$. This particular implementation of $f(E\xi, E\zeta_j)$ is based on a distance function d, where d is a multi-dimensional distance function $d^E = \left(\sum_{i=1}^{N} |\xi_i^E - \zeta_{ij}^E|^u\right)^{1/u}$ that is either Euclidean (in the case in which u = 2), or non-Euclidean (in the cases in which u ≠ 2) |
| $f(E\xi, E\zeta_j) = \left(\frac{(E\xi)^T E\zeta_j}{\|E\xi\|\|E\zeta_j\|}\right)$ | $f(E\xi, E\zeta_j) = \left(\frac{(E\xi)^T E\zeta_j}{\|E\xi\|\|E\zeta_j\|}\right)$, referred to as an $l_2$ norm, is an alternative implementation to distance-based quasi-fungibility measurement functions used for measuring quasi-fungibility between an Emphasis Scored version of a representation of a Reference $\xi$, namely $E\xi$, and Emphasis Scored version of a representation of a $j^{th}$ good/service/event/outcome in a data base, namely $E\zeta_j$, with a means to measure quasi-anti-fungibility properties |
| $C_{k\xi}$ | The Circumstance-based Reference Conditioning Function. By applying a Circumstance-based Reference Conditioning Function $C_{k\xi}$ to a Reference $\xi$ thereby creating a conditioned Reference $\xi^C$ against which quasi-fungibility of each $\zeta_j$ in a current set $V_{q+1}$ will be re-evaluated under special market conditions (for example, but not limited to, rain or labor strikes). The purpose of a Circumstance-based Reference Conditioning Function $C_{k\xi}$ is to allow adjustments |

TABLE 1-continued

| Symbol | Meaning |
|---|---|
| | to one or more individual specifications of a Reference. By adjusting $C_{k\xi}$, a user may easily and precisely drive quasi-fungibility measurement and subset generation processes to reflect subjective judgements regarding special circumstances or market conditions and precisely define financial products and inventory optimization. Within a given session, an initial set-up of $C_{k\xi}$ is written $C_{0\xi}$ and subsequent adjustments to $C_{k\xi}$ are identified as $C_{1\xi}$, $C_{2\xi}$, etc. A subscript index, k, is a method in one embodiment by which a particular function C is stored, cataloged and retrieved from libraries. A subscripts index $\xi$ to C is a reminder that C operates only on $\xi$ unlike an emphasis scoring function E that operates in one embodiment on both $\xi$ and the $\zeta_j$. |
| $\xi_k^C$ | When $C_{k\xi}$ is applied to $\xi$, it is written as $\xi_k^C$ as a shorthand since $C\xi = \xi^C$ |
| $f(C\xi, \zeta_j)$ | The general form of a quasi-fungibility measurement function used for measuring quasi-fungibility between a user-conditioned version of a representation of a Reference (here, a Circumstance-based user-conditioned version), namely $C\xi$, and an unmodified representation of a $j^{th}$ good/service/event/outcome in a data base, namely $\zeta_j$. A Circumstance-based Conditioning Function C is used to drive system algorithms to produce financial products and inventory optimizations in which certain specifications/uses of a $\zeta_j$ are highly quasi-fungible (or quasi-anti-fungible) with certain specifications/uses in a Reference item which have been modified to reflect special circumstances (e.g. floods or labor strikes). |
| $f(C\xi, \zeta_j) = \left(\dfrac{1}{(1+d^C)}\right)$, where $d^C = \left(\sum_{i=1}^{N} |\xi_i^C - \zeta_{ij}|^u\right)^{1/u}$, where $\xi_i^C$ is the $i^{th}$ row of vector $\xi^C$, and where $\xi^C = C\xi$ | One implementation of a quasi-fungibility measurement function $f(C\xi, C\zeta_j)$ used for measuring fungibility between a Circumstance-based user-conditioned version of a representation of a Reference, namely $C\xi$, and an unmodified representation of a $j^{th}$ good/service/event/outcome in a data base, namely $\zeta_j$. This particular implementation of $f(C\xi, C\zeta_j)$ is based on a distance function d, where d is a multi-dimensional distance function $$d^C = \left(\sum_{i=1}^{N} |\xi_i^C - \zeta_{ij}^C|^u\right)^{1/u}$$ that is either Euclidean (in the case in which u = 2), or non-Euclidean (in the cases in which u ≠ 2) |
| $f(C\xi, \zeta_j) = \left(\dfrac{(C\xi)^T \zeta_j}{\|C\xi\|\|\zeta_j\|}\right)$  $f(C\xi, \zeta_j) = \left(\dfrac{(C\xi)^T \zeta_j}{\|C\xi\|\|\zeta_j\|}\right)$, | referred to as an $l_2$ norm, is an alternative implementation to distance-based quasi-fungibility measurement functions used for measuring quasi-fungibility between a Circumstance-based user-conditioned version of a representation of a Reference $\xi$, namely $C\xi$, and an unmodified representation of a $j^{th}$ good/service/event/outcome in a data base, namely $\zeta_j$, with a means to measure quasi-anti-fungibility properties. |
| $A_{g\xi}$ | The Self-Adaptive Reference Conditioning Operator. The Self-Adaptive Reference Conditioning Operator is used to drive the System and Method to search for, retrieve, evaluate, form sets of, and create financial products around quasi-fungible candidate alternatives $\zeta_j$ to Reference $\xi$ that have certain self adaptive and evolutionary properties specified by applying $A_{g\xi}$ to $\xi$. $A_{g\xi}$ is indexed by the subscripts g$\xi$ to indicate that A operates on Reference $\xi$ and is kept track of in the system libraries by the indexing schema g. Depending upon the implementation, the Reference Conditioning Operator A may be a matrix-based function or a rule-based operator. (In at least one preferred implementation, whether the Self-Adaptive Reference Conditioning Operator A, is a matrix-based function or a rule-based operator is determined automatically by the System and Method at the point that the user defines the Domain-of-Interest Filter.) When A is a matrix-based function, it is always a square matrix having as many columns as the column vector Reference $\xi$ has rows. Therefore, the matrix multiplication $A\xi = \xi^A$ is well defined by the standard rules of linear algebra. In that case, a GUI guides the user through a process by which the System and Method constructs and verifies the appropriate matrix through a user-system dialog in the (presumably non-methematical) vernacular of the user and the Domain-of-Interest that the user has selected. When A is a rule-based operator, a wizard that is invoked by a GUI guides the user through a process by which the System and Method automatically constructs and verifies that rule-based operator, and expresses it in a canonical form by which quasi-fungibility measurements may be automatically performed between the conditioned Reference $\xi^A$ and candidate alternatives $\zeta_j$. |
| $\xi_k^A$ | When $A_{g\xi}$ is applied to $\xi$, it is written as $\xi_k^A$ as a shorthand since $A\xi = \xi^A$ |
| $f(A\xi, \zeta_j)$ | A general form of a quasi-fungibility measurement function for measuring quasi-fungibility between a modified version (here, a self-adaptive version) of a vector representation of a Reference, and an unmodified vector representation of a $j^{th}$ good/service/event/outcome in a data base. A Self-Adaptive Reference Conditioning Operator A is used to drive system algorithms to produce financial products and inventory optimizations in which certain specifications/uses of $\zeta_j$ are highly quasi-fungible with certain specifications/uses in a Reference which has been modified to reflect special self-adaptive capabilities |
| $f(A\xi, \zeta_j) = \left(\dfrac{1}{(1+d^A)}\right)$, where $d^A = \left(\sum_{i=1}^{N} |\xi_i^A - \zeta_{ij}|^u\right)^{1/u}$, where $\xi_i^A$ is the $i^{th}$ row of vector $\xi^A$, and where $\xi^A = A\xi$ | One implementation of a quasi-fungibility measurement function $f(A\xi, \zeta_j)$, used for measuring quasi-fungibility between a user-conditioned self-adaptive version of a representation of a Reference, namely $A\xi$, and an unmodified representation of a $j^{th}$ good/service/event/outcome in a data base, namely $\zeta_j$. This particular implementation of $f(A\xi, \zeta_j)$ is based on a distance function d, where d is a multi-dimensional distance function $$d^A = \left(\sum_{i=1}^{N} |\xi_i^A - \zeta_{ij}|^u\right)^{1/u}$$ that is either Euclidean (in the case in which u = 2), or non-Euclidean (in the cases in which u ≠ 2) |

TABLE 1-continued

| Symbol | Meaning |
|---|---|
| $f(A\xi, \zeta_j) = \left(\dfrac{(A\xi)^T \zeta_j}{\|A\xi\|\|\zeta_j\|}\right)$ | $f(A\xi, \zeta_j) = \left(\dfrac{(A\xi)^T \zeta_j}{\|A\xi\|\|\zeta_j\|}\right)$, referred to as an $l_2$ norm, is an alternative implementation to distance-based quasi-fungibility measurement functions used for measuring quasi-fungibility between a user-conditioned self-adaptive version of a representation of a Reference $\xi$, namely $A\xi$, and an unmodified representation of a $j^{th}$ good/service/event/outcome in a data base, namely $\zeta_j$, with a means to measure quasi-anti-fungibility properties |
| $\hat{M}_{h\xi}$ | The Quasi-Anti-Fungibility Reference Conditioning Operator. The Quasi-Anti-Fungibility Reference Conditioning Operator is used to drive the System and Method to search for, retrieve, evaluate, form sets of, and create financial products around quasi-fungible candidate alternatives $\zeta_j$ to Reference $\xi$ that have certain anti-fungible properties specified by applying $\hat{M}_{h\xi}$ to $\xi$. Quasi-anti-fungibility is a measure of the degree to which candidate alternatives $\zeta_j$ to Reference $\xi$ contain antidotes, antithetical effects, reciprocals, mirrors, counter-agents, neutralizers or nullifiers of at least one specification/use of Reference $\xi$. $\hat{M}_{h\xi}$ is indexed by the subscripts $h\xi$ to indicate that $\hat{M}$ operates on Reference $\xi$ and tracked in the system libraries by the indexing schema h. Depending upon the implementation, the Reference Conditioning Operator $\hat{M}$ may be a matrix-based function or a rule-based operator. (In at least one preferred implementation, whether the Reference Conditioning Operator $\hat{M}$, is a matrix-based function or a rule-based operator is determined automatically by the System and Method at the point that the user defines the Domain-of-Interest Filter.) When $\hat{M}_{h\xi}$ is a matrix-based function, it is always a square matrix having as many columns as the column vector Reference $\xi$ has rows. Therefore, the matrix multiplication $\hat{M}\xi = {}_\xi\hat{M}$ is well defined by the standard rules of linear algebra. In that case, a GUI guides the user through a process by which the System and Method constructs and verifies the appropriate matrix through a user-system dialog in the (presumably non-mathematical) vernacular of the user and the Domain-of-Interest that the user has selected. When $\hat{M}$ is a are rule-based operator, a wizard that is invoked by a GUI guides the user through a process by which the System and Method automatically constructs and verifies that rule-based operator, and expresses it in a canonical form by which quasi-fungibility measurements may be automatically performed between the conditioned Reference ${}_\xi\hat{M}$ and candidate alternatives $\zeta_j$. |
| ${}_\xi\hat{M}$ | When $\hat{M}_{h\xi}$ is applied to $\xi$, it is written as $\xi\hat{M}$ as a shorthand since $\hat{M}\xi = {}_\xi\hat{M}$ |
| $f(\hat{M}\xi, \zeta_j) = \left(\dfrac{(\hat{M}\xi)^T \zeta_j}{\|\hat{M}\xi\|\|\zeta_j\|}\right)$ | $f(\hat{M}\xi, \zeta_j) = \left(\dfrac{(\hat{M}\xi)^T \zeta_j}{\|\hat{M}\xi\|\|\zeta_j\|}\right)$, referred to as an $l_2$ norm, is an alternative implementation to distance-based quasi-fungibility measurement functions used for measuring quasi-fungibility between a user-conditioned representation of a Reference having quasi-anti-fungible properties, namely $\hat{M}\xi$, and an unmodified representation of a $j^{th}$ good/service/event/outcome in a data base, namely $\zeta_j$. Note: When the user applies $\hat{M}$ to precondition $\xi$, resulting in the modified Reference $\hat{M}\xi$, then a distance based implementation of the quasi-fungibility function $f(\hat{M}\xi, \zeta_j)$, namely $\left(\dfrac{1}{(1 + d^{\hat{M}})}\right)$, where where $\xi_i^{\hat{M}}$ is the $i^{th}$ row of vector ${}_\xi\hat{M}$, and where ${}_\xi\hat{M} = \hat{M}\xi$, is not defined and cannot be used. $d^{\hat{M}} = \left(\displaystyle\sum_{i=1}^{N} \left|\xi_i^{\hat{M}} - \zeta_{ij}\right|^u\right)^{1/u}$, |
| $P_{f\xi}$ | The Programmability Reference Conditioning Operator. The Programmability Reference Conditioning Operator is used to drive the System and Method to search for, retrieve, evaluate, form sets of, and create financial products around quasi-fungible candidate alternatives $\zeta_j$ to Reference $\xi$ that have certain programmable properties specified by applying $P_{f\xi}$ to $\xi$. Programmability refers to the ability of the candidate alternatives $\zeta_j$ to Reference $\xi$ to have certain of their capabilities be defined after the candidate alternatives $\zeta_j$ are manufactured and even after they are delivered. Field programmable gate array integrated circuits are a common but non-limiting illustration of such programmability. $P_{f\xi}$ is indexed by the subscripts $f\xi$ to indicate that $P$ operates on Reference $\xi$ and is tracked in the system libraries by the indexing schema f. Depending upon the implementation, the Reference Conditioning Operator P may be a matrix-based function or a rule-based operator. (In at least one preferred implementation, whether the Reference Conditioning Operator P, is a matrix-based function or a rule-based operator is determined automatically by the System and Method at the point that the user defines the Domain-of-Interest Filter.) When P is a matrix-based function, it is always a square matrix having as many columns as the column vector Reference $\xi$ has rows. Therefore, the matrix multiplication $P\xi = \xi^P$ is well defined by the standard rules of linear algebra. In that case, a GUI guides the user through a process by which the System and Method constructs and verifies the appropriate matrix through a user-system dialog in the (presumably non-mathematical) vernacular of the user and the Domain-of-Interest that the user has selected. When P is a rule-based operator, a wizard that is invoked by a GUI guides the user through a process by which the System and Method automatically constructs and verifies that rule-based operator, and (of critical importance) expresses it in a canonical form by which |

TABLE 1-continued

| Symbol | Meaning |
|---|---|
| | quasi-fungibility measurements may be automatically performed between the conditioned Reference $\xi^P$ and candidate alternatives $\zeta_j$. |
| $\xi^P$ | When $P_{/\xi}$ is applied to $\xi$, it is written as $\xi^P$ as a shorthand since $P\xi = \xi^P$ |
| $f(P\xi, \zeta_j)$ | A general form of a quasi-fungibility measurement function for measuring quasi-fungibility between a modified version (here, a programmable version) of a vector representation of a Reference, and an unmodified vector representation of a $j^{th}$ good/service/event/outcome in a data base. A Programmability Reference Conditioning Operator P is used to drive system algorithms to produce financial products and inventory optimizations in which certain specifications/uses of $\zeta_j$ are highly quasi-fungible with certain specifications/uses in a Reference which has been modified to reflect special programmable capabilities. |
| $f(P\xi, \zeta_j) = \left(\frac{1}{(1+d^P)}\right)$, where $d^P = \left(\sum_{i=1}^{N} |\xi_i^P - \zeta_{ij}|^u\right)^{1/u}$, where $\xi_i^P$ is the $i^{th}$ row of vector $\xi^P$, and where $\xi^P = P\xi$ | One implementation of a quasi-fungibility measurement function $f(P\xi, \zeta_j)$ that is used for measuring quasi-fungibility between a user-conditioned programmable version of a representation of a Reference, namely $P\xi$, and an unmodified representation of a $j^{th}$ good/service/event/outcome in a data base, namely $\zeta_j$. This particular implementation of $f(P\xi, \zeta_j)$ is based on a distance function d, where d is a multi-dimensional distance function $d^P = \left(\sum_{i=1}^{N} |\xi_i^P - \zeta_{ij}|^u\right)^{1/u}$ that is either (Euclidean in the case in which u = 2), or non-Euclidean (in the cases in which u ≠ 2) |
| $f(P\xi, \zeta_j) = \left(\frac{(P\xi)^T \zeta_j}{\|P\xi\| \|\zeta_j\|}\right)$ | $f(P\xi, \zeta_j) = \left(\frac{(P\xi)^T \zeta_j}{\|P\xi\| \|\zeta_j\|}\right)$, referred to as an $l_2$ norm, is an alternative implementation to distance-based quasi-fungibility measurement functions used for measuring quasi-fungibility between a user-conditioned representation of a Reference $\xi$, namely $P\xi$, and an unmodified representation of a $j^{th}$ good/service/event/outcome in a data base, namely $\zeta_j$, with a means to measure quasi-anti-fungibility properties. |
| $V_{q+1}$ | A $(q + 1)^{st}$ set of $\zeta_j$ (and combinatory subsets of $\zeta_j$) generated by an iterative metric subspace generator as candidates for creating quasi-fungibility-based financial products and inventory optimizations using quasi-fungibility based taxonomies. |
| $X_{q+1}$ | A set of sufficiently constrained (with respect to $\Phi$) and quasi-fungible (with respect to $|f(\xi, \zeta_j)| >= \psi$) candidate alternatives $\zeta_j$ that is input into an iterative metric subspace generator at iteration q + 1, which an iterative metric subspace generator then uses along with prior inputs X to form a current output set $V_{q+1}$ |
| Iterative Metric Subspace Generator ("IMSG") | Under the direct control of the user and shaped by the user's personal judgements, the Iterative Metric Subspace Generator (IMSG) forms sets V of candidate alternatives $\zeta_j$ (and combinatory subsets of candidate alternatives $\zeta_j$) to a Reference $\xi$. These sets V, if accepted by the user, are used to form quasi-fungible financial products. In one preferred implementation, the operation and logic of the iterative metric subspace generator generates sets of quasi-fungible candidate alternatives $\zeta_j$, namely sets $V_{q+1}, V_{q+2}, V_{q+3} \ldots$, from user defined combinations of standard logical operations (e.g. union, intersection and complement) on current candidate alternatives $\zeta_j$ in combination with any (and potentially all) previous candidate alternatives $\zeta_j$ contained in a set $V_P$, where set $V_P$ is a logical union of all previous candidate alternatives $\zeta_j$ input into an iterative metric subspace generator since the start of a current user session, and where all candidate alternatives $\zeta_j$ in $V_P$ were sufficiently constrained with respect to the set of over-riding constraints $\Phi_i$ and were sufficiently quasi-fungible with respect to Reference $\xi$, meaning $|f(\xi, \zeta_j)| => \psi_i$, according to the iteration i in which they were input to an iterative metric subspace generator. Because of the iterative nature of an iterative metric subspace generation process, after the current set of candidate alternatives $V_{q+1}$ is generated and sent on for further processing, a copy of it is included in the collection of all the previous sets of candidate alternatives, namely the set $V_P$. In addition, $V_0$ is initialized as $X_0 = \emptyset$ (the null set). |
| Micro Financial Product | Financial products based on a specific asset, liability or commitment. |
| Meso Financial Product | Financial products based on sector-wide assets, liabilities and commitments. Non-limiting examples of Meso Financial Products would be indices, securities and derivatives based on quasi-fungibility that were capable of representing aggregate risk in manufacturing or services, as in a Tier 1 computer parts index or in services, as in a nation-wide index of radiological diagnostic services or legal services with geographical sub-indices. |
| Macro Financial Product | Macro Financial Product refers to Financial Products based on systemic assets, commitments and risks as in the sense of Gross Domestic Product, Producer Price Indices and similar items. Macro Financial Products are among those envisioned as proxies and hedges for broad business cycle risk. |

It will be apparent to those skilled in the art that a number of changes, modifications, or alterations to the present invention as described herein may be made, none of which depart from the spirit of the present invention. All such changes, modifications, and alterations should therefore be seen as within the scope of the present invention.

The invention claimed is:

1. A system for managing an event the system comprising:
  i. a computer processor;
  ii. a computer memory operatively connected to the processor;
  iii. a data storage device comprising a data store, wherein the data storage device and the data store can be queried by the processor;
  iv. a computer readable medium operatively connected to the processor, said medium comprising machine readable program code embodied therein to control and to direct the system to form one or more sets wherein at least one of:
  i) the one or more sets, and
  ii) at least one member of any of the one or more sets comprises a basis for managing the event, the forming and the managing comprising the steps of;
  selecting an event and a reference item in relation to the event, wherein the reference item comprises at least one of i) a reference good; ii) a reference service and, iii) a reference service provider;

selecting a specification of the reference item;
evaluating the specification of the reference item against a specification of one or more alternatives to the reference item;
determining interchangeability between the reference item and the one or more alternatives to the reference item based on evaluating the specification of the reference item in relation to the specification of the one or more alternatives to the reference item,
  wherein the determining of interchangeability is based on or comprises determining at least one of quasi-fungibility and quasi-anti-fungibility,
  wherein quasi-fungibility comprises a degree to which at least one of the one or more alternatives to the reference item is interchangeable with the reference item, and
  wherein quasi-anti-fungibility comprises a degree to which the one or more alternatives to the reference item comprises at least one of a concept, an attribute, a property, and an element anti to at least one of a concept, an attribute, a property, and an element of the reference item;
forming one or more sets based on or comprising the determined interchangeability; and
managing the event based on or comprising at least one of:
  i) the one or more sets, and
  ii) at least one member of any of the one or more sets.

2. The system of claim 1 wherein forming the one or more sets comprises forming one or more first sets on the basis of or comprising a first determined interchangeability and wherein the step of forming the one or more sets further comprises forming at least one additional set based on or comprising at least one additional determined interchangeability by:
  modifying at least one of:
    i) a specification of the reference item,
    ii) a specification of the one or more alternatives to the reference item; and
    iii) the first one or more sets,
  evaluating the specification of the reference item against the specification of the one or more alternatives to the reference item,
  determining at least one additional interchangeability between the reference item and the one or more alternatives to the reference item;
  forming the at least one additional set based on the determined at least one additional interchangeability; and
  managing the event based on or comprising one or more of:
    i) the first one or more sets,
    ii) the at least one additional set, and
    iii) at least one member from any set.

3. The system of claim 1 wherein the event comprises at least one of:
  i) a human event,
  ii) an outcome of a human event,
  iii) a natural event, and
  iv) an outcome of a natural event.

4. The system of claim 1 wherein the reference item comprises at least one of a medical good, a medical service, and a medical service provider.

5. The system of claim 1 wherein at least one of the reference item and the one or more alternatives to the reference item comprises robotics.

6. The system of claim 1 wherein at least one of the specification of the reference item and the specification of the one or more alternatives to the reference item comprises at least one of:
  i) a use of the reference item,
  ii) an application of the reference item,
  iii) a use of one or more alternatives to the reference item, and
  iv) an application of one or more alternatives to the reference item.

7. The system of claim 6 wherein at least one of the use and the application comprises or is based on time.

8. The system of claim 1 wherein the specification of the reference item and the specification of the one or more alternatives to the reference item comprises time and wherein the time comprises at least one of:
  i) a period,
  ii) a frequency,
  iii) a duration, and
  iv) an availability
of at least one of the reference item and the one or more alternatives of the reference item.

9. The system of claim 1 wherein the determining of interchangeability is based on or comprises determining that the reference item and the one or more alternatives to the reference item are at least one of:
  i) at least quasi-fungible,
  ii) at most quasi-fungible,
  iii) at most quasi-anti-fungible, and
  iv) at least quasi-anti-fungible.

10. The system of claim 2 wherein the modification comprises applying a conditioner to the reference item, wherein the conditioner comprises at least one of:
  i) an emphasis conditioner,
  ii) a circumstance-based conditioner,
  iii) a self-adaptive conditioner,
  iv) a quasi-anti-fungibility conditioner, and
  v) a programmability conditioner.

11. The system of claim 1 further comprising a network and wherein the management of the event comprises providing remotely via the network at least one of: a medical service, a medical good, and a medical outcome.

12. The system of claim 1 wherein the machine readable program code is configured to control and to direct one or more set generators to form the one or more sets.

13. The system of claim 12 further comprising program code configured to control and to direct one or more metric space generators in the forming of the one or more sets.

14. The system of claim 8 wherein the time comprises at least one of:
  i. personnel time;
  ii. equipment time; and
  iii. manufacturing time.

15. The system of claim 1 wherein the managing of the event further comprises forming a group of medical service providers based on or comprising at least one of:
  i) the one or more sets, and
  ii) at least two members from any of the one or more sets.

16. The system of claim 1 wherein the management of the event is based on or comprises at least one financial product and wherein the financial product is based on or comprises at least one of:
  i) the determined interchangeability,
  ii) the one or more sets, and
  iii) at least one member of the one or more sets.

17. The system of claim 1 further comprising determining at least one of
  i) a valuation of,
  ii) a financial reserve of,
  iii) a service reserve of,
  iv) a provider reserve of, and
  v) a performance bond for at least one of:
- a) the one or more sets,
- b) at least one member of the set, and
- c) the event, wherein the determining of the at least one of said valuation, said reserves, and said bond is based on or comprises at least one of the determined interchangeability, the one or more sets, and at least one member of the one or more sets, and, wherein the managing of the event comprises or is based on the at least one of the valuation, the reserves, and the bond.

18. The system of claim 1 wherein the reference item is conditioned with at least one of:
- i) an emphasis conditioner,
- ii) a circumstance-based conditioner,
- iii) a self-adaptive conditioner,
- iv) a quasi-anti-fungibility conditioner, and
- v) a programmability conditioner.

19. The system of claim 1 wherein the one or more sets comprise an optimized inventory, wherein the optimization is based on or comprises determining interchangeability between the reference item and the one or more alternatives to the reference item.

20. The system of claim 1 wherein at least one of the determined interchangeability, the one or more sets, and one or more members of the one or more sets is incorporated into, forms the basis for, or comprises a grouping, protocol, or classification for a disease, a diagnosis, a treatment, or a payment.

* * * * *